US009917987B2

(12) United States Patent
Bryant et al.

(10) Patent No.: US 9,917,987 B2
(45) Date of Patent: Mar. 13, 2018

(54) MEDIA EDITING WITH OVERLAID COLOR ADJUSTMENT TOOLS

(75) Inventors: Andrew Bryant, Los Gatos, CA (US); Peter Warner, Paris (FR); Daniel Pettigrew, Pacific Palisades, CA (US); Ryan A. Gallagher, Brooklyn, NY (US)

(73) Assignee: APPLE INC., Cupertino, CA (US)

(*) Notice: Subject to any disclaimer, the term of this patent is extended or adjusted under 35 U.S.C. 154(b) by 1394 days.

(21) Appl. No.: 13/471,473

(22) Filed: May 15, 2012

(65) Prior Publication Data

US 2013/0201202 A1 Aug. 8, 2013

Related U.S. Application Data

(60) Provisional application No. 61/595,650, filed on Feb. 6, 2012.

(51) Int. Cl.
| G09G 5/02 | (2006.01) |
| H04N 1/62 | (2006.01) |
| H04N 1/407 | (2006.01) |
| H04N 9/64 | (2006.01) |
| H04N 9/67 | (2006.01) |
| G06T 11/00 | (2006.01) |

(52) U.S. Cl.
CPC ........... *H04N 1/622* (2013.01); *G06T 11/001* (2013.01); *H04N 1/407* (2013.01); *H04N 9/643* (2013.01); *H04N 9/67* (2013.01)

(58) Field of Classification Search
None
See application file for complete search history.

(56) References Cited

U.S. PATENT DOCUMENTS

| 5,416,890 | A | 5/1995 | Beretta |
| 5,499,040 | A | 3/1996 | McLaughlin et al. |
| 6,362,829 | B1 | 3/2002 | Onivik et al. |
| 6,504,551 | B1 * | 1/2003 | Takashima et al. .......... 345/649 |
| 6,778,186 | B2 | 8/2004 | Mehigan |
| 7,006,688 | B2 | 2/2006 | Zaklika et al. |
| 7,483,083 | B2 | 1/2009 | Li et al. |

(Continued)

FOREIGN PATENT DOCUMENTS

| EP | 0920223 | 6/1999 |
| WO | WO 2013/0119329 | 8/2013 |

OTHER PUBLICATIONS

PCT/US2012/072185, Dec. 28, 2012, Apple Inc.

(Continued)

*Primary Examiner* — Yu Chen
(74) *Attorney, Agent, or Firm* — DLA Piper LLP US

(57) ABSTRACT

A non-transitory machine readable medium that has a computer program for adjusting color values of an image represented in a color space is described. The computer program displays the image on a display device. The computer program receives several inputs on the displayed image. The several inputs include a selection of a point on the displayed image and a vector input. The computer program identifies a pixel of the image that corresponds to the selected point. Based on the color values of the identified pixel and the vector input, the program determines a color space transform for mapping a set of color values defined within the color space to a different set of color values.

27 Claims, 34 Drawing Sheets

(56) References Cited

U.S. PATENT DOCUMENTS

| | | | |
|---|---|---|---|
| 8,046,687 B2 | 10/2011 | Balassanian | |
| 8,823,730 B2 | 9/2014 | Mihara et al. | |
| 8,849,028 B2 | 9/2014 | Bryant | |
| 2001/0028738 A1* | 10/2001 | Pettigrew et al. | 382/162 |
| 2003/0012437 A1 | 1/2003 | Zaklika et al. | |
| 2003/0103057 A1 | 6/2003 | Graves et al. | |
| 2004/0240729 A1* | 12/2004 | Cooper et al. | 382/162 |
| 2005/0226526 A1 | 10/2005 | Mitsunaga | |
| 2007/0195347 A1 | 8/2007 | Momose et al. | |
| 2007/0247475 A1* | 10/2007 | Pettigrew et al. | 345/594 |
| 2007/0247647 A1 | 10/2007 | Pettigrew et al. | |
| 2008/0229232 A1 | 9/2008 | Schulz et al. | |
| 2009/0058806 A1* | 3/2009 | Middler et al. | 345/157 |
| 2009/0060378 A1 | 3/2009 | Curtis | |
| 2010/0066712 A1 | 3/2010 | Tomonaga | |
| 2010/0188415 A1* | 7/2010 | Pettigrew et al. | 345/589 |
| 2013/0106899 A1 | 5/2013 | Bhatt | |
| 2013/0201203 A1 | 8/2013 | Warner | |
| 2013/0201206 A1 | 8/2013 | Bryant et al. | |
| 2013/0201207 A1 | 8/2013 | Bryant et al. | |
| 2013/0202203 A1 | 8/2013 | Bryant | |

OTHER PUBLICATIONS

Invitation to Pay Additional Fees with Partial Search Report for PCT/US2012/072185, dated Mar. 26, 2013, Apple Inc.

International Search Report and Written Opinion for PCT/US2012/072185, dated May 29, 2013, Apple Inc.

Farup, Ivar, et al., "Visualization and Interactive Manipulation of Color Gamuts," Tenth Color Imaging Conference: Color Science and Engineering Systems, Technologies and Applications, Nov. 1, 2002, pp. 250-255, Scottsdale, Arizona, USA.

U.S. Appl. No. 13/471,471, filed May 15, 2012, Bryant, Andrew, et al.

U.S. Appl. No. 13/471,472, filed May 15, 2012, Warner, Peter.

U.S. Appl. No. 13/471,474, filed May 15, 2012, Bryant, Andrew, et al.

U.S. Appl. No. 13/471,475, filed May 15, 2012, Bryant, Andrew.

Baudisch, Patrick, "The Profile Editor: Designing a direct manipulative tool for assembling profiles," In *Proceedings of Fifth DELOS Workshop on Filtering and Collaborative Filtering*, Nov. 10-11, 1997, 7 pages, Budapest, Hungary.

Dodgson, Neil A., et al., "Contrast brushes: interactive image enhancement by direct manipulation," Computational Aesthetics in Graphics, Visualization, and Imaging, Month Unknown 2009, 8 pages, The Eurographics Association.

Pitié, François, et al., "Automated colour grading using colour distribution transfer," Computer Vision and Image Understanding, Jul. 2007, pp. 123-137, vol. 107, Issue 1-2, Elsevier Science Inc, New York, NY, USA.

International Search Report for PCT/US2012/072185, dated May 29, 2013, Apple Inc.

Author Unknown, "Adobe Photoshop Elements Basic Lesson 3: Image and Color Selection," May 22, 2007, 1 page, http://web.archive.org/web/20070522031853/http://graphicssoft.about.com/od/pselements/ig/color.--7v/info-Palette.htm.

Portions of prosecution history of U.S. Appl. No. 13/471,471, filed Sep. 11, 2014, Bryant, Andrew, et al.

Portions of prosecution history of U.S. Appl. No. 12/471,472, filed Sep. 17, 2014, Warner, Peter.

International Preliminary Report on Patentability for PCT/US2012/072185, dated Aug. 21, 2014, Apple Inc.

Updated portions of prosecution history of U.S. Appl. No. 13/471,472, filed Dec. 4, 2014, Warner, Peter.

Updated portions of prosecution history of U.S. Appl. No. 13/471,471, filed Dec. 11, 2014, Bryant, Andrew, et al.

Updated portions of prosecution history of U.S. Appl. No. 13/471,471, filed Jan. 22, 2015, Bryant, Andrew, et al.

Stone, Ken, "Final Cut Pro 7—Scopes—Waveform Monitor," Oct. 4, 2009, 14 pages, available at http:www.kenstone.net/fcp_homepage/fcp_7_scopes_waveform_stone.html.

\* cited by examiner

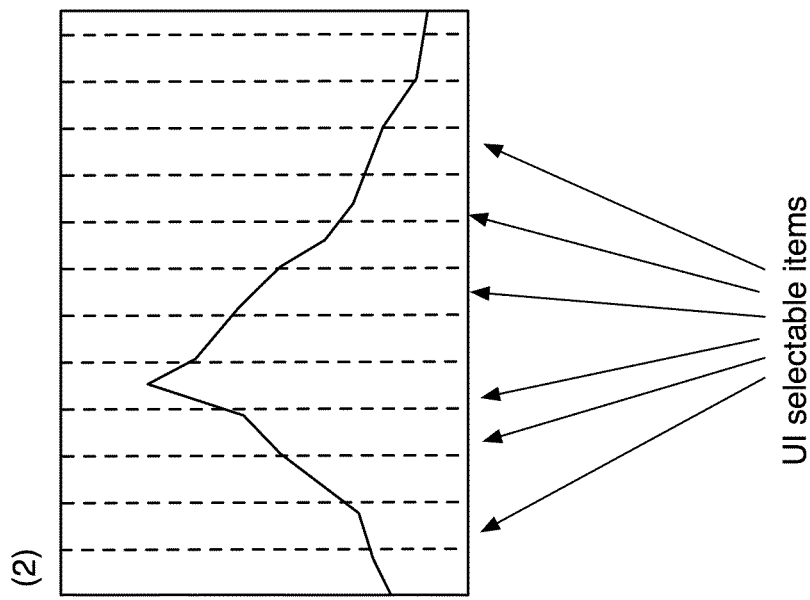
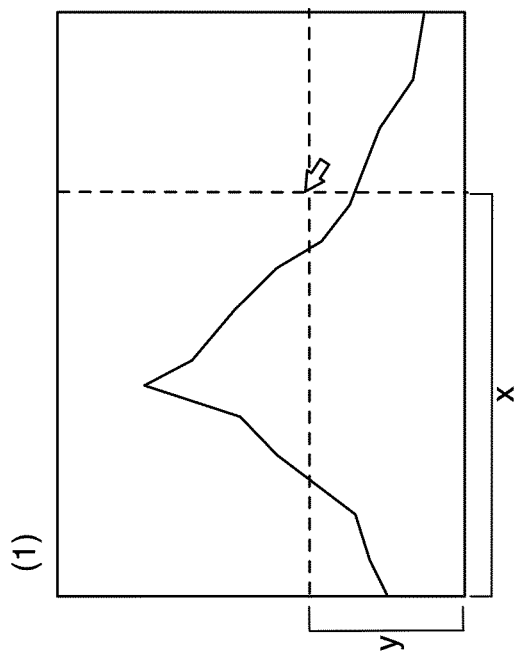
*Figure 18*

MEDIA EDITING WITH OVERLAID COLOR ADJUSTMENT TOOLS

CLAIM OF BENEFIT TO PRIOR APPLICATION

This application claims benefit to U.S. Provisional Patent Application 61/595,650, entitled "Intuitive Media Editing," filed Feb. 6, 2012. The U.S. Provisional Patent Application 61/595,650 is incorporated herein by reference.

BACKGROUND

Digital graphic design, image editing, and video editing applications (hereafter collectively referred to as media content editing applications or media editing applications) provide graphical designers, media artists, and other users with the necessary tools to view, analyze, and edit a variety of media content. Examples of such applications include iPhoto®, Aperture®, Final Cut Pro® and iMovie®, all sold by Apple, Inc. These applications give users the ability to analyze and edit images and videos in a variety of manners. For example, some applications provide different graphical representations of the color values of an image (e.g., histogram representation, waveform representation, vectorscope representation, etc.) to show users the distribution of tones (luminance levels) or distribution of colors in an image. In addition, some applications provide a user interface that includes adjustment sliders and other tools for editing the image.

Many media-editing applications, however, do not provide intuitive color adjustment controls. For example, the user is required to have extensive knowledge about color editing in order to effectively use most of the existing color adjustment tools. Furthermore, the controls for adjusting different aspects of the color values of an image are dispersed in different locations of the user interface. These deficiencies cause unnecessary inconvenience in editing an image.

BRIEF SUMMARY

Some embodiments of the invention provide several novel user interface (UI) tools for editing a set of images in a media-editing application. For instance, the media-editing application of some embodiments displays a graphical representation of a set of color values of an image and allows a user to edit the color values of the image by modifying the graphical representation. In this manner, the graphical representation serves as a UI tool that the user can select and manipulate. Based on the user's manipulation of the graphical representation, the application generates a color space transform. The color space transform maps colors defined within a color space in which the color values of the image are defined to a different set of colors.

After generating this color space transform, the application uses the transform to adjust the color values of the image. In some embodiments, the image that is currently being edited is one of several picture frames of a video clip. In some of these embodiments, the application uses the generated color space transform to adjust color values of one or more of the other picture frames.

A graphical representation of the color values of an image presents one or more aspects of the color values in a graphical form. Different graphical representations present the image's color values in different manners. For example, a color channel histogram shows a distribution of color channel values of different pixels across the image. A waveform scope shows a distribution of luminance values (e.g., brightness values) of different pixels at each horizontal location of the image. A vectorscope displays a distribution of chrominance values (e.g., color shades and color intensity) of different pixels in the image.

The media-editing applications of different embodiments use different techniques to receive user input through the displayed, color-value graphical representations. For instance, the application of some embodiments identifies the location and movement of the user input (e.g., the cursor or touch screen input), and correlate this location and movement to a location and a vector within the graphical representation. More specifically, a user can select a location on the graph by placing a cursor on the graph and providing an input (e.g., clicking a button of a cursor controlling device, pressing a hot key, etc. or by touching an area of a touch screen display that displays the graph). In these embodiments, the media-editing application determines a position of the user input (the cursor position or the position of the touch) and corresponds that position to a location on the graph. The position of the user input can be determined by identifying a set of coordinates (e.g., a horizontal coordinate x and a vertical coordinate y) of the user input. In addition, the user can provide a vector by moving the cursor (or moving the finger on the touch screen device) to a different position.

In other embodiments, the media-editing application provides several selectable UI items that are located at different sections on the graph. The user may select a point on the graph by selecting one of the selectable UI items. In addition, the user may provide a vector on the graph by moving the selected UI item to a different location on the graph.

After receiving the set of user inputs, the media-editing application of some embodiments uses the selected location on the graph and the vector input to identify a particular color value adjustment. Specifically, the application first identifies a particular color value that corresponds to the selected location on the graph (e.g., a luminance value that corresponds to the selected location on a waveform representation).

In some embodiments, when the graphical representation presents the color values in more than one dimension (e.g., a vectorscope representation that represents the color shade and color intensity of the color values), the application identifies a particular set of color values that correspond to the selected location of the graph (e.g., a set of chrominance values that correspond to the selected location on a vectorscope representation). The application then uses the vector input to determine an adjustment to the particular color value. In some embodiments, the application uses the direction of the vector input to determine an increase or a decrease of the particular color value. For example, a first vector direction may correspond to an increase of the particular color value while a second vector direction may correspond to a decrease of the particular color value. In addition, the application uses the magnitude of the vector to determine an amount of adjustment that is applied to the identified color value. For example, a larger vector magnitude corresponds to a larger color value adjustment and a smaller vector magnitude corresponds to a smaller color value adjustment.

After determining the particular color value adjustment, the application of some embodiments determines amounts of adjustment for other color values (e.g., adjustments for other luminance values) that are represented in the graphical representation. Different techniques are used in different embodiments to determine adjustments to the other color values. For instance, the application of some embodiments constructs a blended Gaussian curve to determine the amounts of adjustments that are applied to the different color values. A Gaussian curve is a bell shaped curve that is defined along two axes, a horizontal axis that specifies values along one component color dimension (e.g., luminance) and a vertical axis that specifies different amounts of adjustments. In some embodiments, the application constructs the Gaussian curve by first identifying a horizontal location on the Gaussian curve that corresponds to the particular color value and then creating a bump (i.e., a bell shaped curve) that has a peak at that horizontal location. The height of the peak is determined by the amount of adjustment for the particular color value. The application may also blend this newly constructed Gaussian curve with any existing Gaussian curves that were constructed based on previously provided input to create a blended Gaussian curve. By using this blended Gaussian curve, the application identifies different amounts of adjustment to be applied to different color values in the image.

Instead of constructing Gaussian curves, the media-editing application of some embodiments creates a falloff region on the graphical representation in order to determine adjustments to the other color values. The falloff region is a region on the graphical representation with the center of the region located at the user's selected location. In these embodiments, the application gradually reduces the amount of adjustments as the representations of the color values are located farther away from the center of the falloff region. In addition, no adjustment will be applied to color values located outside of the falloff region.

In addition, the application of some embodiments applies a fluid model when determining adjustments to the different color values. Under the fluid model, the application first divides the vector input into several smaller vectors and determines adjustments to the color values as if the smaller vectors are provided on the graphical representation. This fluid model allows the graphical representation to shift and/or skew smoothly to create a smooth adjustment to the image and minimize the effect of posterization.

Based on the determined adjustments to the different color values, the media-editing application generates a color space transform that maps colors defined within the color space to a different set of colors. In some embodiments, the color space transform is an algorithm or a mathematical formula that takes an input color that is defined within the color space and generates an output color. Before applying the color space transform to an image, the media-editing application of some embodiments uses the color space transform to construct a lookup table. The lookup table includes a set of input colors defined within the color space and a set of corresponding output colors that are generated according to the color space transform. After the lookup table is constructed, the application adjusts the colors of the image by replacing each color in the image with the color's corresponding output color based on the lookup table. Instead of constructing a lookup table, the media-editing application of some other embodiments use the algorithm or mathematical formula directly on the different color values of the image to change the colors of the image in real-time.

After applying the color space transform to the image, the application updates the graphical representation of the image according to the adjustments made to the color values. In some embodiments, the color space transform causes the graphical representation to shift and/or skew in a manner that is consistent with the user's input on the graphical representation. Specifically, the graphical representation shifts and/or skews in the same direction as the user's vector input. In addition, the degree to which the graphical representation shifts and/or skews is proportional to the magnitude of the user's vector input.

Some embodiments provide another novel user interface for editing a set of images in a media-editing application. In these embodiments, the application provides a color selection tool that is integrated with the color channel histogram representation of the color values of an image. The color selection tool allows a user to select a specific color for editing the set of images. Different embodiments implement the color selection tool differently. In some embodiments, the color selection tool is a color pot that displays different colors of the color space. In other embodiments, the color selection tool displays an input field on the GUI of the application for a user to enter a specific set of color values.

In some embodiments, the color selection tool does not always appear on the color channel histogram representation of the image, but only do so when the color selection tool is activated. The color selection tool may be activated in different manners. In some embodiments, the user may activate the color selection tool by selecting a location on the histogram. The user may select a location on the histogram in different manners as described above. In these embodiments, the application identifies a particular color value that corresponds to the selected location on the histogram.

Once the user selects a color using the color selection tool, the application of some embodiments generates a color space transform for the image. In some embodiments, the color space transform is generated based on the selected color and the particular color value that corresponds to the selected location on the histogram. Specifically, the color space transform changes colors within the color space to be more similar to the selected color. In addition, the changes that are applied to different colors are not constant. For example, a larger amount of changes is applied to colors having color values closer to the particular color value, and a smaller amount of changes is applied to colors having color values farther away from the particular color value. After generating this color space transform, the application uses the transform to adjust the color values of the image.

As another novel user interface, some embodiments of the invention provide a color channel histogram that includes a range beyond the predetermined black and white luminance cutoff values of the image. The black luminance cutoff value identifies a luminance value as black and the white luminance cutoff value identifies a luminance value as white when the image is displayed or reproduced.

Pixels of an image may contain luminance values that are beyond the range of black and white luminance cutoff values under different scenarios. For example, modern image-capturing devices may capture and store color values beyond the black and white luminance cutoff values in an image. Certain image file formats, such as formats that support high-dynamic range, may support color values that are outside the range of the black and white luminance cutoff values. Also, luminance values of some pixels that are originally within the range of the black and white luminance cutoff values may be pushed beyond the range by a user who is editing the image (e.g., increasing or decreasing the brightness level of at least some pixels of the image). Thus, the media-editing application of some embodiments provides a color channel histogram representation that includes a range beyond the predetermined black and white luminance cutoff values. Consequently, all pixels of the image, including pixels having luminance values darker than the black luminance cutoff value and pixels having luminance values brighter than the white luminance cutoff value, are accurately presented in the histogram.

By accurately presenting pixel data in a color channel histogram representation, a user may properly analyze and edit the image to a desired effect. For example, after learning that some of the pixels have luminance values that are brighter than the white luminance cutoff value (displayed as pure white) or darker than the black luminance cutoff value (displayed as pure black), a user may edit the image by bringing the luminance values of those pixels back within the range of black and white luminance cutoff values. In some embodiments, the user may perform such an edit by directly manipulating the color channel histogram representation of the color values of the image.

In addition to allowing a user to edit an image by directly manipulating the graphical representations of the image, the application of some embodiments displays a set of color adjustment tools on the image and allow a user to edit the color values of the image by controlling the color adjustment tools that are displayed on the image. In some embodiments, the color adjustment tools do not always appear on the image, but only do so when the color adjustment tools are activated.

In some embodiments, the application displays a color adjustment tool that simulates a graphical representation of the color values of the image. In these embodiments, the user may provide an additional input (e.g., a vector) on the displayed image as if the user is manipulating the actual graphical representation. The application then generates a color space transform based on the color values of the particular pixel and the vector input and adjusts the color values of the image in a similar manner as described above. The application also updates the actual graphical representation of the color values of the image according to the adjustments to the image's color values. In some embodiments, the effects on the image and the graphical representation are the same and it seems as if the user provides the inputs directly on the graphical representation.

Instead of or in addition to displaying a color adjustment tool that simulates a graphical representation, some embodiments displays a set of range sliders for adjusting color values of different color channels. For example, the set of range sliders may include a range slider for adjusting luminance values, a range slider for adjusting red color channel values, a range slider for adjusting green color channel values, and a range slider for adjusting blue color channel values. Similar to the color adjustment tools that simulate a graphical representation, the application generates a color space transform for the image based on the color values of the particular pixel and the inputs received on the range sliders. After generating the transform, the application uses the color space transform to adjust the color values of the image.

In some embodiments, the color adjustment tools are overlaid on the displayed image around the selected point on the image. In addition, the color adjustment tools are translucent such that they do not obstruct the user from viewing the displayed image.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 18 illustrates two example user interface implementations for allowing a user to manipulate a color channel histogram representation of the color values of an image.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide several novel user interfaces (UIs) for editing a set of images in a media-editing application. For instance, the media-editing application of some embodiments provides a graphical representation of the color values of an image and allows a user to edit the color values of the image by modifying the graphical representation. In this manner, the graphical representation serves as a tool in the user interface that the user can select and manipulate. Based on the user's manipulation of the graphical representation, the application generates a color space transform. The color space transform maps colors defined within a color space in which the color values of the image are defined to a different set of colors. After generating this color space transform, the application uses the transform to adjust the color values of the image.

In some embodiments, the media-editing application is an application that enables a user to edit one or more images. Through a graphical user interface (GUI) of the application, the user specifies the manner in which the images are edited. In some embodiments, the user edits an image by modifying the color values of at least one pixel of the image.

Figure 1:
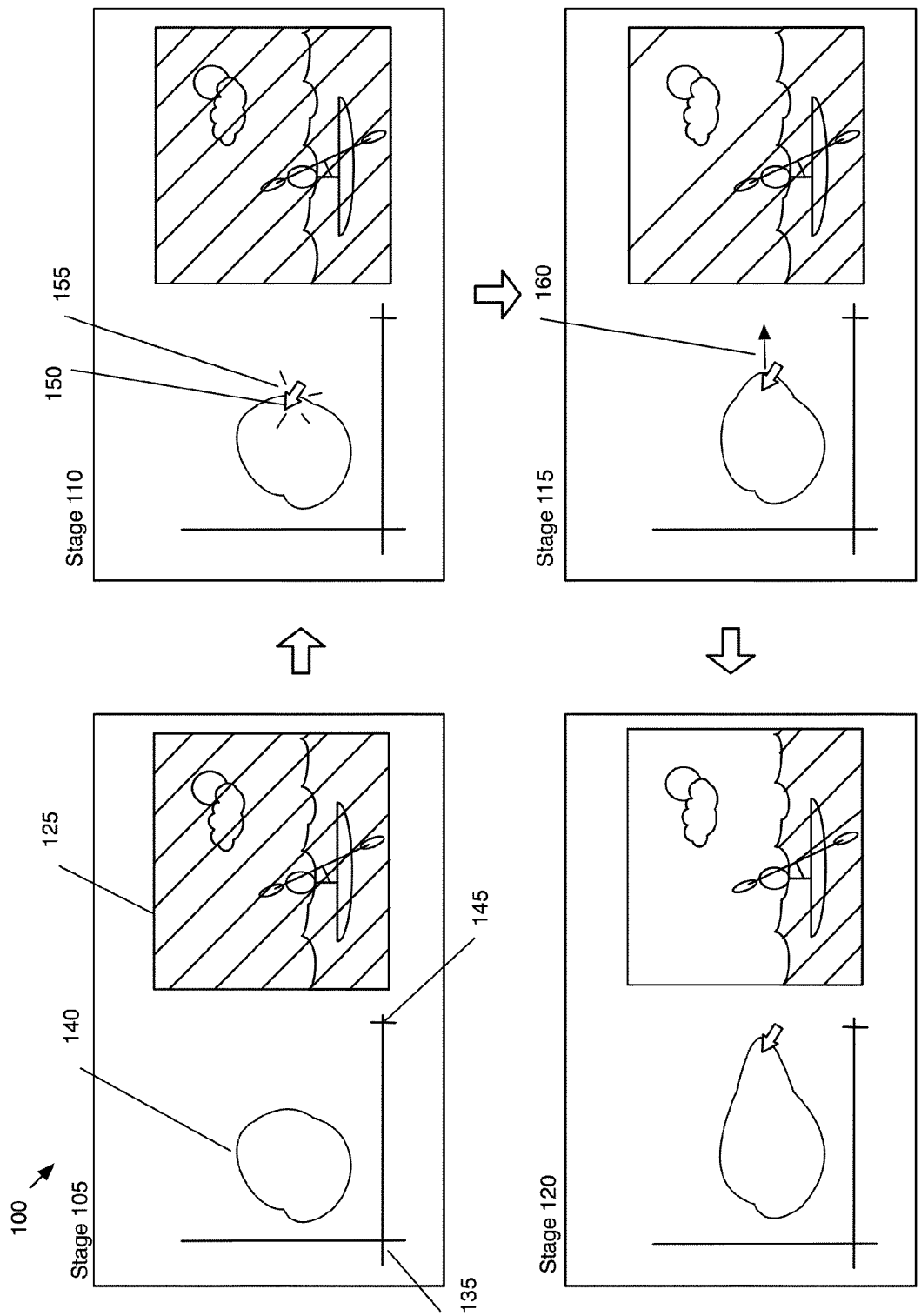
FIG. 1 illustrates an example of editing an image when a user directly manipulates the graphical representation of the color values of the image.

FIG. 1 illustrates an example GUI 100 of a media-editing application of some embodiments that allows a user to edit an image by directly manipulating a graphical representation of the color values of the image at four different stages 105, 110, 115, and 120. Each of these stages will be described in more detail below.

As shown in FIG. 1, the GUI 100 illustrates an image 125 and a graphical representation 140 of the color values of the image 125. The image 125 is a picture of a person canoeing under a sunny sky. As mentioned above, a graphical representation presents color data of the image in a graphical manner. In this example, the graphical representation 140 shows a distribution of luminance values of the different pixels across the image 125. The horizontal axis of the graph 140 corresponds to different luminance values. The origin 135 of the horizontal axis of the graph 140 corresponds to a minimum luminance value and a point 145 of the horizontal axis corresponds to a maximum luminance value within the color space. Pixels of the image 125 that have higher luminance values (i.e., pixels that are brighter) are represented in the right portion of the graphical representation 140 while pixels of the image 125 that have lower luminance values (i.e., pixels that are darker) are represented in the left portion of the graphical representation 140.

The media editing operation will now be described by reference to the state of the GUI 100 during the four stages 105, 110, 115, and 120. The first stage 105 illustrates the GUI 100 of the media-editing application when the image 125 has just been opened. As shown, the image 125 is very dark, as illustrated by the diagonal lines across the image 125. The graphical representation 140 also shows a concentration of pixels in the left portion of the graph 140, indicating that most pixels of the image 125 have low luminance values.

The second stage 110 illustrates the GUI 100 after the user has initiated the media editing operation by selecting a location 150 on the graph 140. The selection of the location on the graph 140 may be performed by placing a cursor at a desired location on the graph 140 and providing an input (e.g., clicking on the cursor controlling device, pressing a hot key, etc. or touching an area on a touch screen device that displays the graph 140). Although the user in this example has selected a location on the graph 140 that overlaps with an area that represents the color values of the image 125, the user may also select a location on the graph 140 that does not overlap with such an area in order to initiate the media editing operation.

The third stage 115 illustrates the GUI 100 after the user began manipulating the graphical representation by providing a vector input on the graphical representation 140. In some embodiments, the user can provide a vector by moving the cursor (or the finger on a touch scree device) to a different location. As shown, the user has started to move the cursor 155 to the right of the graph 140, as indicated by the arrow 160. Based on the selected location on the graph 140 and the vector input, the application of some embodiments generates a color space transform that maps each set of color values within a color space to another set of color values. The generation of the color space transform will be discussed in more detail below by reference to FIGS. 3, 7, 13, and 19.

At stage 115, the application edits the image 125 according to the color space transform that is generated based on the user inputs. As a result of the cursor moving to the right, the application increases the luminance values of the pixels having relatively high luminance values in the image 125. As shown, the area of the image 125 near the sun (i.e., the area of the image 125 with relatively high luminance values) have brightened up, as indicated by the removal of the diagonal lines around the sun.

The fourth stage 120 illustrates the GUI 100 after the user has completed the media editing operation. As shown, the user has moved the cursor 155 further to the right (i.e., almost to the right end of the graph 140) and has stopped at that new location. This cursor movement provides a new vector on the graphical representation. Similar to the third stage 115, the application generates a new color space transform based on the user inputs and applies the transform to the image 125. As a result of the cursor movement, the portion of the image 125 that shows the sky, the sun, and the cloud has brightened up, and is no longer underexposed.

In the above example, the application continuously generates a new color space transform as the cursor moves from one location to another location. In some embodiments however, the application may generate a new color space transform only when the application detects that the cursor has stopped moving for a predetermined period of time.

Figure 2:
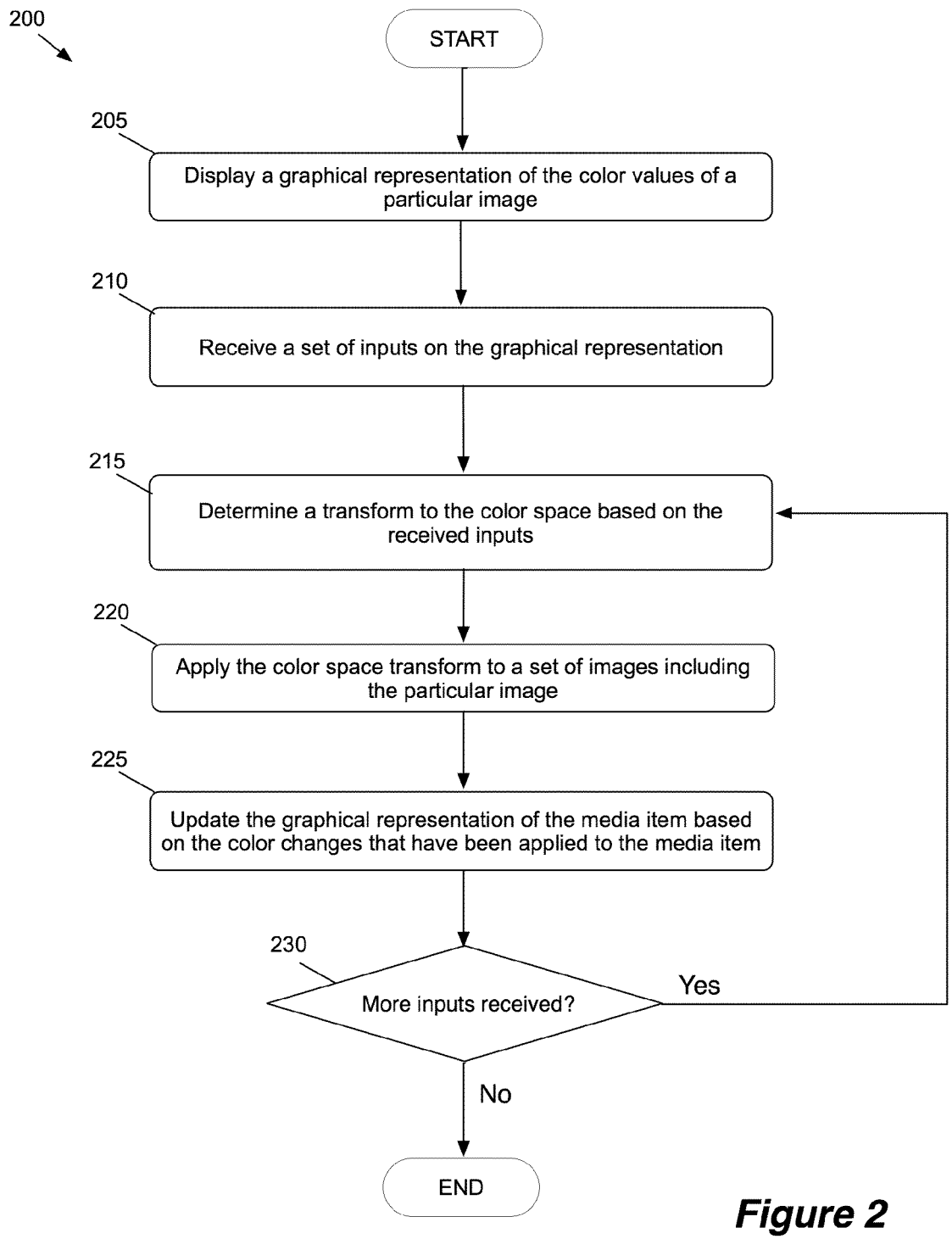
FIG. 2 conceptually illustrates a process of some embodiments for editing an image when a user directly manipulates the graphical representation of the color values of the image.

FIG. 2 conceptually illustrates a process 200 for editing an image based on a manipulation on a graphical representation of the color values of the image. In some embodiments, the process is performed by a media-editing application. The process 200 begins by displaying (at 205) a graphical representation of the color values of a particular image on the GUI of the media-editing application. As mentioned above, the application may display different graphical representations that present color data of the image in different graphical forms. For example, a color channel histogram shows a distribution of color values of different pixels across the image. A waveform scope shows a distribution of color values of different pixels at each horizontal location of the image. A vectorscope displays a distribution of chrominance values (e.g., color shades, color intensity, etc.) of different pixels in the image. The media-editing application of some embodiments may display one or more forms of graphical representations simultaneously for the image.

Next, the process 200 receives (at 210) a set of inputs on the graphical representation from the user. In some embodiments, the set of inputs includes selecting a point on the graph and providing a vector. In some such embodiments, the user can provide the vector by dragging a cursor or by dragging the finger across a touch screen device.

After the set of inputs is received, the process 200 determines (at 215) a color space transform based on the received inputs. As mentioned above, the color space transform maps colors defined within a color space in which the color values of the image are defined to a different set of colors. In some embodiments, the color space transform is an algorithm or a mathematical formula that takes an input color that is defined within the color space and generates an output color. Before applying the color space transform to an image, the media-editing application of some embodiments uses the color space transform to construct a lookup table. The lookup table includes a set of input colors defined within the color space and a set of corresponding output colors that are generated according to the color space transform. The generation and implementation of the color space transform will be discussed in more detail below by reference to FIG. 3.

The process 200 then applies (at 220) the color space transform to a set of images including the particular the image. If the application has constructed a lookup table based on the color space transform, the application applies the transform to the image by replacing each color in the image with the color's corresponding output color in the lookup table. Otherwise, the media-editing application of some other embodiments directly applies the color space transform to the image by using the algorithm or mathematical formula to change the color values of the image in real-time.

After applying the color space transform to the image, the process 200 updates (at 225) the graphical representation according to the adjustments made to the color values of the image based on the color space transform. Next, the process determines (at 230) if more inputs are received on the graphical representation. If more inputs are received, the process returns to 215 to determine a transform to the color space based on the newly received inputs. The process will cycle through operations 215-230 until no more inputs are received on the graphical representation. Then the process ends.

Figure 3:
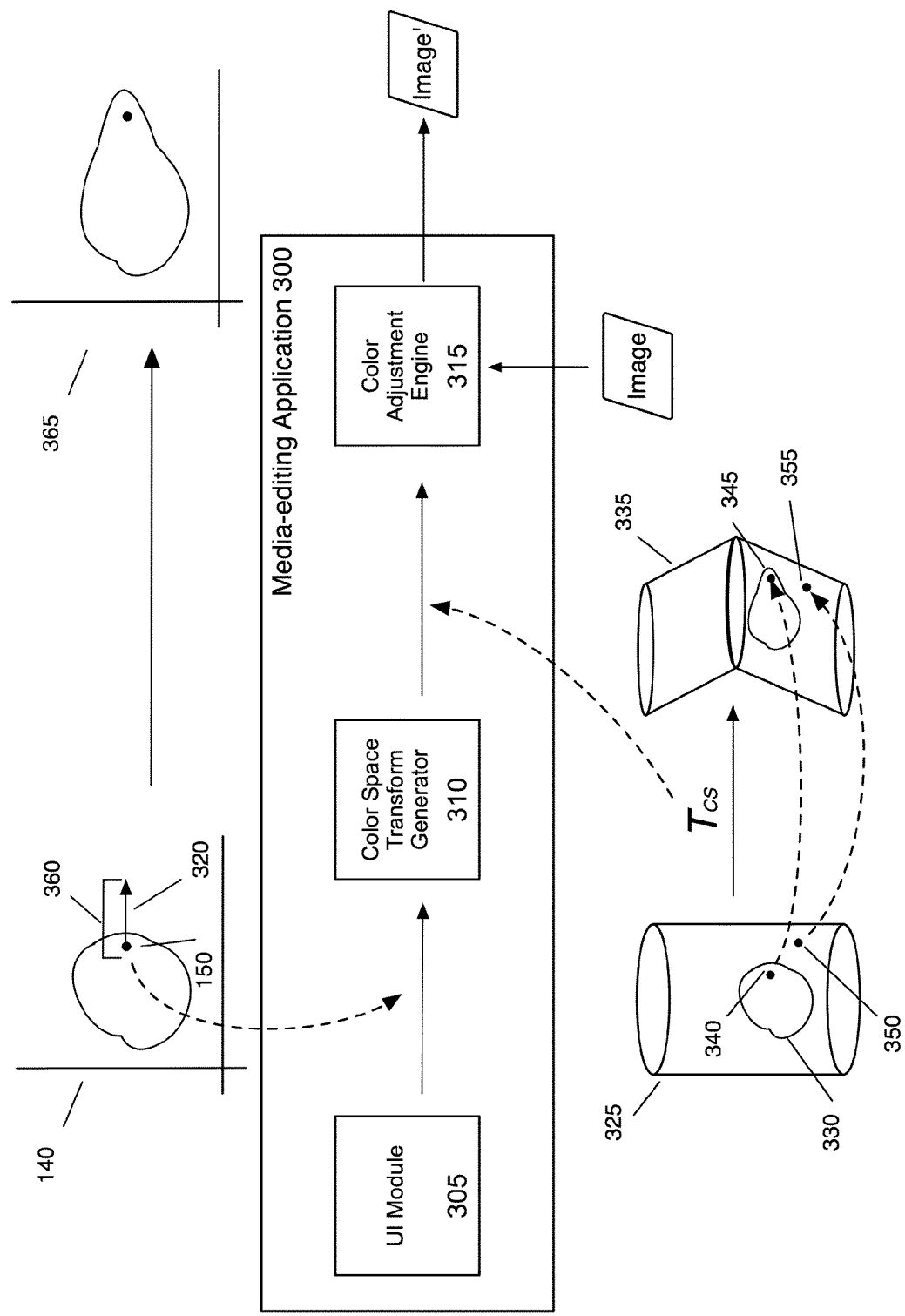
FIG. 3 conceptually illustrates a software architecture of a media-editing application of some embodiments and an example color space transform resulted from manipulation of a graphical representation.

FIG. 3 illustrates a media-editing application 300 of some embodiments that provides a graphical representation of the color values of an image and allows a user to edit the color values of the image by modifying the graphical representation. As shown in FIG. 3, the media-editing application 300 includes a UI module 305, a color space transform generator 310, and a color adjustment engine 315. The color graphs UI module 305 receives user inputs provided on the graph and passes the inputs to the color space transform generator 310. FIG. 3 illustrates a set of example user inputs 360 on a graphical representation 140. The graphical representation 140 is identical to the graphical representation 140 in the first stage 140 of FIG. 1. In this example, the user selects a location 150 on the graph and provides a vector 320.

The color space transform generator 310 receives the user inputs 360 and generates a transform to a color space based on the user inputs. As mentioned, the color space is a color space in which the color values of the image are defined. In some embodiments, the color space is determined by the device that captures, displays, or reproduces the image (e.g., a monitor that displays the image, a printer that prints the image, etc.). In other embodiments, the color space is specified by a standard or determined by the user who is editing the particular image.

FIG. 3 also illustrates an example of such a color space transform. In this figure, the color space in which the color values of the image are defined is depicted as a cylinder 325 for illustrative purposes. The cylinder is defined in a three dimensional space, which can be expressed in terms of Cartesian coordinates (i.e., x, y, and z coordinates), Cylindrical coordinates (i.e., r, φ, and z), or any other coordinate system. Accordingly, each color in the cylindrical color space can be specified by three coordinates in the coordinate system used to define the color space. In FIG. 3, the area 330 is a representation of the colors of the image. As the colors of the image only represent a portion of all the colors defined within the color space, the area 330 occupies only a fraction of the cylinder 325.

In some embodiments, the color space transform $T_{CS}$ takes each color defined within the original color space 325 and outputs a different color. For example, the color space transform $T_{CS}$ takes a color 340 that is defined in the original color space 325 and outputs a different color 345. As another example, the color space transform $T_{CS}$ may take a color 350 that is defined in the original color space and outputs a different color 355. In other words, the transform $T_{CS}$ effectively warps the original color space 325 to produce a modified color space 335 and maps each color defined within the original color space 325 to a different color defined in the modified color space 335.

Different embodiments may use the color space transform differently. For instance, some embodiments use the color space transform in real time to convert an input color value from an image into an output color value. Alternatively, other embodiments use the color space transform generator 310 to construct a lookup table that can later be used to map input color values from an image into output color values.

FIG. 3 only illustrates one example color space transform that modifies three dimensions of the original color space 325 to produce the modified color space 335. The color space transform generator 310 may generate different kinds of color space transform based on different user manipulations of a graphical representation. The various color space transforms will be discussed in more detail below by reference to FIGS. 7, 13, and 19.

After generating the color space transform $T_{CS}$, the color space transform generator 310 sends the color space transform $T_{CS}$ to the color adjustment engine 315. The color adjustment engine 315 receives an image and applies the color space transform to the image to produce a modified image.

In some embodiment, the media-editing application also updates the graphical representation according to the adjustments made to the color values of the image. In this figure, the graphical representation 365 is a representation of the color values of the image after the color space transform has been applied to the image. When the graphical representation is updated, the graphical representation appears to have shifted and/or skewed in response to the user's input. Specifically, the movements of the graphical representation are consistent with the user inputs on the graph. In this example, the user inputs (i.e., the selected point and the vector) have caused the right portion of the graphical representation to shift and skew to the right.

Figure 4:
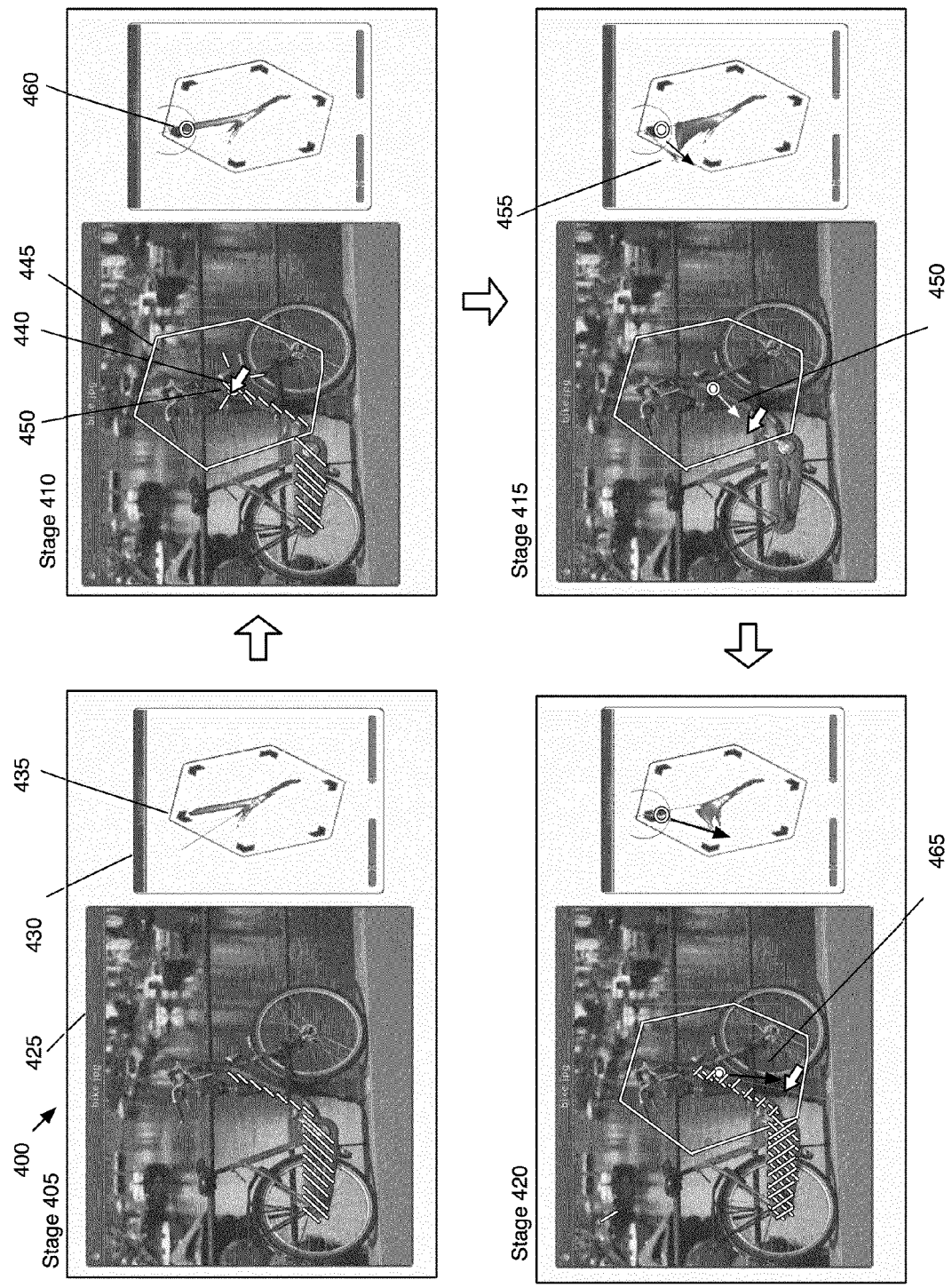
FIG. 4 illustrates an example of editing an image when a user provides inputs directly on the displayed image.

In addition to allowing a user to edit an image by directly manipulating the graphical representations of the image, some embodiments display a set of color adjustment tools on the image and allow a user to edit the color values of the image by controlling the color adjustment tools that are displayed on the image. FIG. 4 illustrates an example GUI 400 of a media-editing application of some embodiments that displays a set of color adjustment tools and allows a user to edit an image by controlling the color adjustment tools on the displayed image. Specifically, the image-editing operation will be described by reference to the state of four different stages 405, 410, 415, and 420. Each of these stages will be described in more detail below.

As shown in FIG. 4, the GUI 400 illustrates an image 425 and a vectorscope representation 435 of the color values of the image 425. A vectorscope in some embodiments shows the distribution of color of the image on a circular scale. The color is represented by a series of connected points that fall within this scale. The angle around the scale represents the hue displayed, with targets indicating the primary colors of red, green, and blue and the secondary colors of yellow, cyan, and magenta. The distance from the center of the scale to the outer ring represents the saturation of the color being displayed. The center of the scale represents zero saturation, while the outer ring represents maximum saturation.

The image 425 is a picture of a red bicycle (as indicated by the diagonal lines on the bicycle). As mentioned above, the color adjustment tools do not always appear on the image, but only do so when the color adjustment tools are activated. The first stage 405 illustrates the GUI 400 of the media-editing application before the user has activated the color adjustment tools on the displayed image.

The second stage 410 illustrates the GUI 400 after the user has initiated an image editing operation by activating the color adjustment tool on the displayed image 425. Different embodiments allow the user to activate the color adjustment tools in different manners. In some embodiments, the user may activate the color adjustment tools by selecting a location on the image. In these embodiments, a user can select a location on the image by placing a cursor on the image and providing an input (e.g., clicking a button of a cursor controlling device, pressing a hot key, etc. or by touching an area of a touch screen display that displays the image). The media-editing application then determines a position of the user input (the cursor position or the position of the touch) and corresponds that position to a particular pixel on the image. The position of the user input can be determined by identifying a set of coordinates (e.g., a horizontal coordinate x and a vertical coordinate y) of the user input.

As shown, the user selects the location 450 on the image 425 by placing a cursor 440 on top of an area showing the red bicycle on the image 425. Based on the selected location on the image, the application of some embodiment identifies a particular pixel on the image. In some embodiments, the application uses the color values of the particular pixel to determine a color space transform for the image.

As a result of the selection, the application displays a color adjustment tool 445 on the image 425. Different embodiments provide different color adjustment tools to be displayed on the image. In this example, the color adjustment tool 445 simulates a vectorscope representation of the color values of the image. When the color adjustment tool simulates a color value graphical representation of the image, the user may provide an additional input (e.g., a vector) on the displayed image as if the user is manipulating the actual graphical representation.

As shown, the color adjustment tool 445 is displayed around the selected area on the image 425. Additionally, the application corresponds the color values of the particular pixel of the image 425 to a location on the actual vectorscope representation 435, as indicated by a white circle 460 around the location on the vectorscope 435. Although the color adjustment tool 445 is shown to be opaque in this example, some embodiments display a translucent UI element on the image in order not to obstruct the view of the image from the user.

The third stage 415 illustrates the GUI 400 after the user has provided a vector input on the displayed image 425. As shown, the user has provided a vector 450 by dragging the cursor toward the lower left corner of the image 425. As shown in the stage 415, the drag movement of the cursor 440 has also created a vector 455 that is applied to the actual vectorscope representation 435. The application then generates a color space transform that is applied to the image based on user inputs. Specifically, the media-editing application uses the color values of the particular pixel and the vector input to determine a color space transform in the same manner as if the inputs are provided directly on the actual vectorscope representation. The application then edits the image and updates the vectorscope representation of the color values of the image according to the color space transform. As a result, the pixels that were originally red in color (e.g., the bicycle) have been changed to orange (as indicated by the disappearance of the diagonal lines of on the bicycle). Also, the vectorscope representation 435 also shows the new changes caused by the vector input 455.

The fourth stage 420 illustrates the GUI 400 after the user has completed the image editing operation. As shown, the user has moved the cursor 440 toward the bottom of the image 425 and has stopped at that location. This last location of the cursor provides a new vector 465 on the displayed image 425. Similar to the third stage 415, the application generates a new color space transform based on the user inputs and applies the transform to the image 425. As a result, the pixels that were originally red (e.g., pixels of the bicycle) have turned into green (as indicated by the cross-hatching on the bicycle). This stage also illustrates the new changes on the vectorscope representation 435 as a result of the vector input.

Several more detailed embodiments of the invention are described in the sections below.

Sections I to III describe details of editing an image by directly manipulating different types of graphical representations. Specifically, Section I describes editing an image by directly manipulating a waveform representation, Section II describes editing an image by directly manipulating a vectorscope representation, and Section III describes editing an image by directly manipulating a color channel histogram representation. Section IV then describes details of editing an image by providing inputs directly on the displayed image. Next, Section V illustrates the software architecture of the media-editing application of some embodiments. Finally, Section VI describes an electronic system that implements some embodiments of the invention.

I. Directly Manipulating a Waveform Representation

As mentioned above, the media-editing application of some embodiments may provide one or more different graphical representations in the GUI. Some examples of these different graphical representations are waveform representations, vectorscope representations, and color channel histogram representations. The operations of editing an image by directly manipulating these various graphical representations will be described in more details below. In the examples illustrated below, the various graphical representations are shown to be separately displayed in order not to obscure the description with unnecessary details. However, in some embodiments, different graphical representations may be displayed simultaneously on the GUI.

Figure 5:
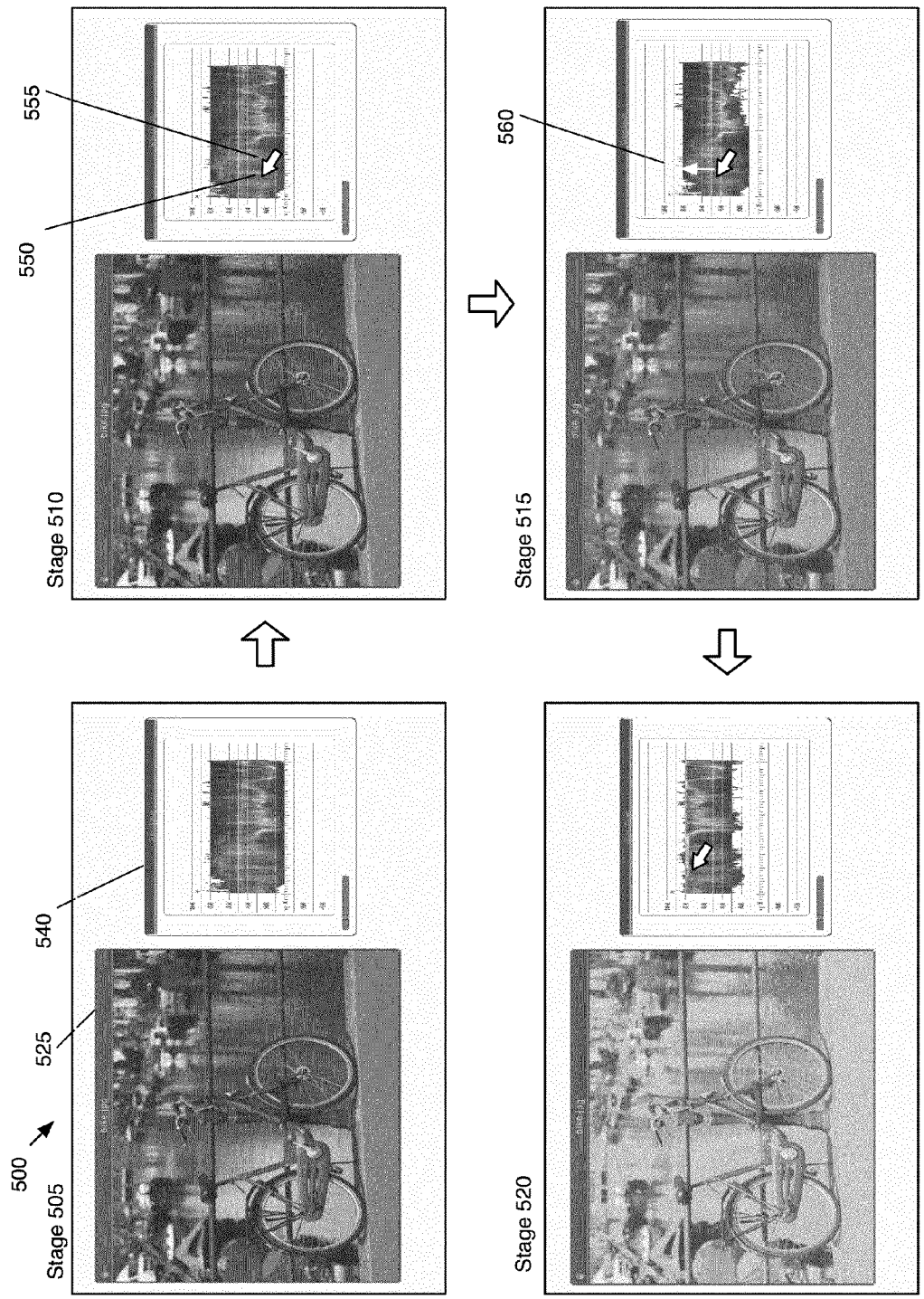
FIG. 5 illustrates an example of editing an image when a user directly manipulates a waveform representation of the color values of the image.

FIG. 5 illustrates an example GUI that provides a waveform representation of the color values of an image and allows a user to edit the image by directly manipulating the waveform representation. Specifically, FIG. 5 illustrates the image-editing operation at four different stages 505, 510, 515, and 520. Each of these stages will be described in more detail below.

The GUI 500 in FIG. 5 illustrates an image 525 and a waveform representation 540 of the color values of the image 525. As mentioned, a waveform scope shows a distribution of luminance values of different pixels at each horizontal location of the image. Specifically, the waveform representation is defined along two axes, a vertical axis that specifies different luminance values within a color space and a horizontal axis that specifies different horizontal location of the image 525. As such, the left most horizontal position on the waveform scope 540 show different luminance values of the left most section of the image 525 and the right most horizontal position on the waveform scope 540 shows different luminance values of the right most section of the image 525.

The image editing operation will now be described by reference to the state of the GUI 500 during the four stages 505, 510, 515, and 520. The first stage 505 illustrates the GUI 500 of the media-editing application when the image 525 is opened. As shown, the image 525 and the waveform representation 540 of the color values of the image 525 are displayed in the GUI 500. The image 525 is a picture of a red bicycle. As the colors on the right side of the image 525 are generally darker than the colors on the left side of the image 525, the right portion of the waveform representation 540 shows a higher intensity of low luminance values than the left portion of the waveform representation 540.

The second stage 510 illustrates the GUI 500 after the user has initiated the image editing operation by selecting a location on the waveform scope 540. The selection of a location on the graph 540 may be performed by placing a cursor at a desired location on the graph 540 and providing an input (e.g., clicking on the cursor controlling device, pressing a hot key, etc. or touching an area on a touch screen device that displays the graph 540). As shown, the user selects a location 550 on the graph 540 by placing a cursor 555 over the location 550 and clicking on the cursor controlling device. Although the user in this example has selected a point on the graph 540 that overlaps with an area that represents the color values of the image 525, the user may also select a point on the graph 540 that does not overlap with such an area in order to initiate the image editing operation.

The third stage 515 illustrates the GUI 500 after the user has provided a vector input on the graphical representation 540. In some embodiments, the user can provide a vector by moving the cursor (or the finger on a touch scree device) to a different location. As shown, the user has started to move the cursor 555 upward, as indicated by the arrow 560. Based on the selected location on the graph 540 and the vector input, the application of some embodiments generates a color space transform. The color transform maps colors defined within the color space in which the color values of the image are defined to a different set of colors.

At the stage 515, the application edits the image 525 according to the color space transform that is generated based on the user inputs. As shown, the entire image 525 in this stage appears to be brighter than the image 525 in the second stage 510 as a result of the cursor movement.

The fourth stage 520 illustrates the GUI 500 after the user has completed the image editing operation. As shown, the user has moved the cursor 555 further upward and has stopped at this new location. Similar to the third stage 515, the application generates a new color space transform based on the user inputs and applies the transform to the image 525. As shown, the entire image 525 in this stage appears in this stage to be even brighter than the image 525 in the third stage 515 as a result of the cursor movement.

In the above example, the application continuously generates a new color space transform as the cursor moves from one location to another location. In some embodiments however, the application may generate a new color space transform only when the application detects that the cursor has stopped moving for a predetermined period of time.

Figure 6:
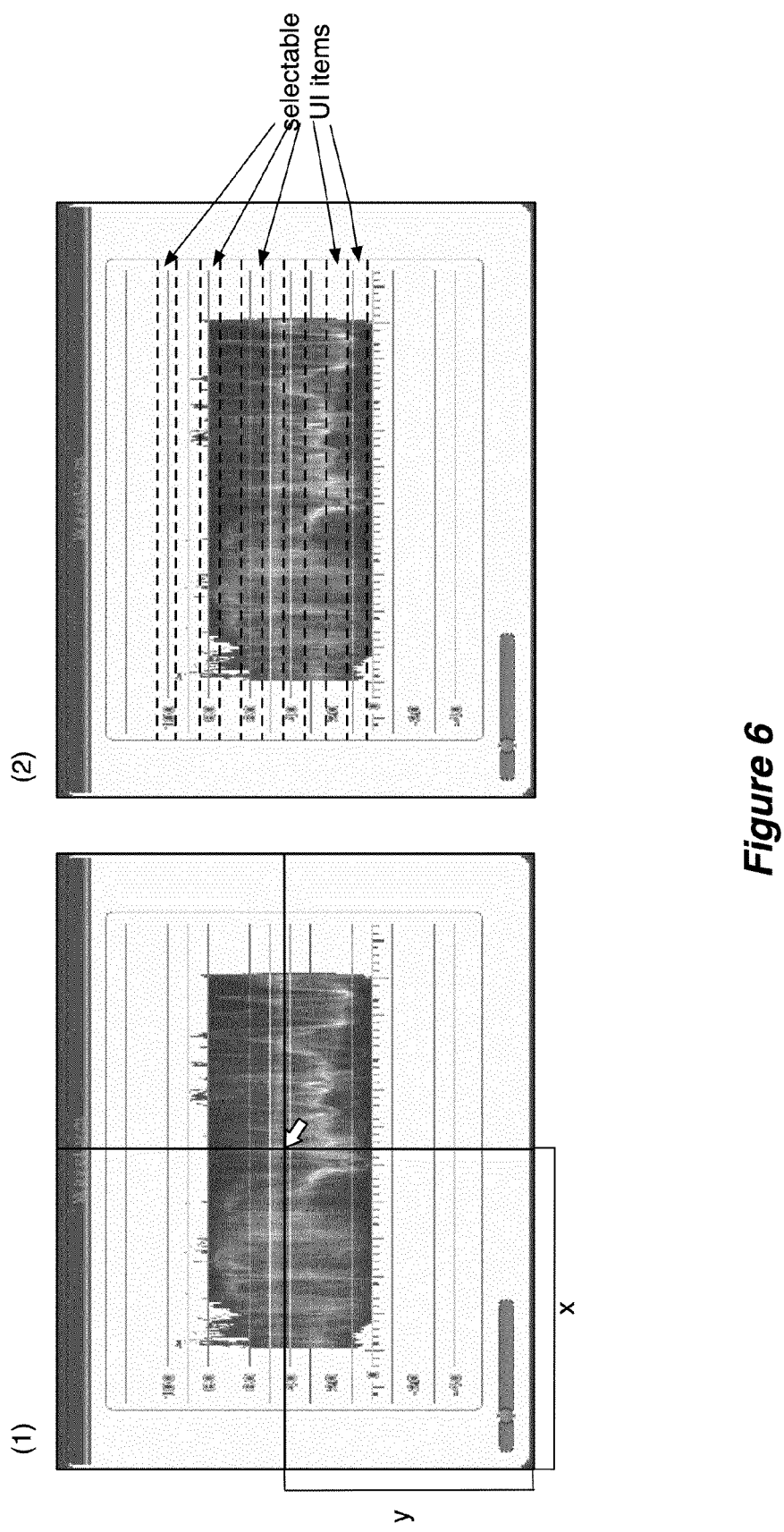
FIG. 6 illustrates two example user interface implementations for allowing a user to manipulate a waveform representation of the color values of an image.

FIG. 6 illustrates two different UI implementations (1) and (2) for a user to select a location on the waveform scope. In UI implementation (1), a user may select a location on the waveform scope by placing a cursor on the graph and providing an input (e.g., clicking a button of a cursor controlling device, pressing a hot key, etc. or by touching an area of a touch screen display that displays the waveform scope). In some embodiments, the media-editing application determines a position of the user input (the cursor position or the position of the touch) and corresponds that position to a location on the waveform scope. In some embodiments, the position of the user input can be determined by identifying a set of coordinates (e.g., a horizontal coordinate x and a vertical coordinate y) of the user input. In addition, the user can manipulate the waveform representation by moving the cursor (or moving the finger on the touch screen device) to a different position.

In other embodiments, the media-editing application provides several selectable UI items on the waveform scope. UI Implementation (2) illustrates an example of such an implementation. As shown, the application provides several selectable UI items on the waveform scope. The selectable UI items are horizontal slices that represent different horizontal sections on the waveform scope. Each horizontal slice corresponds to a particular luminance value or a particular range of luminance values. Under this UI implementation, a user can select a point on the waveform scope by selecting one of the selectable UI items. In addition, the user can manipulate the waveform representation by moving the selected UI item to a different vertical location on the graph.

Figure 7:
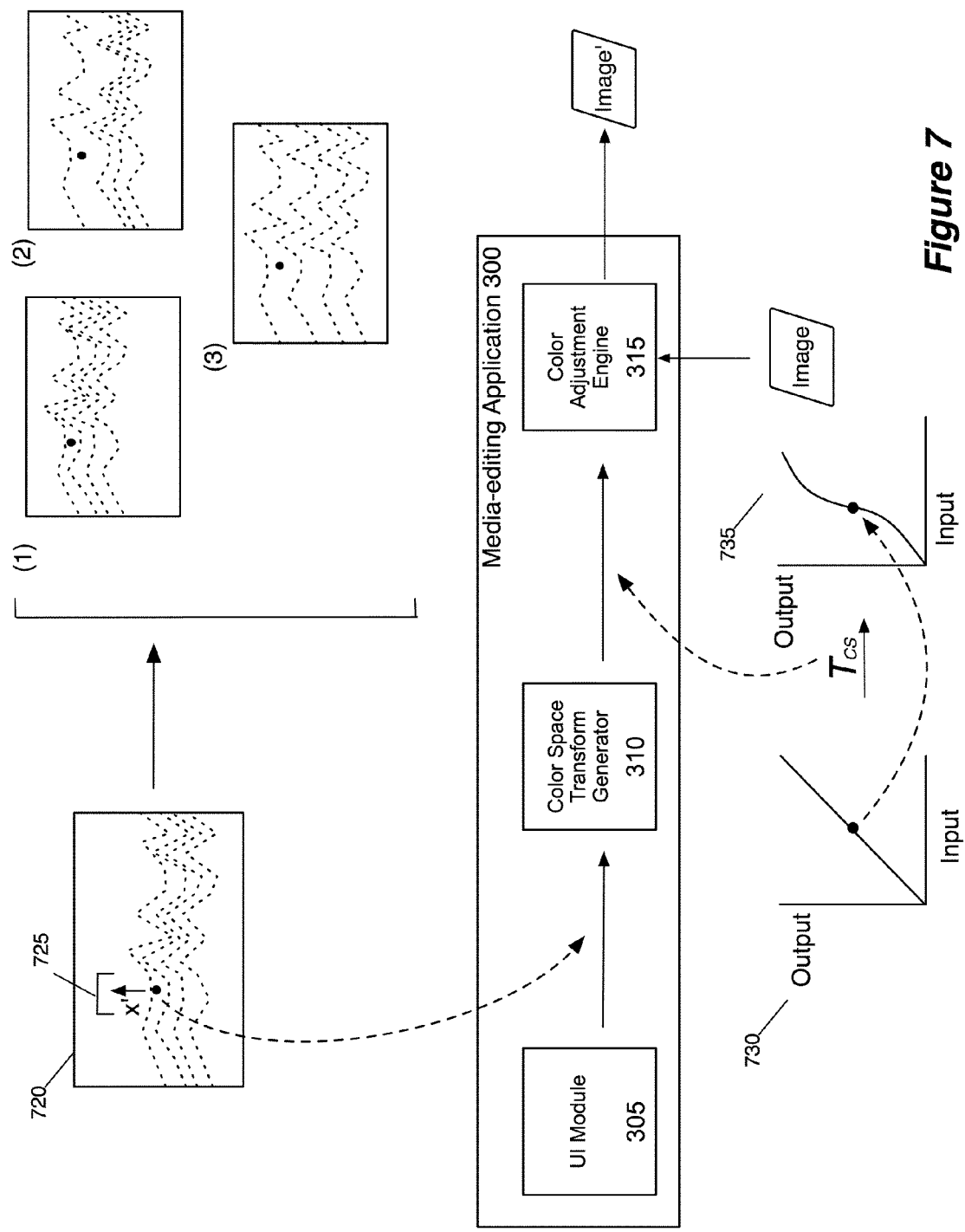
FIG. 7 conceptually illustrates a software architecture of a media-editing application of some embodiments and an example color space transform resulted from manipulation of a waveform representation.

FIG. 7 conceptually illustrates a media-editing application that provides a waveform representation of the color values of an image and allows a user to edit the image by directly manipulating the waveform representation. This figure also illustrates several alternative resulting movements of the waveform representation and an example color space transform that is generated from the manipulation of the waveform representation. As shown, the media-editing application 300 includes a UI module 305, the color space transform generator 310, and the color adjustment engine 315. The UI module 305 receives a set of inputs 725 on the waveform representation 720 and passes the inputs 725 to the color space transform generator 310. The set of inputs 725 includes selecting a location on the waveform representation and providing a vector.

The color space transform generator 310 receives the user inputs 725 and generates a transform to a color space based on the user inputs. FIG. 7 illustrates an example color space transform $T_{CS}$ resulted from the manipulation of the waveform representation 720 through the tonal graphs 730 and 735. The tonal graph is defined along two axes, a horizontal axis that specifies the original tonal values (input values), with black on the left and progressively lighter values toward the right, and a vertical axis that specifies the changed tonal values (output values), with black on the bottom and lighter values progressing to white at the top. As such, a tonal graph represents changes to the tonal (luminance) scale of a color space. The tonal graph 730 is a tonal graph of the color space prior to applying the transform $T_{CS}$ to the color space. As shown, the tonal curve of the tonal graph 730 is a straight diagonal line that maps each input luminance value to exactly the same luminance value in the output. The tonal graph 735 is a tonal graph of the color space after applying the color space transform $T_{CS}$. As shown, the color space transform warps the tonal curve of the graph 735 such that each input luminance value is mapped to a different, higher luminance output value.

FIG. 7 only illustrates one example color space transform that is generated from the user inputs 725. In this example, the color space transform warped the color space to produce the resulting tonal graph 735. However, the media-editing application of some embodiments may generate different color space transforms that produce different tonal graphs (not shown) from the same user inputs. In some embodiments, the user may specify a particular color space transform by providing additional input, such as a hot key or an addition mouse click.

Different color space transforms also cause the waveform representation to be modified differently. FIG. 7 shows three different example modifications to the waveform representation based on three different color space transforms resulted from the user inputs 725. In example (1), the entire waveform representation shifts upward. In other words, the luminance value of every pixel is increased by the same amount. In example (2), only the portion of the waveform representation around the point selected by the user skews upward. In example (3) the entire waveform representation shifts and skews upward, where the portion of the representation closer to the point selected by the user is moved by a larger amount than the portion further away from the selected point.

Figure 8:
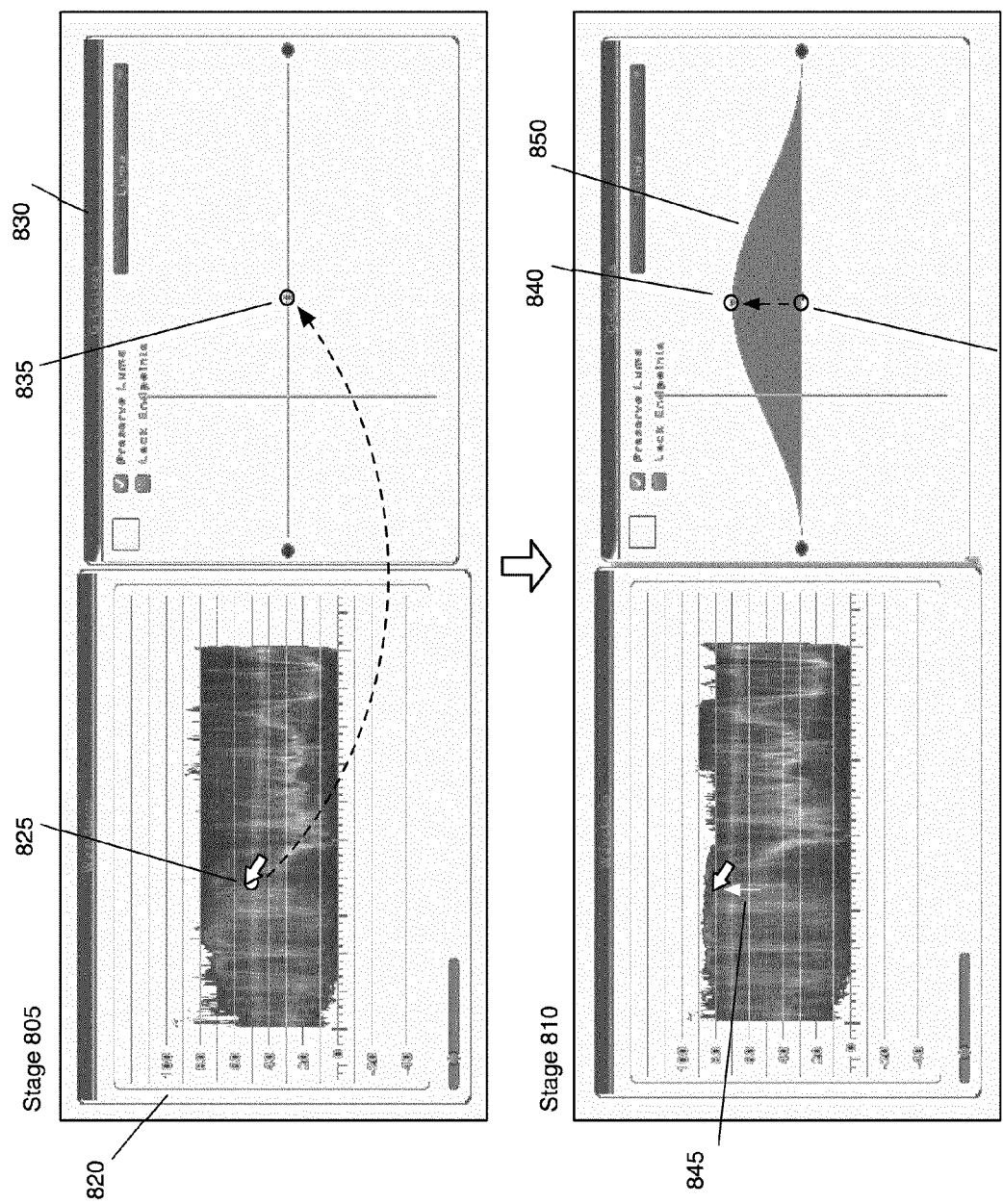
FIG. 8 illustrates an example of generating a Gaussian curve based on a manipulation of a waveform representation of the color values of an image.

To generate a color space transform from the waveform manipulation, the application of some embodiments first identifies a particular luminance value that corresponds to the selected location on the waveform scope and uses the vector input to determine an adjustment to the particular luminance value. The application then uses the particular luminance value adjustment to determine adjustments to the other luminance values defined within the color space. In some embodiments, the media-editing application constructs a blended Gaussian curve to determine amounts of adjustment to be applied to each luminance value based on the user inputs. The Gaussian curve is a symmetrical bell shaped curve that identifies an amount of adjustment to be applied to each color value represented in the graphical representation. FIG. 8 conceptually illustrates, in two stages, an example Gaussian curve that is generated based on a set of user inputs provided on a waveform representation. As shown, FIG. 8 includes a waveform representation 820 of the color values of an image (not shown) and a graph 830. The graph 830 is defined along two axes, a horizontal axis that specifies luminance values, with smaller luminance values on the left and progressively higher luminance values toward the right, and a vertical axis that specifies different amounts of adjustments. In the first stage 805, since the user has not provided any inputs on the waveform representation, the graph 830 shows a flat line, indicating that no change is applied to any luminance values.

When the user selects a location 825 on the waveform representation, the media-editing application translates the selected location 825 to a particular luminance value and identifies a horizontal location 835 on the graph 830 that corresponds to the particular luminance value.

In the second stage 810, the user has moved the cursor upward to provide a vector 845 on the waveform representation 820. Based on the selected point and the cursor movement, the media-editing application of some embodiments generates a Gaussian curve 850 on the graph 830. A Gaussian curve is a symmetrical bell-shaped curve that is generated using a Gaussian function $$f(x) = ae^{-\frac{(x-b)^2}{2c^2}},$$

whereas parameter "a" represents the height of the curve's peak (i.e., the highest point on the Gaussian curve), parameter "b" represents the position of the center of the peak, and parameter "c" controls the width of the "bell". The application determines the center of the peak (i.e., parameter "b") based on the user's selected location on the histogram 825. The application also determines the height of the peak (i.e., parameter "a") based on the user's vector input 845 on the histogram 825. Different embodiments construct the Gaussian curves with different widths by using different values for the parameter "c" in the Gaussian function. For example, the application of some embodiments may use a larger "c" value (e.g., 0.8) to construct a Gaussian curve with a wide width and the application of other embodiments may use a smaller "c" value (e.g., 0.2) to construct a Gaussian curve with a narrow width.

Figure 9:
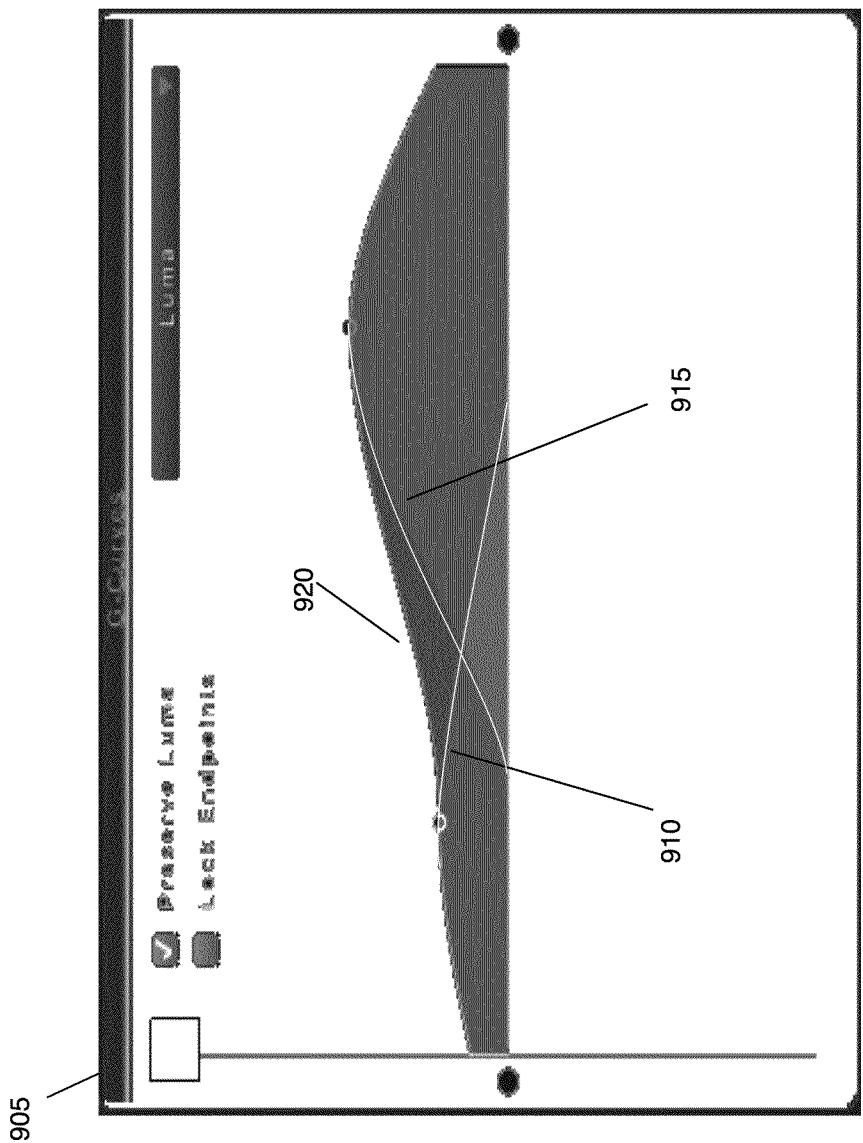
FIG. 9 illustrates an example of a blended Gaussian curve.

The application may also blend this newly constructed Gaussian curve with any existing Gaussian curves that were constructed based on previously provided input to create a blended Gaussian curve. FIG. 9 illustrates an example blended Gaussian curve 920 on the graph 905. As shown in the figure, two different Gaussian curves 910 and 915 have been created on the graph 905. The application of some embodiments blend the two curves 910 and 915 by adding the values of the two curves to create the blended curve 920. Using this blended Gaussian curve, the application identifies different amounts of adjustment to be applied to different color values in the image.

In some embodiments, the application translates the amount of adjustment for each luminance value to a set of adjustments that is applied to the different color component values defined within the color space. For example, when the color values of the image are defined in the RGB color space (wherein each color is represented by a combination of a red value, a green value, and a blue value), the application may translate an adjustment to each luminance value to a set of adjustments to a red value, a green value, and a blue value so that the adjustments can be directly applied to the color values of the image.

Figure 10:
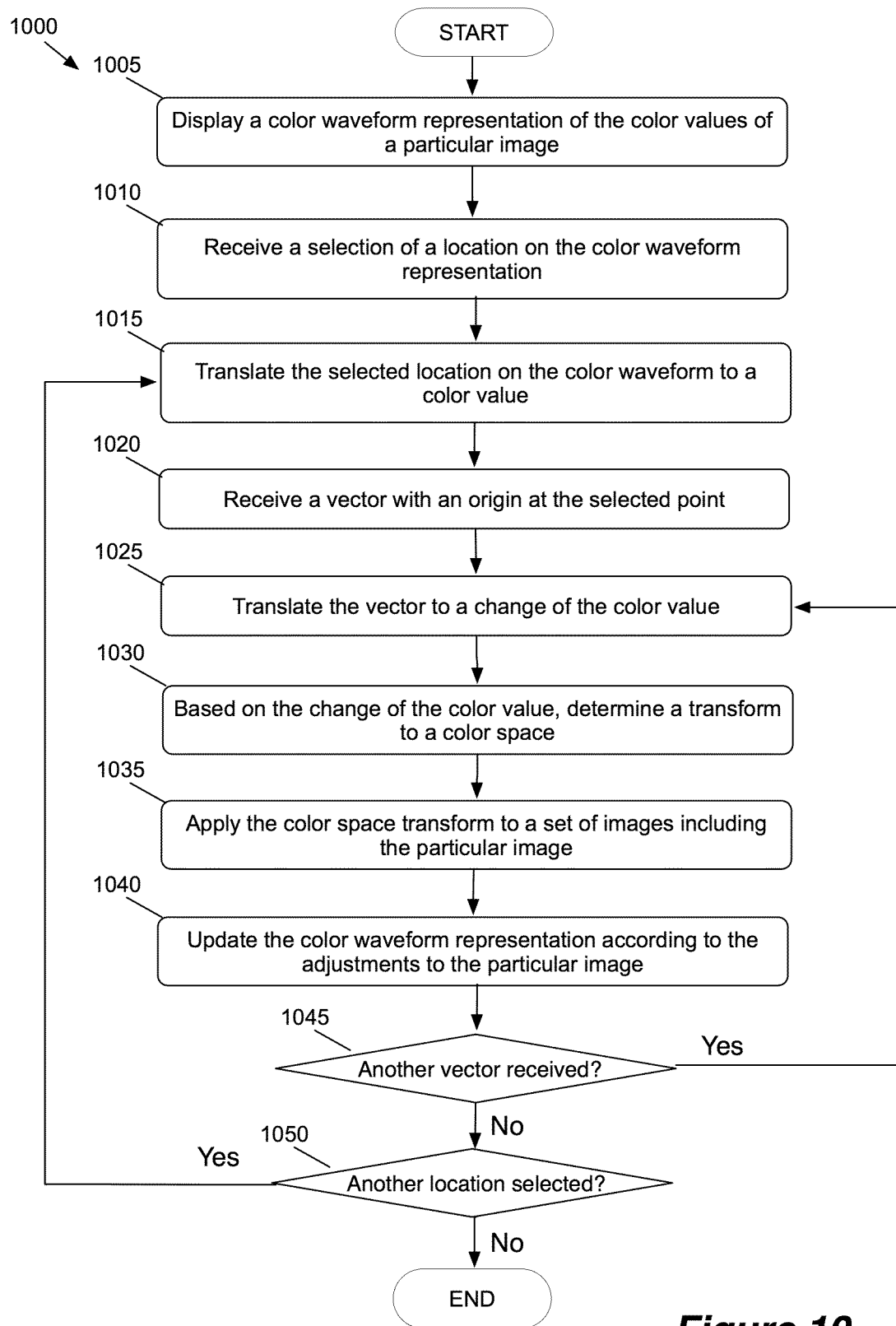
FIG. 10 conceptually illustrates a process of some embodiments for editing an image when a user directly manipulates the waveform representation of the color values of the image.

FIG. 10 conceptually illustrates a process 1000 that is performed by a media-editing application of some embodiments for editing an image based on a direct manipulation on a waveform representation of the color values of the image. The process begins by displaying (at 1005) a waveform representation of the color values of a particular image on the GUI of the media-editing application.

Next, the process receives (at 1010) a selection of a location on the waveform representation. As mentioned above, a user may select a location on the waveform representation by placing a cursor at a desired location on the waveform representation and providing an input (e.g., clicking on the cursor controlling device, pressing a hot key, etc. or touching an area on a touch screen device that displays the waveform representation).

After the process has received a selected location on the waveform representation, the process translates (at 1015) the selected location to a luminance value. In some embodiments, the luminance value is determined based on the vertical position (e.g., the vertical coordinate y) of the selected location on the waveform representation.

The process then receives (at 1020) a vector input from the user on the waveform representation. In some embodiments, the user may provide the vector input by dragging a cursor or moving a finger on a touch screen device. Next, the process translates (at 1025) the vector input to a change of the luminance value. In some embodiments, the direction of the vector is used to determine an increase or a decrease of the luminance value and the magnitude of the vector is used to determine an amount of change to the luminance value.

Then, the process determines (at 1030) a transform to a color space based on the change of the luminance value. In some embodiments, the color space transform is determined based on a Gaussian curve that is constructed in a manner as illustrated above by reference to FIG. 8. In some embodiments, the Gaussian curve is constructed by using the change of the color value as a parameter.

After the color space transform is determined, the process applies (at 1035) the color space transform to a set of images including the particular image. In some embodiments, the set of images are picture frames of a video clip. In other embodiments, the set of images only includes the particular image.

Next, the process updates (at 1040) the waveform representation according to the adjustments to the particular image. As mentioned above, different color space transforms cause different modifications to the waveform representation. Depending on the particular color space transform that was generated, the waveform representation may be updated in different manners. The process then determines (at 1045) if another vector input is received on the waveform representation. If another vector input is received, the process returns to 1025 to translate the new vector to a change of the color value, and will cycle through operations 1025-1045 until no more vector inputs are received on the waveform representation. If no more vector inputs are received, the process determines (at 1050) if another location on the waveform representation is selected. If another location on the waveform representation is selected, the process returns to 1015 to translate the selected location to a color value, and will cycle through operations 1015-1050 until no more location is selected on the waveform representation. Then the process ends.

II. Directly Manipulating a Vectorscope Representation

Section I above described editing an image by directly manipulating a waveform representation of the image. This section describes details of editing an image by directly manipulating a vectorscope representation of the image.

Figure 11:
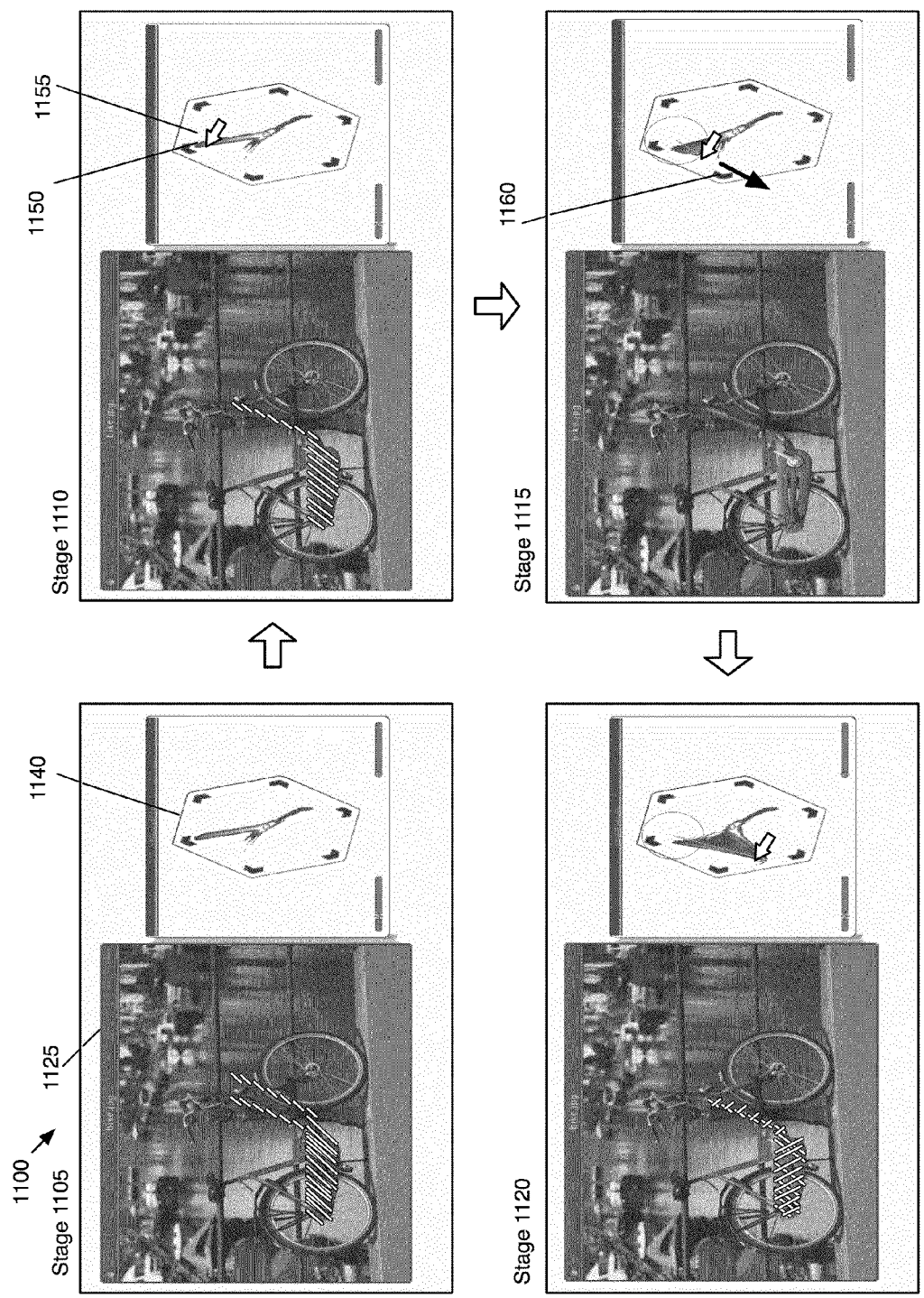
FIG. 11 illustrates an example of editing an image when a user directly manipulates a vectorscope representation of the color values of the image.

FIG. 11 illustrates an example GUI that provides a vectorscope representation of the color values of an image and allows a user to edit the image by directly manipulating the vectorscope representation. Specifically, FIG. 11 illustrates the image-editing operation at four different stages 1105, 1110, 1115, and 1120. Each of these stages will be described in more detail below.

As shown in FIG. 11, the GUI 1100 illustrates an image 1125 and a vectorscope representation 1140 of the color values of the image 1125. As mentioned, a vectorscope shows a distribution of chrominance values (e.g., color shades, color intensity, etc.) of different pixels in the image. Specifically, a vectorscope shows the distribution of the chrominance values using a two-dimensional polar graph. As such, each point in the vectorscope can be defined by a set of Polar coordinates (r, θ). The degree "θ" specifies color shades. Starting at the twelve o'clock position of the vectorscope going clockwise, the different color shades that are represented in the vectorscope include magenta, blue, cyan, green, yellow, and red. The radius "r" of the vectorscope specifies the intensity (i.e., the saturation) of the color. In other words, a position that is farther away from the center of the vectorscope corresponds to a more intensed and saturated color than a position that is closer to the center.

The image editing operation will now be described by reference to the state of the GUI 1100 during the four stages 1105, 1110, 1115, and 1120. The first stage 1105 illustrates the GUI 1100 of the media-editing application when the image 1125 is opened. As shown, the image 1125 and the vectorscope representation 1140 of the color values of the image 1125 are displayed in the GUI 1100. The image 1125 is a picture of a bicycle that is red in color, as indicated by the diagonal lines on top of the bicycle. As the dominant colors of the image 1125 are black, white, red, blue and yellow, the vectorscope representation 1140 shows a high concentration in the middle, the red, the yellow, and the blue sections.

The second stage 1110 illustrates the GUI 1100 after the user has initiated the image editing operation by selecting a location on the vectorscope representation 1140. The selection of a location on the vectorscope representation 1140 may be performed by placing a cursor at a desired location on the vectorscope representation 1140 and providing an input (e.g., clicking on the cursor controlling device, pressing a hot key, etc. or touching an area on a touch screen device that displays the vectorscope representation 1140). As shown, the user selects a location 1150 on the vectorscope representation 1140 by placing a cursor K55 over the location 1150. The selected point 1150 corresponds to a highly saturated red color. Although the user in this example has selected a location on the graph 1140 that overlaps with an area that represents the color values of the image 1125, the user may also select a location on the graph 1140 that does not overlap with such an area in order to initiate the image editing operation.

The third stage 1115 illustrates the GUI 1100 after the user has provided a vector input on the vectorscope representation 1140. In some embodiments, the user can provide a vector input by moving the cursor (or the finger on a touch scree device) to a different location. As shown, the user has started to move the cursor 1155 toward the bottom left of the graph (toward the orange section of the vectorscope), as indicated by the arrow 1160. Based on the selected point on the graph and the vector input, the application of some embodiments generates a color space transform. The color space transform maps colors defined within the color space in which the color values of the image are defined to a different set of colors.

As shown in the stage 1115, the application edits the image 1125 according to the color space transform that is generated based on the user inputs. In particular, the pixels in the image 1125 with various shades of red color have turned into orange (as indicated by the disappearance of the diagonal lines), as a result of the user's manipulation of the vectorscope representation 1140.

The fourth stage 1120 illustrates the GUI 1100 after the user has completed the image editing operation. As shown, the user has moved the cursor 1155 further down toward the green section of the vectorscope. In some embodiments, the application generates a new color space transform based on the new movement of the cursor 1155. This new color space transform is then applied to the image 1125. As shown, the pixels in the image 1125 that were originally red and yellow have turned green (as indicated by the cross hatching on the bicycle), as a result of the cursor movement on the vectorscope representation 1140.

In the above example, the application continuously generates a new color space transform as the cursor moves from one location to another location. In some embodiments however, the application may generate a new color space transform only when the application detects that the cursor has stopped moving for a predetermined period of time.

Figure 12:
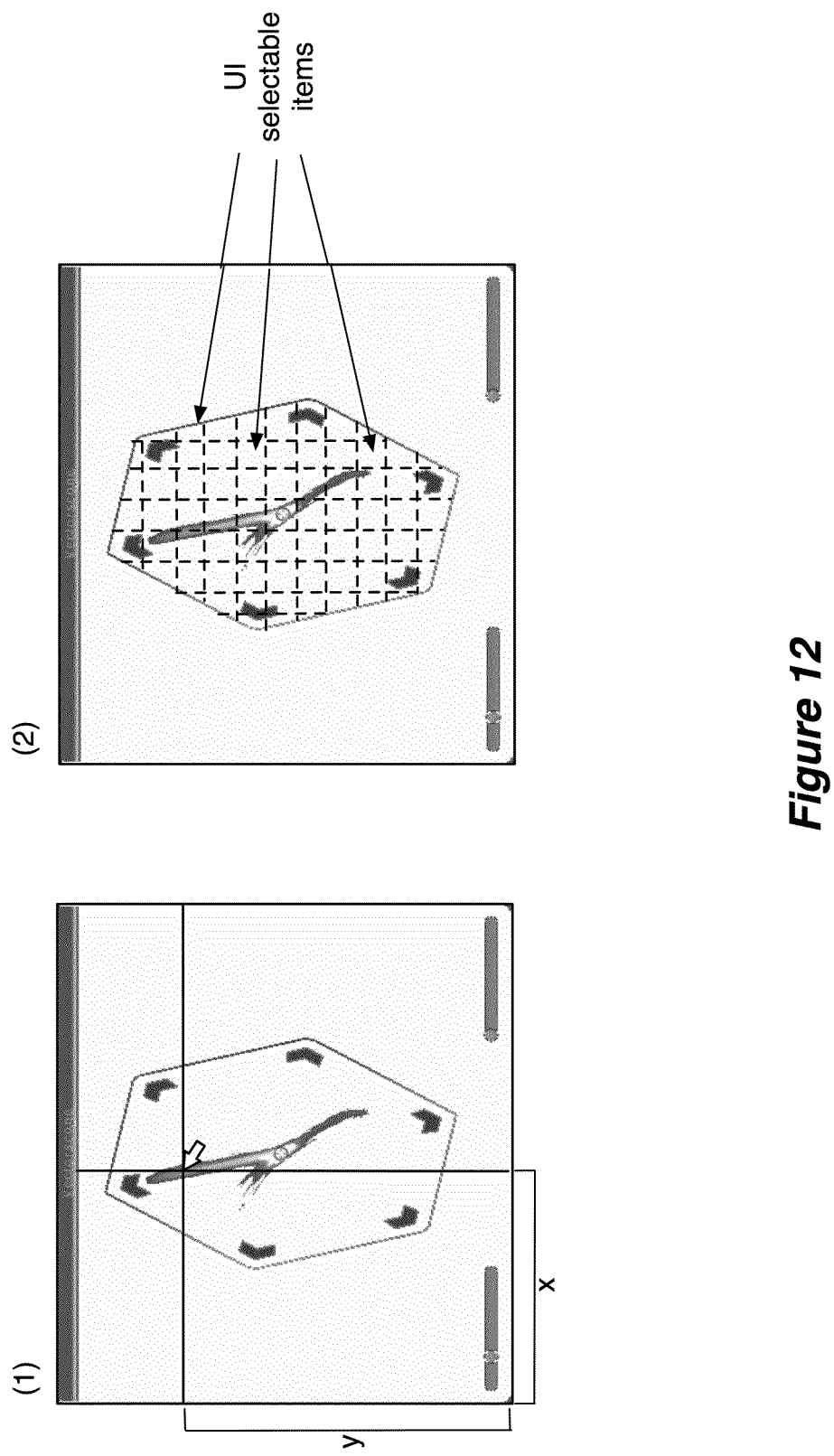
FIG. 12 illustrates two example user interface implementations for allowing a user to manipulate a vectorscope representation of the color values of an image.

FIG. 12 illustrates two different UI implementations (1) and (2) for a user to select a point on the vectorscope. In UI implementation (1), a user may select a location on the vectorscope by placing a cursor on the graph and providing an input (e.g., clicking a button of a cursor controlling device, pressing a hot key, etc., or by touching an area of a touch screen display that displays the vectorscope). In these embodiments, the media-editing application determines the position of the user input (the cursor position or the position of the touch) and corresponds that position to a location on the vectorscope. In some embodiments, the position of the user input can be determined by identifying a set of coordinates (e.g., a horizontal coordinate x and a vertical coordinate y) of the user input. In addition, the user can manipulate the vectorscope representation by moving the cursor (or moving the finger on the touch screen device) to a different position.

In other embodiments, the media-editing application provides several selectable UI items on the vectorscope. UI Implementation (2) illustrates an example of such an implementation. As shown, the application provides several selectable UI items on the vectorscope. The selectable UI items represent different sections on the vectorscope. Each UI item corresponds to a particular set of chrominance values within a color space. Under this UI implementation, a user can select a point on the vectorscope by selecting one of the selectable UI items. In addition, the user can manipulate the waveform representation by moving the selected UI item to a different location on the vectorscope.

Figure 13:
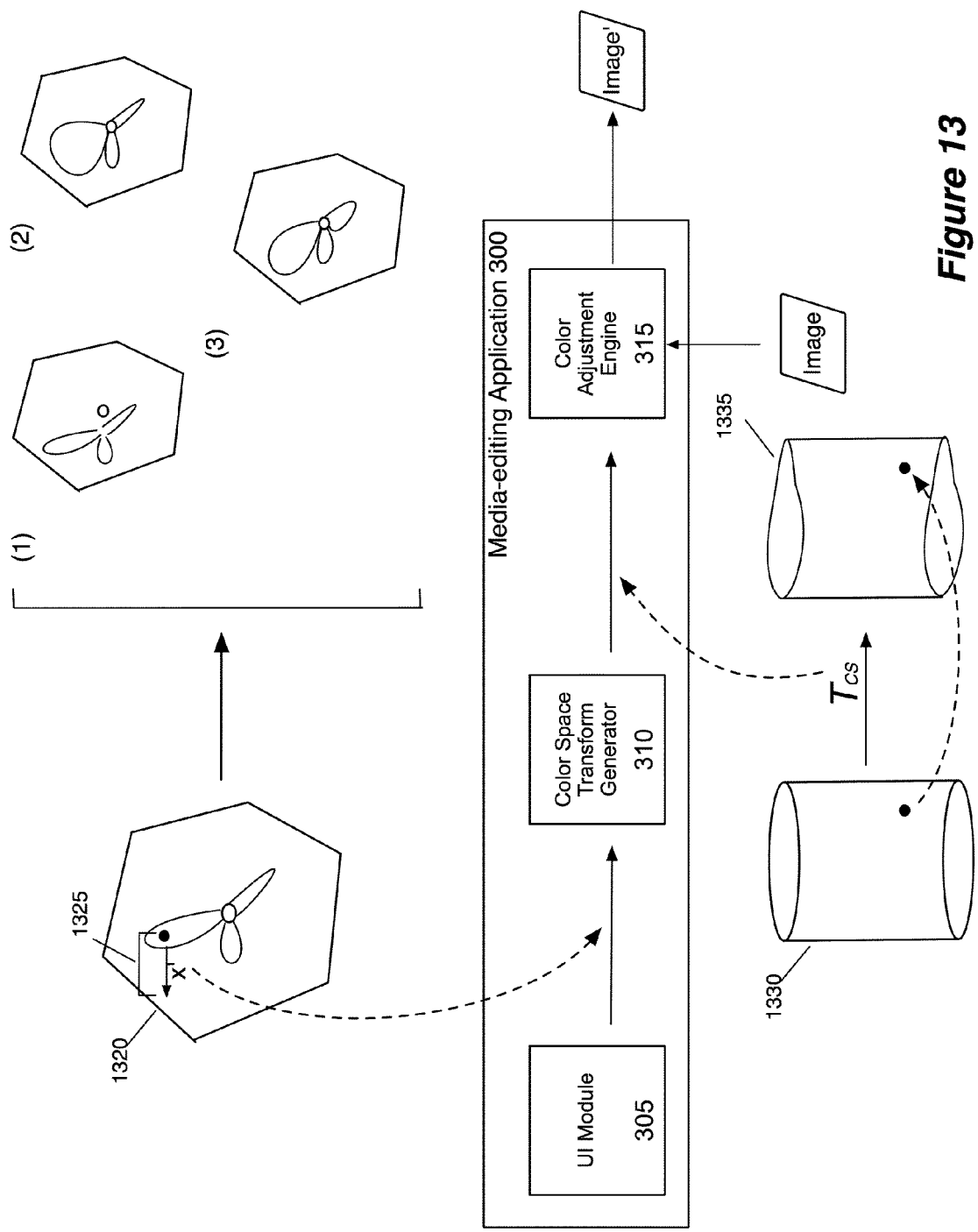
FIG. 13 conceptually illustrates a software architecture of a media-editing application of some embodiments and an example color space transform resulted from manipulation of a vectorscope representation.

FIG. 13 conceptually illustrates a media-editing application that provides a vectorscope representation of the color values of an image and allows a user to edit the image by directly manipulating the vectorscope representation. This figure also illustrates several alternative resulting movements of the vectorscope representation and an example color space transform that is generated from the manipulation of the vectorscope representation. As shown, the media-editing application 300 is identical to the application 300 of FIG. 3. The application 300 includes a UI module 305, the color space transform generator 310, and the color adjustment engine 315. The UI module 305 receives a set of inputs 1325 on the vectorscope representation 1320 and passes the inputs 1325 to the color space transform generator 310. The set of inputs 1325 includes selecting a point on the vectorscope representation and providing a vector.

The color space transform generator 310 receives the user inputs 1325 and generates a transform to a color space based on the user inputs. In this example, since the vectorscope representation 1320 presents two dimensions (e.g., color hue and color intensity) of the color values of the image, the color space transform is also two-dimensional. As shown in the figure, the original color space is depicted as a cylinder 1330 for illustrative purposes. Each dimension of the cylinder 1330 (e.g., the radius, the circumference, and the height) corresponds to a dimension of the color space (e.g., the Y channel, Cr channel, and Cb channel in the YCrCb color space). A cylinder 1335 depicts the color space after the color space has been warped or modified by the color space transform $T_{CS}$. In this example, the color space transform $T_{CS}$ modifies two dimensions of the color space.

FIG. 13 only illustrates one example color space transform that is generated from the user inputs 1325. In this example, the color space transform warped the color space to produce the resulting color space 1335. However, the media-editing application of some embodiments may generate different color space transforms from the same user inputs. In some embodiments, the user may specify a particular color space transform by providing additional input, such as a hot key or an addition mouse click.

Different color space transforms also cause the vectorscope representation to be modified differently. FIG. 13 shows three different example modifications to the vectorscope representation based on three different color space transforms resulted from the user inputs 1325. In example (1), the entire vectorscope representation shifts to the left. In other words, a same amount of changes is applied to each color. In example (2), only the portion of the vectorscope representation around the point selected by the user skews to the left. In example (3), the entire vectorscope representation shifts and skews to the left, where the portion of the representation closer to the point selected by the user is moved by a larger amount than the portion further away from the selected point.

Figure 14:
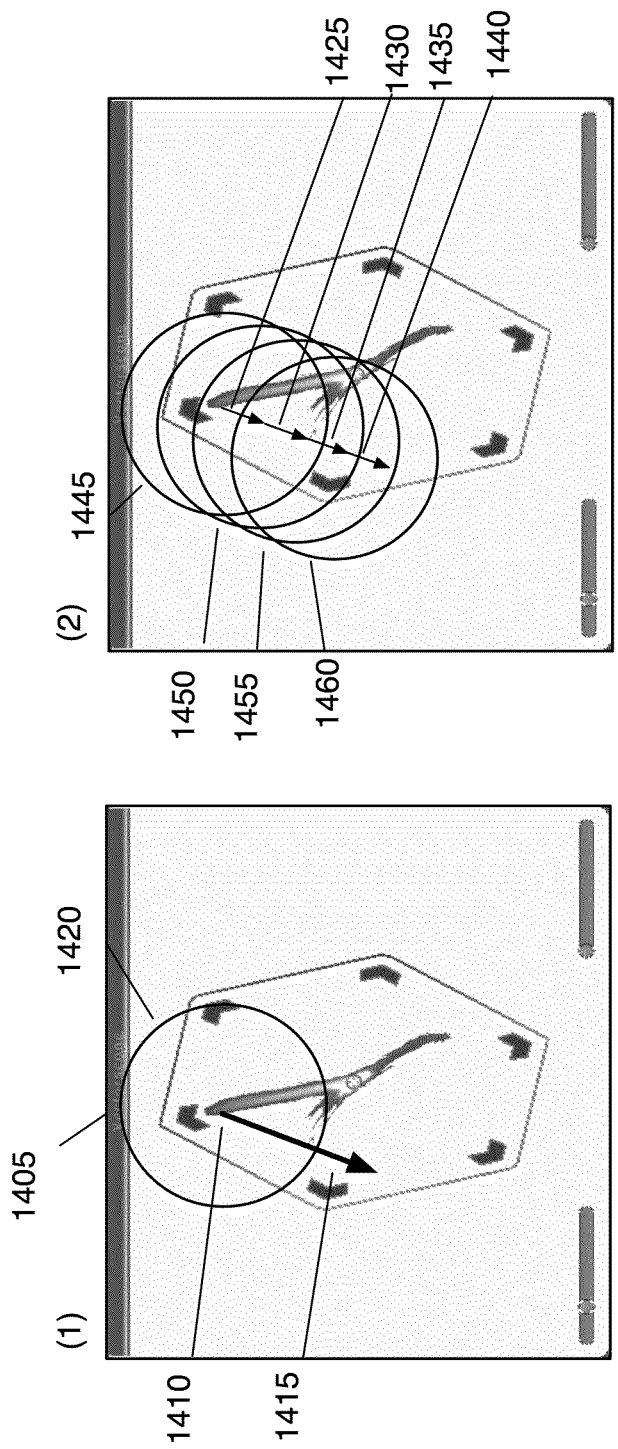
FIG. 14 illustrates two examples of falloff regions created based on a vector input on a vectorscope representation of an image's color values FIG. 15 conceptually illustrates a process of some embodiments for creating step vectors from a vector input on a vectorscope representation of an image's color values.

To generate a color space transform from the vectorscope manipulation, the application of some embodiments first identifies a particular color value that corresponds to the selected location on the vectorscope and uses the vector input to determine an adjustment to the particular color value. The application then uses the particular color value adjustment to determine adjustments to the other color values defined within the color space. In some embodiments, the media-editing application determines the adjustments to the other color values based on how close the other color values are to the particular color value on the vectorscope. That is, larger adjustments will be applied to the color values that are closer to the particular color value on the vectorscope and smaller adjustments will be applied to the color values that are farther away from the particular color value on the vectorscope. FIG. 14 illustrates an example of this implementation. As shown in example (1), after a user has selected a location 1410 and provided a vector 1415 on a vectorscope 1405, the application creates a falloff region 1420 on the vectorscope 1405. Specifically, the falloff region 1420 has a center at the selected location 1410. The application determines an amount of adjustment to be applied to each color value based on the location of the color values within the falloff region. In these embodiments, the application applies 100% of the particular color value adjustment to the color value that is located at the center of the falloff region 1420. The application then applies only a percentage of the particular color value adjustment to the other color values, based on how close the color value is to the center of the falloff region. For example, the application may apply 90% of the particular color value adjustment to a color that is located within 10% of the total radius in the falloff region. The application may also apply no adjustment to color values that are located outside of the falloff region.

In addition to using the falloff region, the media-editing application of some embodiments uses a fluid model to determine the adjustments to the other color values. Under this fluid model, the application divides the vector input that is provided on a vectorscope into several smaller vectors. The application then determines the adjustments to the color values as if the smaller vectors are provided to the vectorscope one at a time. Example (2) of FIG. 14 illustrates such an implementation after the user has provided a vector 1415 on the vectorscope 1405. As shown, the application divides the vector input 1415 into several smaller vectors 1425-1440 and creates a falloff region (1445-1460) for each of the smaller vectors. The application then determines the adjustment to the color values in the same manner as described above as if the smaller vectors 1425-1440 are provided on the vectorscope consecutively. By splitting the vector into several smaller vectors, the application provides a smoother adjustment to the color values.

Figure 15:
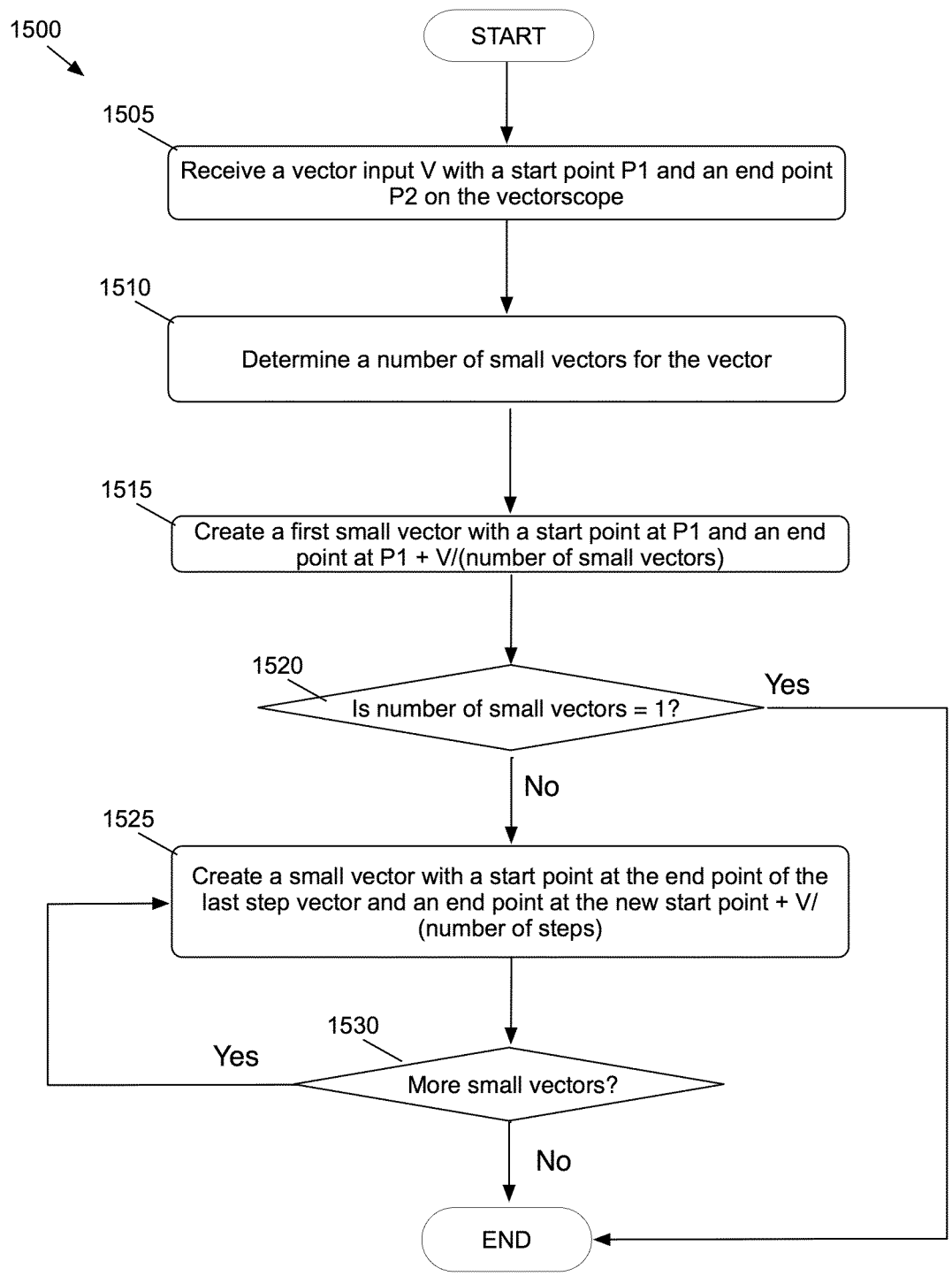

FIG. 15 conceptually illustrates a process 1500 for splitting a vector input on a vectorscope under the fluid model. In some embodiments, the process 1500 is performed by the media-editing application immediately after a user provides a vector input on a vectorscope representation of an image's color values. Thus, the process begins by receiving (at 1505) a vector input V with a start point P1 and an end point P2 on the vectorscope representation. Then the process determines (at 1510) the number of small vectors for the vector input.

Different embodiments use different technique to determine the number of small vectors for a vector input. For instance, the application of some embodiments splits the vector based on the magnitude (i.e., the length) of the vector. In these embodiments, the application determines a number of small vectors by determining a smallest integer multiplier of a predetermined number (e.g., 0.1) that would yield a number equal to or greater than the magnitude of the vector. For example, if the magnitude of the vector is 0.5, the smallest integer multiplier of 0.1 (the predetermined number) that would yield a number equal to or greater than 0.5 would be 5.

Next, the process creates (at 1515) a first small vector with a start point at P1 and an end point at P1+V/(number of small vectors). The process then determines (at 1520) if the number of small vectors equals to 1. If the number of small vectors equals to 1, the process ends. However, if the number of small vectors is greater than 1 (i.e., or not equal to 1), the process continues to 1525 and creates another small vector with a start point at the end point of the last small vector and an end point at the new start point+V/(number of small vectors).

Then, the process determines (at 1530) if more small vectors need to be created. If no more small vectors are needed, the process ends. However, if more small vectors are needed, the process returns to 1525 to create another small vector, and will cycle through operations 1525-1530 until no more small vectors are needed.

Figure 16:
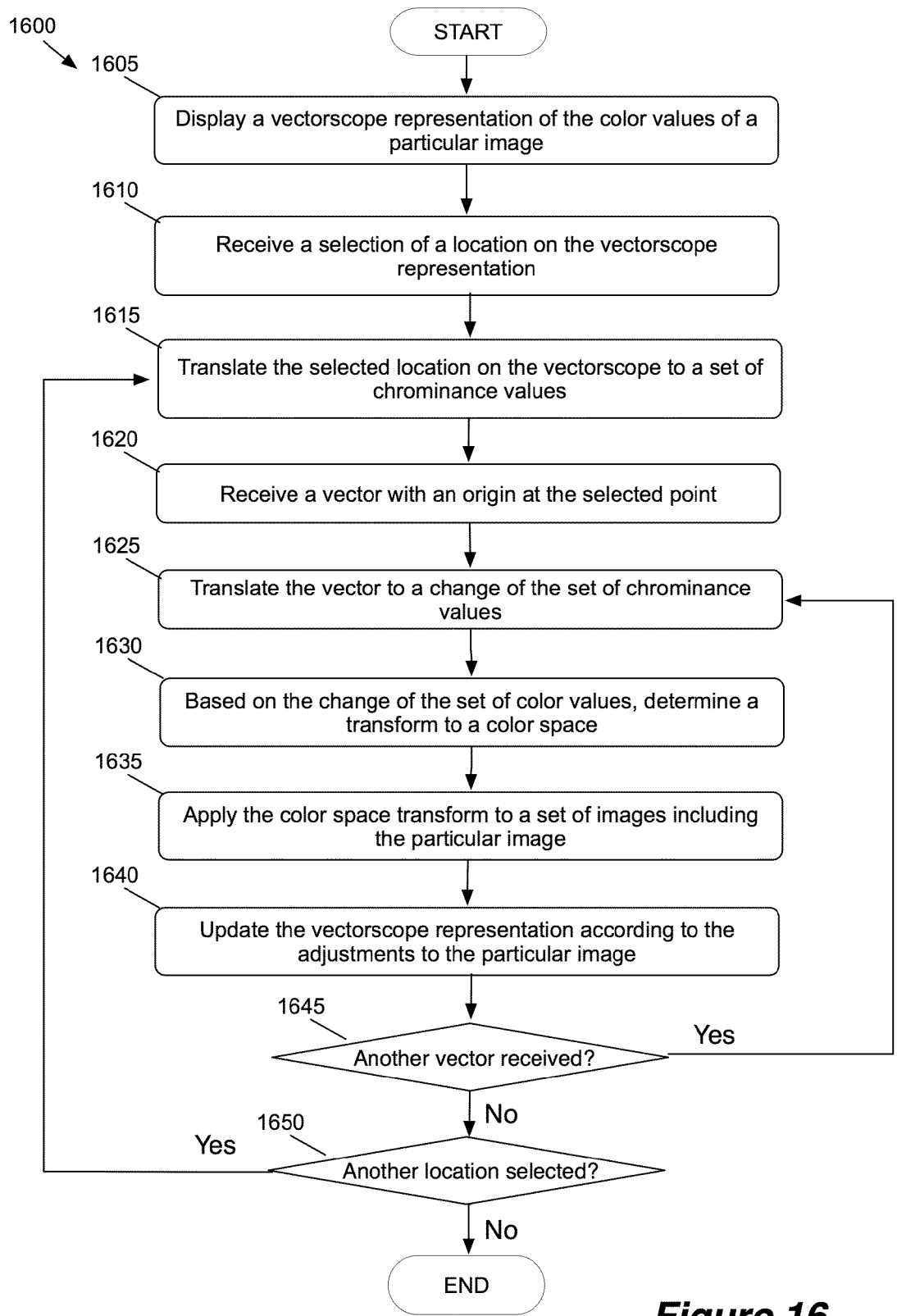
FIG. 16 conceptually illustrates a process of some embodiments for editing an image when a user directly manipulates the vectorscope representation of the color values of the image.

FIG. 16 conceptually illustrates a process 1600 that is performed by a media-editing application of some embodiments for editing an image based on a direct manipulation on a vectorscope representation of the color values of the image. The process begins by displaying (at 1605) a vectorscope representation of the color values of a particular image on the GUI of the media-editing application.

Next, the process receives (at 1610) a selection of a location on the vectorscope representation. As mentioned above, a user may select a location on the vectorscope representation by placing a cursor at a desired location on the waveform representation and providing an input (e.g., clicking on the cursor controlling device, pressing a hot key, etc. or touching an area on a touch screen device that displays the vectorscope representation).

After the process has received a selected location on the vectorscope representation, the process translates (at 1615) the selected location to a set of chrominance values. In some embodiments, the set of chrominance values is determined based on the horizontal and vertical positions (e.g., the horizontal and vertical coordinates) of the selected location on the vectorscope representation.

The process then receives (at 1620) a vector input from the user on the vectorscope representation. In some embodiments, the user may provide the vector input by dragging a cursor or moving a finger on a touch screen device. Next, the process translates (at 1625) the vector input to a change of the set of chrominance values. In some embodiments, the direction of the vector is used to determine an increase and/or a decrease of different color channel values and the magnitude of the vector is used to determine the amount of change to the set of chrominance values.

Then, the process determines (at 1630) a transform to a color space based on the change of the set of chrominance values. After the color space transform is determined, the process applies (at 1635) the color space transform to a set of images including the particular image. In some embodiments, the set of images are picture frames of a video clip. In other embodiments, the set of images only include the particular image.

Next, the process updates (at 1640) the vectorscope representation according to the adjustments to the particular image. As mentioned above, different color space transforms cause different modifications to the vectorscope representation. Depending on the color space transform that was generated, the vectorscope representation may be updated in different manners.

The process then determines (at 1645) if another vector is received on the vectorscope representation. If another vector input is received, the process returns to 1625 to translate the newly received vector input to a change of the set of chrominance values, and will cycle through operations 1625-1645 until no more vector inputs are received on the vectorscope representation. If no more vector inputs are received, the process determines (at 1650) if another location on the vectorscope representation is selected. If another location on the vectorscope representation is selected, the process returns to 1615 to receive another selection, and will cycle through operations 1615-1650 until there is no more selection provided on the vectorscope representation. Then the process ends.

When the application applies the fluid model to determine the color space transform, the application may divide the vector input into several small vectors as described above, and perform operations 1625-1645 repeatedly until all small vectors are processed.

III. Directly Manipulating a Histogram Representation

Sections I and II above described editing an image by directly manipulating a waveform and a vectorscope representation of the image. This section describes details of editing an image by directly manipulating a color channel histogram representation of the image.

A. Manipulating a Histogram Representation

Figure 17:
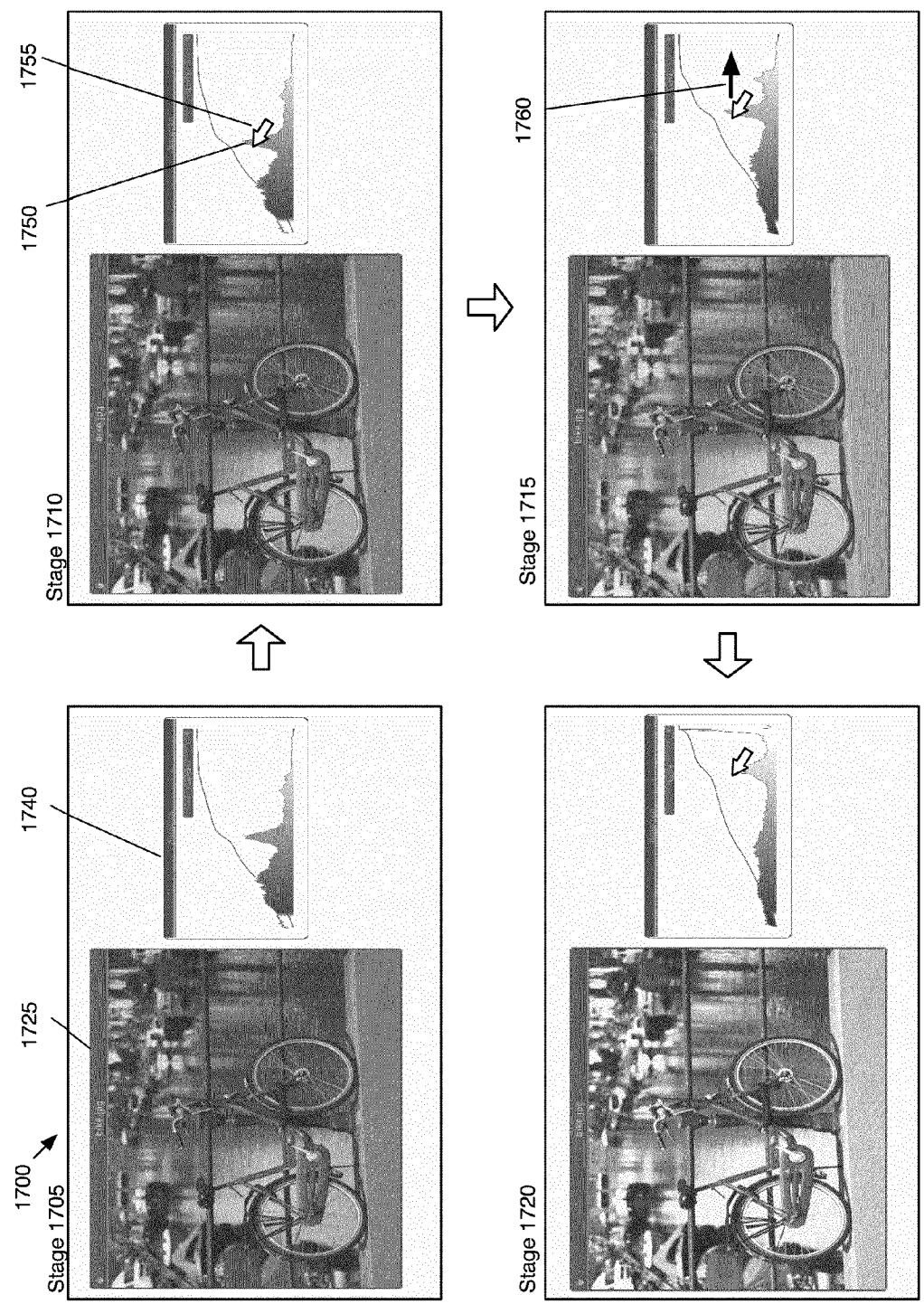
FIG. 17 illustrates an example of editing an image when a user directly manipulates a color channel histogram representation of the color values of the image.

FIG. 17 illustrates an example GUI that provides a color channel histogram representation of the color values of an image and allows a user to edit the image by directly manipulating the color channel histogram representation. Specifically, FIG. 17 illustrates the image-editing operation at four different stages 1705, 1710, 1715, and 1720. Each of these stages will be described in more detail below.

As shown in FIG. 17, the GUI 1700 includes an image 1725 and a color channel histogram representation 1740 of the color values of the image 1725. In this example, the color channel histogram 1740 shows a distribution of luminance values of different pixels across the image. Specifically, the histogram representation is defined along two axes, a horizontal axis that specifies luminance values and a vertical axis that specifies different numbers of pixels. Thus, each horizontal location of the histogram shows the number of pixels within the image having the corresponding luminance value. Although the histogram representation in this example shows a distribution of luminance values of different pixels across an image, the media-editing application of some embodiments may provide a histogram representation that shows a distribution of other channel values (e.g., red channel values, blue channel values, or green channel values, when the colors of the image are defined within a RGB color space, or Y channel) of different pixels of an image.

The image editing operation will now be described by reference to the state of the GUI 1700 during the four stages 1705, 1710, 1715, and 1720. The first stage 1705 illustrates the GUI 1700 of the media-editing application when the image 1725 is opened. As shown, the image 1725 and the color channel histogram representation 1740 of the color values of the image 1725 are displayed in the GUI 1700. The image 1725 is a picture of a red bicycle. As the image 1725 has more dark areas than bright areas, the color channel histogram 1740 shows a higher concentration of pixels with color values that have low luminance values.

The second stage 1710 illustrates the GUI 1700 after the user has initiated the image editing operation by selecting a location on the color channel histogram representation 1740. The selection of a location on the histogram 1740 may be performed by placing a cursor at a desired location on the histogram 1740 and providing an input (e.g., clicking on the cursor controlling device, pressing a hot key, etc. or touching an area on a touch screen device that displays the histogram 1740). As shown, the user selects a location 1750 on the histogram 1740 by placing a cursor 1755 over the location 1750. Although the user in this example has selected a location on the graph 1740 that overlaps with an area that represents the color values of the image 1725, the user may also select a location on the graph 1740 that does not overlap with such an area in order to initiate the image editing operation.

The third stage 1715 illustrates the GUI 1700 after the user has provided a vector on the histogram representation 1740. In some embodiments, the user can provide a vector by moving the cursor (or the finger on a touch scree device) to a different location. As shown, the user has started to move the cursor 1755 to the right, as indicated by the arrow 1760. Based on the selected location 1750 on the histogram 1740 and the movement of the cursor 1755, the application of some embodiments generates a color space transform that will be applied to the image 1725.

As shown in the stage 1715, the application edits the image 1725 according to the color space transform that is generated based on the user inputs. In particular, the entire image 1725 in this stage appears to be brighter than the image 1725 in the second stage 1710 as a result of the cursor movement.

The fourth stage 1720 illustrates the GUI 1700 after the user has completed the image editing operation. As shown, the user has moved the cursor 1755 further to the right. In some embodiments, the application generates a new color space transform based on the new movement of the cursor 1755. This new color space transform is then applied to the image 1725. As shown, the entire image 1725 appears to be even brighter than the image 1725 in the third stage 1715 as a result of the cursor movement.

In the above example, the application continuously generates a new color space transform as the cursor moves from one location to another location. In some embodiments however, the application may generate a new color space transform only when the application detects that the cursor has stopped moving for a predetermined period of time.

FIG. 18 illustrates two different UI implementations (1) and (2) for a user to select a location on the color channel histogram. In UI implementation (1), a user may select a location on the color channel histogram by placing a cursor on the graph and providing an input (e.g., clicking a button of a cursor controlling device, pressing a hot key, etc. or by touching an area of a touch screen display that displays the histogram). In these embodiments, the media-editing application determines a position of the user input (the cursor position or the position of the touch) and corresponds that position to a location on the histogram. In some embodiments, the position of the user input can be determined by identifying a set of coordinates (e.g., a horizontal coordinate x and a vertical coordinate y) of the user input. In addition, the user can manipulate the histogram representation by moving the cursor (or moving the finger on the touch screen device) to a different position.

In other embodiments, the media-editing application provides several selectable UI items on the histogram. UI Implementation (2) illustrates an example of such an implementation. As shown, the application provides several selectable UI items on the histogram representation. The selectable UI items are vertical slices that represent different vertical sections on the histogram. Each vertical slice corresponds to a particular luminance value or a particular range of luminance values. Under this UI implementation, a user can select a location on the histogram representation by selecting one of the selectable UI items. In addition, the user can manipulate the histogram representation by moving the selected UI item to a different horizontal location on the graph.

Figure 19:
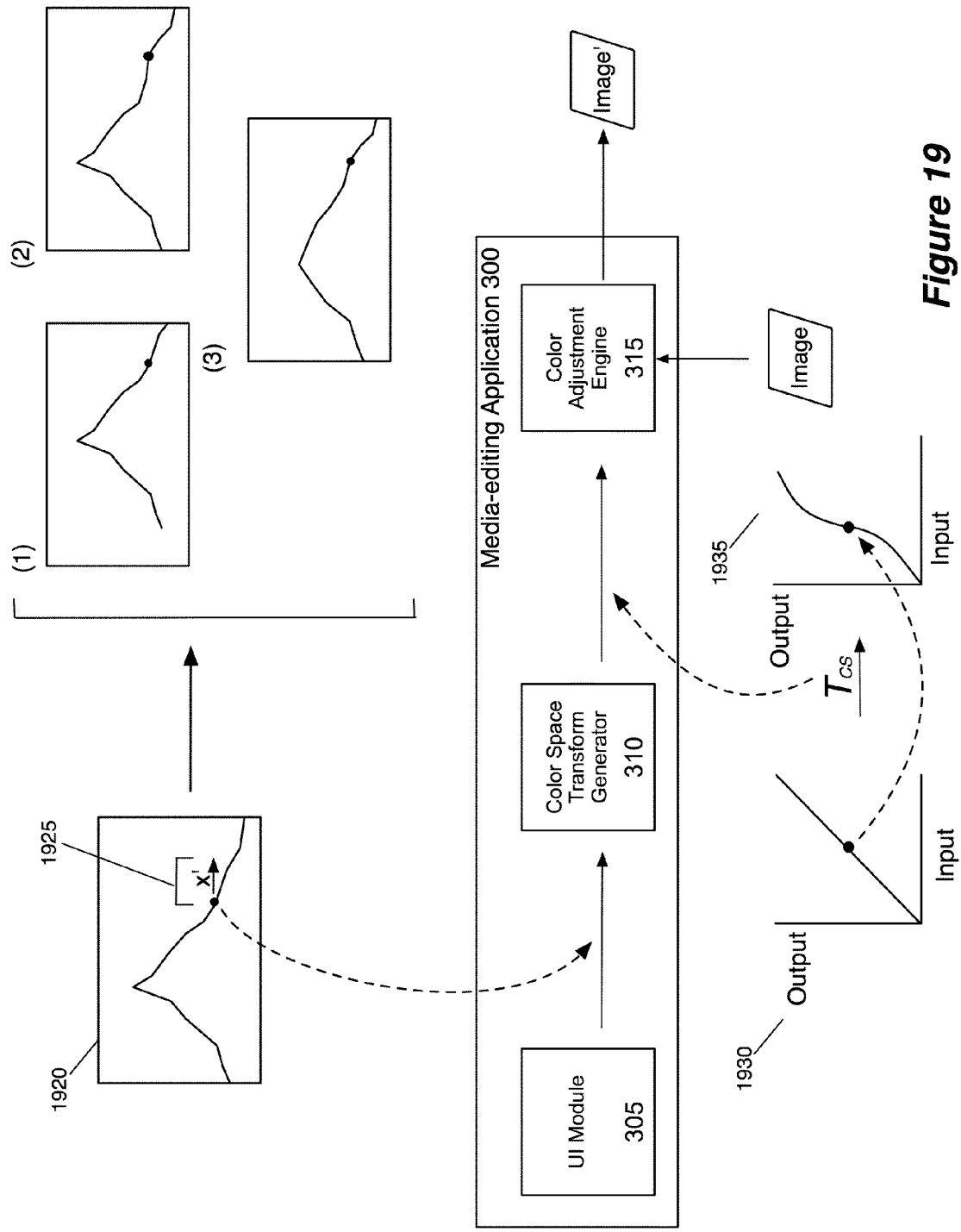
FIG. 19 conceptually illustrates a software architecture of a media-editing application of some embodiments and an example color space transform resulted from manipulation of a color channel histogram representation.

FIG. 19 conceptually illustrates a media-editing application that provides a color channel histogram representation of the color values of an image and allows a user to edit the image by directly manipulating the histogram representation. This figure also illustrates several alternative resulting movements of the histogram representation and an example color space transform that is generated from the manipulation of the histogram representation. As shown, the media-editing application 300 is identical to the application 300 of FIG. 3. The application 300 includes a UI module 305, the color space transform generator 310, and the color adjustment engine 315. The UI module 305 receives a set of inputs 1925 on the color channel histogram representation 1920 and passes the inputs 1925 to the color space transform generator 310. The set of inputs 1925 includes selecting a location on the histogram representation and providing a vector.

The color space transform generator 310 receives the user inputs 1925 and generates a transform to a color space based on the user inputs. In this example, since the histogram representation 1920 only presents one dimension (e.g., the luminance channel) of the color values of the image, the color space transform is also one-dimensional. FIG. 19 illustrates an example color space transform $T_{CS}$ resulted from the manipulation of the histogram representation 1920 through the tonal graphs 1930 and 1935. The tonal graph is defined along two axes, a horizontal axis that specifies the original tonal values (input values), with black on the left and progressively lighter values toward the right, and a vertical axis that specifies the changed tonal values (output values), with black on the bottom and lighter values progressing to white at the top. As such, a tonal graph represents changes to the tonal (luminance) scale of a color space. The tonal graph 1930 is a tonal graph of the color space prior to applying the color space transform $T_{CS}$. As shown, the tonal curve of the tonal graph 1930 is a straight diagonal line that maps each input luminance value to exactly the same luminance value in the output. The tonal graph 1935 is a tonal graph of the color space after applying the color space transform $T_{CS}$. As shown, the color space transform warps the tonal curve of the graph 1935 such that each input luminance value is mapped to a different, higher luminance output value.

FIG. 19 only illustrates one example color space transform that is generated from the user inputs 1925. In this example, the color space transform warped the color space to produce the resulting tonal graph 1935. However, the media-editing application of some embodiments may generate different color space transforms that produce different tonal graphs (not shown) from the same user inputs. In some embodiments, the user may specify a particular color space transform by providing additional input, such as a hot key or an addition mouse click.

Different color space transforms also cause the histogram representation to be modified differently. FIG. 19 shows three different example modifications to the histogram representation based on three different color space transforms resulted from the user inputs 1925. In example (1), the entire histogram representation shifts to the right. In other words, the luminance value of every pixel is increased by the same amount. In example (2), only the portion of the histogram representation around the location selected by the user skews to the right. In example (3) the entire histogram representation shifts and skews to the right, where the portion of the representation closer to the location selected by the user is moved by a larger amount than the portion further away from the selected location.

Figure 20:
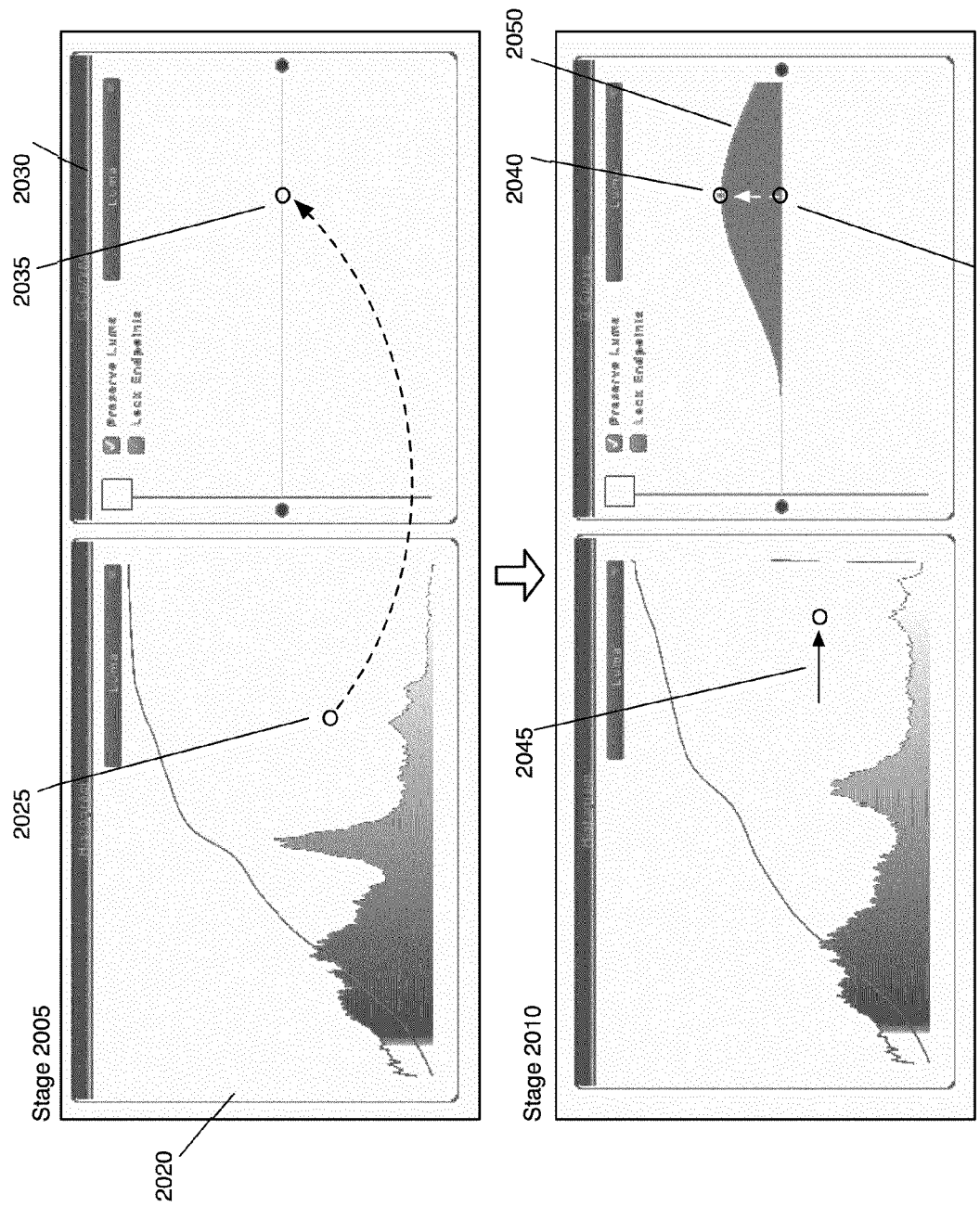
FIG. 20 illustrates an example of generating a Gaussian curve based on a manipulation of a color channel histogram representation of the color values of an image.

To generate a color space transform from the histogram manipulation, the application of some embodiments first identifies a particular color value of a color channel that corresponds to the selected location on the histogram representation and uses the vector input to determine an adjustment to the particular color value. The application then uses the particular color value adjustment to determine adjustments to the other color values of the color channel defined within the color space. In some embodiments, the media-editing application constructs a blended Gaussian curve to determine amounts of adjustment to be applied to each color value based on the user inputs. The Gaussian curve is a symmetrical bell shaped curve that identifies the amount of adjustment to be applied to each color value represented in the graphical representation. FIG. 20 conceptually illustrates an example Gaussian curve that is generated based on a set of user inputs on a color channel histogram representation. As shown, FIG. 20 includes a luminance histogram representation 2020 of the color values of an image (not shown) and a graph 2030. The graph 2030 is defined by two axes, a horizontal axis that specifies luminance values, with smaller luminance values on the left and progressively higher luminance values toward the right, and a vertical axis that specifies different amounts of adjustments that are applied to the different luminance values. In the first stage 2005, since the user has not provided any inputs on the histogram representation, the graph 2030 shows a flat line, indicating that no change is applied to any luminance values.

When the user selects a location 2025 on the histogram representation, the media-editing application translates that location to a particular luminance value and identifies a horizontal location 2035 on the graph 2030 that corresponds to the particular luminance value.

In the second stage 2010, the user has provided a vector 2045 on the histogram 2020 (e.g., by moving the cursor). Based on the selected location and the cursor movement, the media-editing application of some embodiments generates a Gaussian curve 2050 on the graph 2030. A Gaussian curve is a symmetrical bell-shaped curve that is generated using a Gaussian function $$f(x) = ae^{-\frac{(x-b)^2}{2c^2}},$$

whereas parameter "a" represents the height of the curve's peak (i.e., the highest point on the Gaussian curve), parameter "b" represents the position of the center of the peak, and parameter "c" controls the width of the "bell". The application determines the center of the peak (i.e., parameter "b") based on the user's selected location on the histogram 2025. The application also determines the height of the peak (i.e., parameter "a") based on the user's vector input 2045 on the histogram 2025. Different embodiments construct the Gaussian curves with different widths by using different values for the parameter "c" in the Gaussian function. For example, the application of some embodiments may use a larger "c" value (e.g., 0.8) to construct a Gaussian curve with a wide width and the application of other embodiments may use a smaller "c" value (e.g., 0.2) to construct a Gaussian curve with a narrow width.

The application may also blend this newly constructed Gaussian curve with any existing Gaussian curves that were constructed based on previously provided input to create a blended Gaussian curve in the same manner as described above by reference to FIG. 9. Using this blended Gaussian curve, the application identifies different amounts of adjustment to be applied to different color values in the image.

The application of some embodiments may employ a function to blend two or more basic bumps. For instance, the application may use a function $$B(t) = \sum_{i=1}^{n} f\left(1 - \frac{t - bc_i}{bw_i}\right) bh_i,$$

whereas B(t) is the composite bump from blending n bumps, t is a horizontal location of the tonal adjustment graph, bc is the baseline location of each basic bump, bw is the width of each basic bump, and bh is the height of each basic bump. That is, the composite bump's adjustment value for a particular horizontal location of the tonal adjustment graph is a sum of adjustment values of the basic bumps that are weighted for the particular horizontal location by a weighting function.

Different embodiments use different weighting functions. For instance, the application of some embodiments may use a Gaussian function, a smoothing function, a liner function, etc. More specifically, the application of some embodiments may use a function, $$f(x) = 6x^5 - 15x^4 + 10x^3$$

or a function, $$f(x) = x^2 * (3 - 2x),$$

whereas in each of these two functions, x is $$1 - \frac{t - bc_i}{bw_i}.$$

Moreover, the application of some embodiments employs a simple cubic Hermite interpolation technique or Perlin's smooth step to compute adjustment values when the adjustment values and horizontal location are of floating type. That is, when the resulting adjustment values of the composite bump do not have sufficient granularity, the application of these embodiments interpolates to generate intermediate adjustment values that have sufficient granularity.

In some embodiments, the application translates the adjustment for each luminance value to a set of adjustments that is applied to the different color channels defined within the color space. For example, when the color values of the image are defined within the RGB color space, the application may translates an adjustment for each luminance value to different adjustments to the red channel, the green channel, and the blue channel so that the adjustments can be directly applied to the color values of the image.

The example in FIG. 20 illustrates a Gaussian curve that is generated by a set of inputs provided on a luminance histogram representation. However, the application may use similar techniques to construct a Gaussian curve when the user provides a set of inputs on a different color channel histogram representation. For example, when a user provides a set of inputs on a red channel histogram representation, the application constructs a Gaussian curve that maps each red channel value to a different adjustment.

Figure 21:
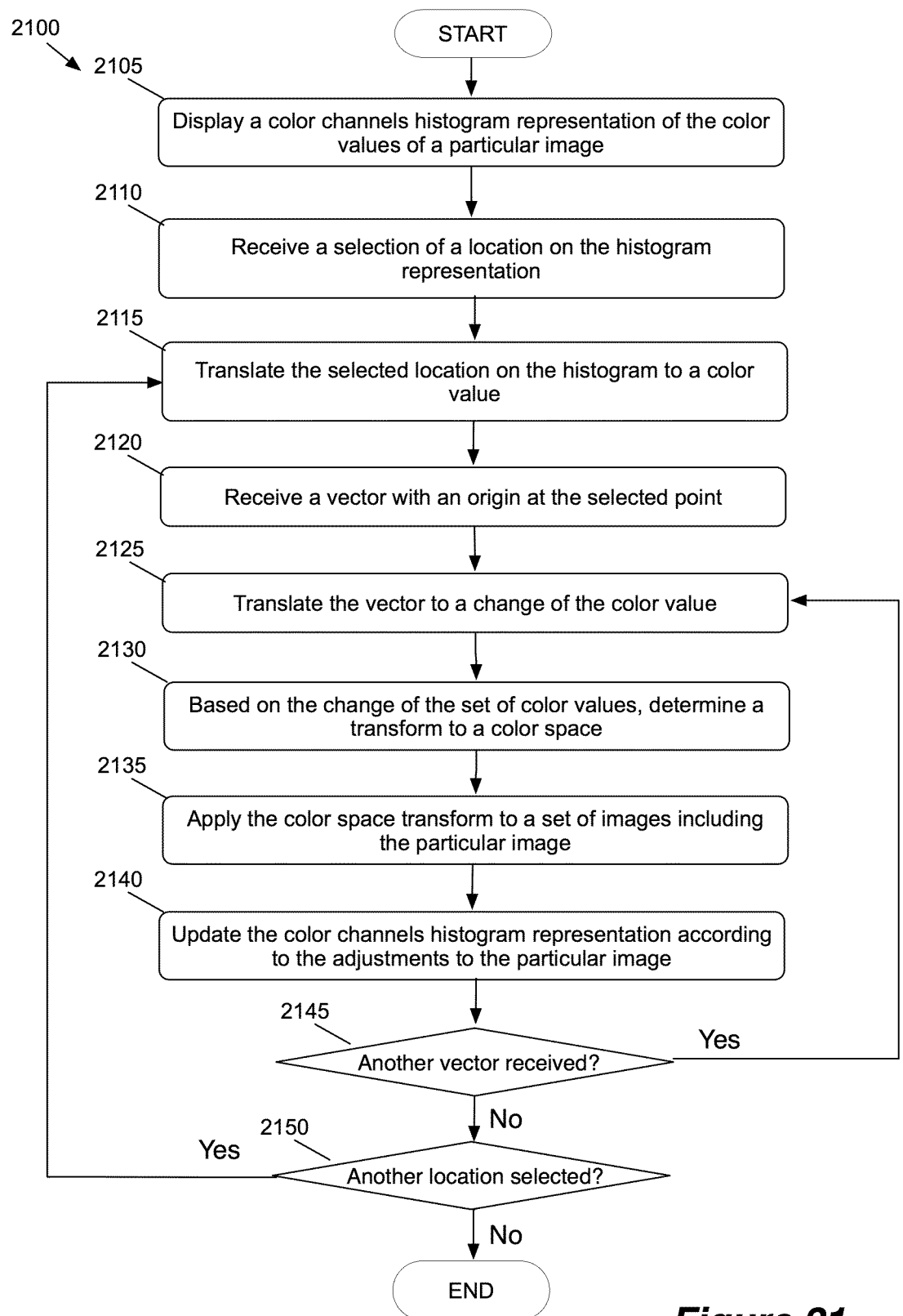
FIG. 21 conceptually illustrates a process of some embodiments for editing an image when a user directly manipulates the color channel histogram representation of the color values of the image.

FIG. 21 conceptually illustrates a process 2100 that is performed by a media-editing application of some embodiments for editing an image based on a direct manipulation on a color channel histogram representation of the color values of the image. The process begins by displaying (at 2105) a color channel histogram representation of the color values of a particular image on the GUI of the media-editing application.

Next, the process receives (at 2110) a selection of a location on the histogram representation. As mentioned above, a user may select a location on the histogram representation by placing a cursor at a desired location on the histogram representation and providing an input (e.g., clicking on the cursor controlling device, pressing a hot key, etc. or touching an area on a touch screen device that displays the histogram representation).

After the process has received a selected location on the histogram representation, the process translates (at 2115) the selected location to a color value (e.g., a luminance value, a red channel value, a green channel value, etc.). In some embodiments, the color value is determined based on the horizontal position of the selected location on the histogram representation.

The process then receives (at 2120) a vector input from the user on the histogram representation. In some embodiments, the user may provide the vector input by dragging a cursor or moving a finger on a touch screen device. Next, the process translates (at 2125) the vector input to a change of the color value. In some embodiments, the direction of the vector is used to determine an increase or a decrease of the color value and the magnitude of the vector is used to determine an amount of change to the color value.

Then, the process determines (at 2130) a transform to the color space based on the change of the color value. In some embodiments, the color space transform is determined by a Gaussian curve as illustrated above by reference to FIG. 20. In some embodiments, the Gaussian curve is constructed by using the change of the color value as a parameter.

After the color space transform is determined, the process applies (at 2135) the color space transform to a set of images including the particular image. In some embodiments, the set of images are picture frames of a video clip. In other embodiments, the set of images only includes the particular image.

Next, the process updates (at 2140) the histogram representation according to the adjustments to the particular image. As mentioned above, different embodiments generate different color space transforms based on the same set of user inputs. Depending on the color space transforms that was generated, the histogram representation may be updated in different manners. The process then determines (at 2145) if another vector input is received on the histogram representation. If another vector input is received, the process returns to 2125 to translate the vector input to a change of the color value, and will cycle through operations 2125-2145 until there is no more vector inputs provided on the histogram representation. If there are no more vector inputs, the process determines (at 2150) if another location on the histogram representation is selected. If there is another location on the histogram representation is selected, the process returns to 2110 to translate the newly selected location to a color value, and will cycle through operations 2115-2150 until there is no more selection provided on the waveform representation. Then the process ends.

Figure 22:
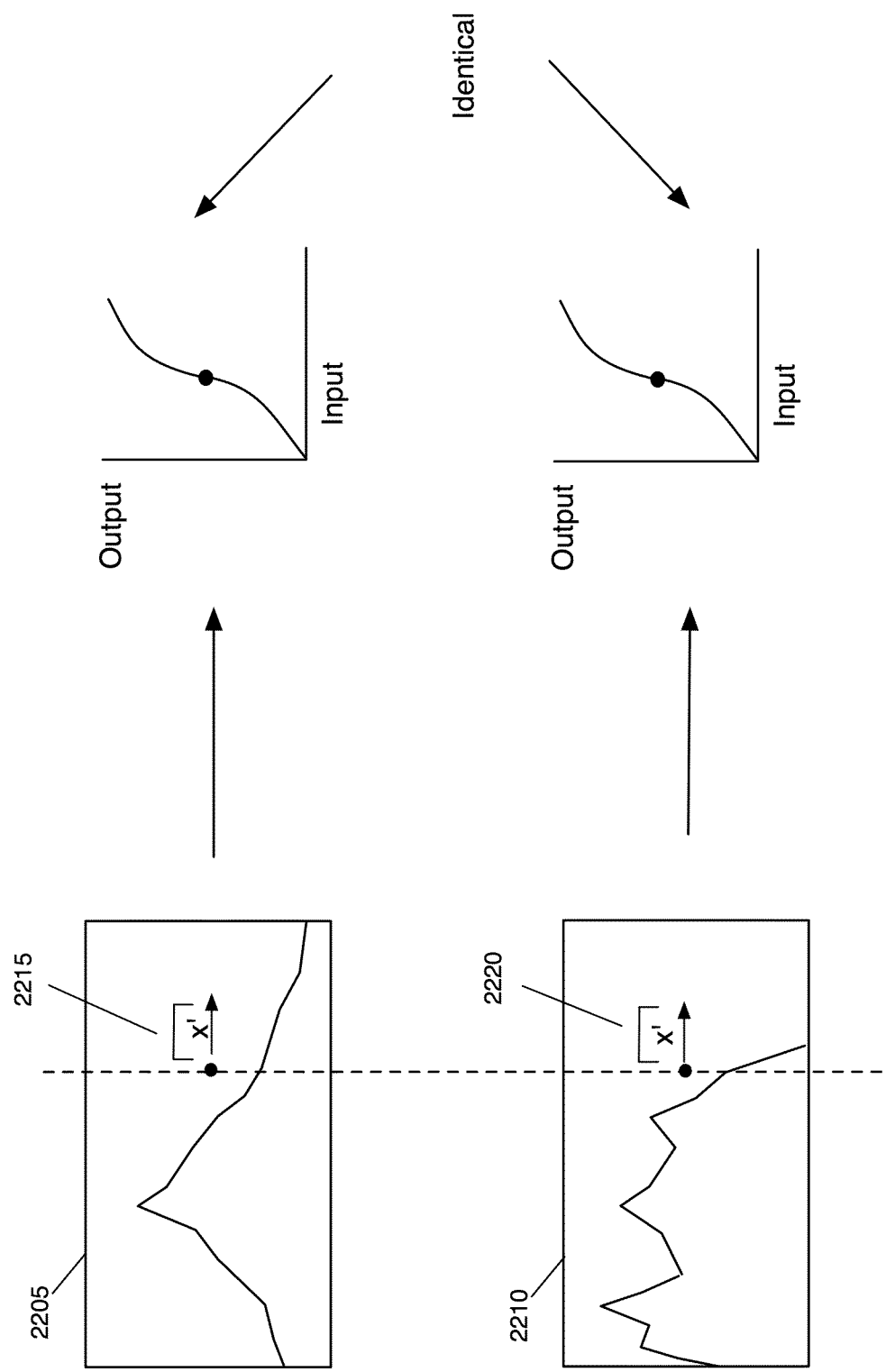
FIG. 22 illustrates two example color space transforms resulted from identical inputs provided on the color channel histogram representations of the color values of two different images.

In some embodiments, the generation of a color space transform is only dependent on a set of user inputs provided on the graphical representation of the color values of an image, and is not dependent on the color values of the image. Thus, when two identical sets of user inputs are provided on the graphical representations of the color values of two different images, the application would generate two identical color space transforms. FIG. 22 illustrates such an example. As shown in FIG. 22, two identical user inputs 2215 and 2220 have been provided on two color channel histogram representations 2205 and 2210. The histogram representations 2205 and 2210 represent color values of two different images (not shown). However, when the same user inputs are provided on the histogram representations 2205 and 2210, the application creates two identical color space transforms.

Figure 23:
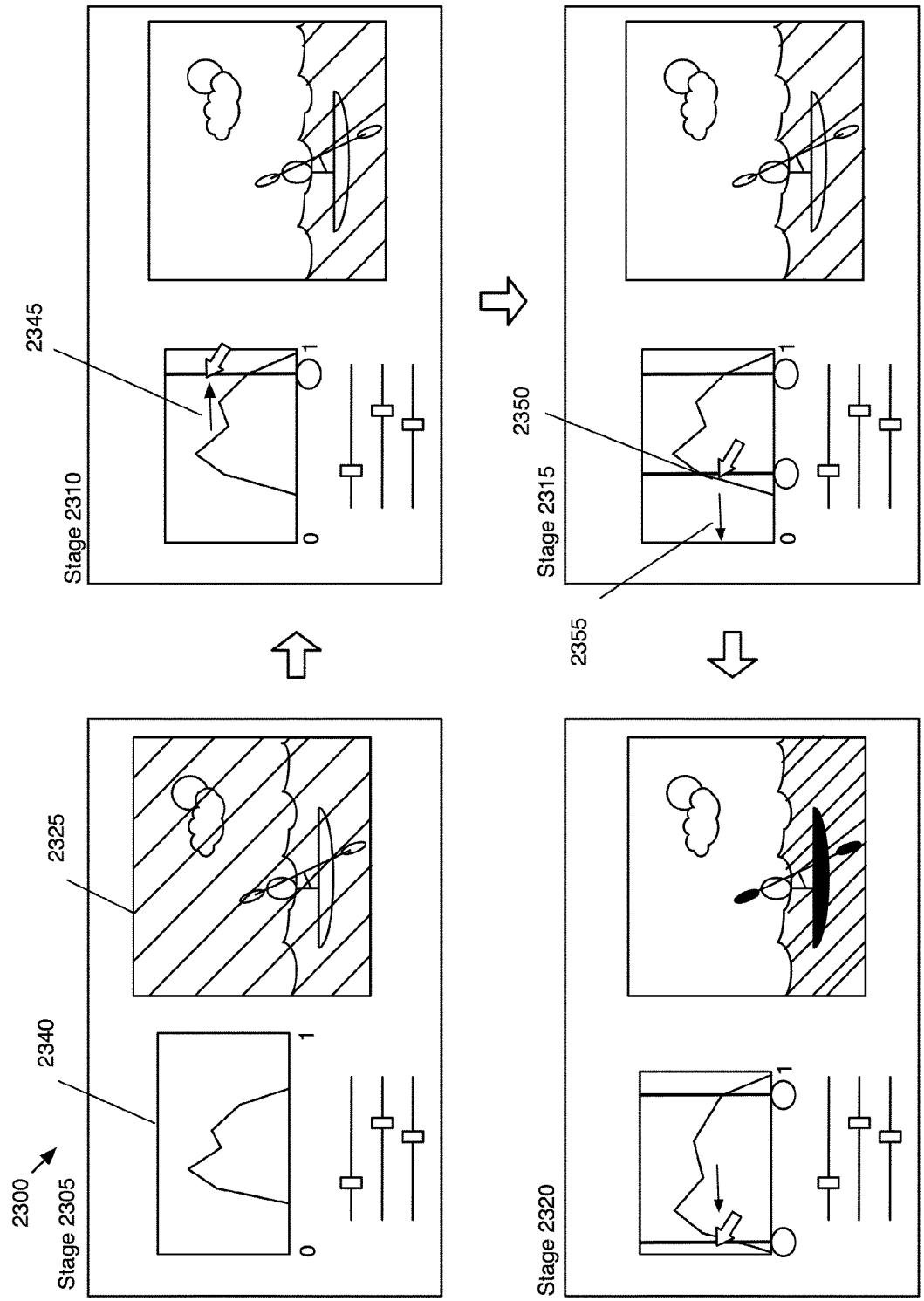
FIG. 23 illustrates an example of editing an image when a user provides two manipulations on a color channel histogram representation of the color values of the image.

Some embodiments of the application allow a user to provide more than one set of user inputs to manipulate the graphical representation of the color values of an image. FIG. 23 illustrates an example GUI that provides a color channel histogram representation of an image and allows the user to edit the image by manipulating the histogram representation more than once. Specifically, FIG. 23 illustrates the image-editing operation at four different stages 2305, 2310, 2315, and 2320. Each of these stages will be described in more detail below.

As shown in FIG. 23, the GUI 2300 illustrates an image 2325 and a color channel histogram representation 2340 of the color values of the image 2325. The first stage 2305 illustrates the GUI 2300 of the media-editing application when the image 2325 is opened. As shown, the image 2325 and the color channel histogram representation 2340 of the color values of the image 2325 are displayed in the GUI 2300. The image 2325 is a picture of a person canoeing under a sunny sky. The image 2325 is dark due to underexposure, as illustrated by the diagonal lines across the image 2325. The image 2325 also has very low contrast. As such, the color channel histogram shows a high concentration of color values in the middle of the histogram.

The second stage 2310 illustrates the GUI 2300 after the user has manipulated the histogram representation by providing a first set of inputs on the color channel histogram representation 2340. In this example, the user has selected a location on the histogram 2340 and has moved it to the right, as indicated by the arrow 2345. As a result of this first set of inputs, the area in the image 2325 near the sun (i.e., the area of the image 2325 with relatively high luminance values) have brightened up, as indicated by the removal of the diagonal lines around the area.

The third stage 2315 illustrates the GUI 2300 after the user has begun to provide a second manipulation on the histogram representation 2340. As shown, the user has selected a second location 2350 on the histogram representation 2340 and began to move the cursor to the left, as indicated by the arrow 2355. In the fourth stage 2320, the user has moved the cursor almost to the left edge of the histogram representation 2340. As a result of the second manipulation, the area of the image 2325 that displays the canoe and the sea (i.e., the area of the image 2325 with relatively low luminance values) have been darkened.

B. Color Pots

In addition to directly manipulating a color channel histogram of the color values of an image, some embodiments also provide a color selection UI element on the color channel histogram of the color values of the image. The color selection UI element allows a user to select a specific color for editing the set of images. Different embodiments implement the color selection UI element differently. In some embodiments, the color selection UI element is a color pot that displays different colors within the color space. The user can select a specific color by selecting a location that represents the specific color within the color space that is displayed within the color pot. In other embodiments, the color selection UI element includes input fields for a user to enter a specific set of color values.

The color selection UI element may be activated in different manners. In some embodiments, the application provides a set of selectable UI items on the histogram for activating the color selection interface. The set of selectable UI items are located at different vertical locations on the histogram. Each vertical location on the histogram corresponds to a different luminance value. In these embodiments, the user activates the color selection UI element by selecting one of the selectable UI items on the histogram. In other embodiments, the application provides a hot key for activating the color selection UI element. In these embodiments, the application activates the color selection UI element based on the hot key and the location of a user's input (e.g., location of a cursor, location of a touch on a touch screen device, etc.) on the histogram. The application then corresponds a particular luminance value that corresponds to the location of the user's input. Based on the identified luminance value and the selected color, the media-editing application of some embodiments generates a color space transform that can be applied to a set of images.

In some embodiments, the color space transform changes each color within the color space to be more similar to the selected color. In some embodiments, the changes that are applied to the different colors are not constant. For example, larger adjustments are applied to colors having luminance values closer to the identified luminance value, and smaller adjustments are applied to colors having luminance values farther away from the identified luminance value.

Figure 24:
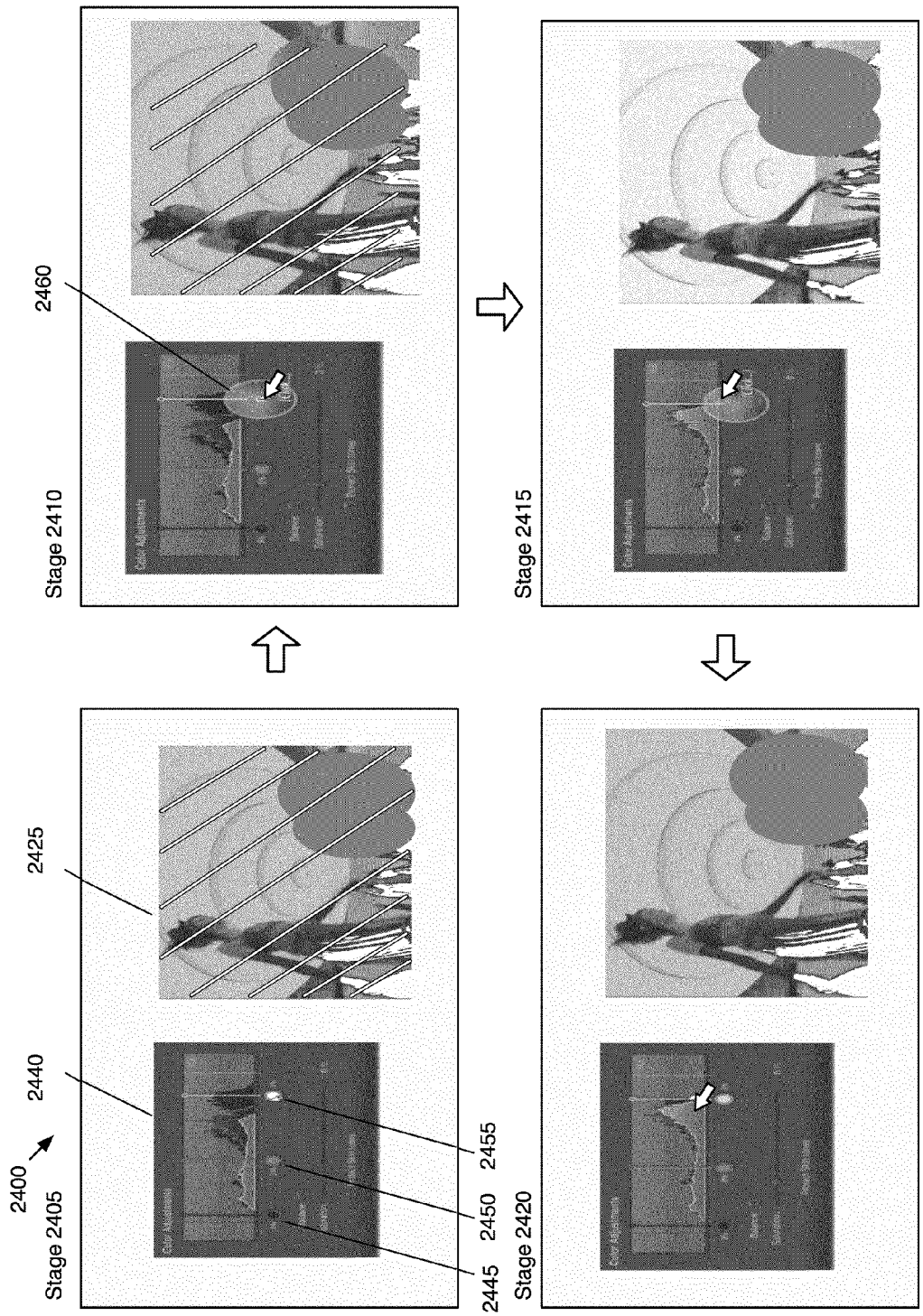
FIG. 24 illustrates an example of editing an image when a user selects a color from a color pot on a color channel histogram representation of the color values of the image.

FIG. 24 illustrates an example GUI that provides a color pot on a color channel histogram representation of the color values of an image and allows a user to edit the image by selecting a color from the color pot. Specifically, FIG. 24 illustrates the image-editing operation at four different stages 2405, 2410, 2415, and 2420. Each of these stages will be described in more detail below.

As shown in FIG. 24, the GUI 2400 includes an image 2425 and a color channel histogram representation 2440 of the color values of the image 2425. The first stage 2405 illustrates the GUI 2400 of the media-editing application when the image 2425 is opened. The image 2425 is a picture of a person walking under a bright dome light. The color temperature of the picture 2425 appears to be too cool (i.e., the image has a blue tint), as indicated by the diagonal lines across the image 2425. This can be shown by the dome light appeared to be slightly bluish, rather than white. The color channel histogram 2440 includes several selectable UI items 2445, 2450, and 2455 placed at different locations of the histogram 2440. In this example, a user may activate a color pot by selecting one of the selectable UI items 2445, 2450, and 2455.

The second stage 2410 illustrates the GUI 2400 after the user has activated a color pot on the histogram. In this example, the user activates the color pot 2460 by selecting the selectable UI item 2455. As shown, after the user has selected the UI item 2455, a color pot 2460 appears on top of the selectable UI item 2455. The color pot 2460 displays different selectable colors for editing the image 2425.

The third stage 2415 illustrates the GUI 2400 after the user has made a selection of a particular color within the color pot 2460. As shown, the user has selected a yellow color by placing a cursor on top of the yellow region on the color pot 2460. The media-editing application then generates a color space transform based on the selection of the yellow color and the luminance value that corresponds to the location of the selectable UI item 2455. At the third stage 2415, the application also applies the color space transform to the image 2425 by replacing each color value in the image to an adjusted color value based on the color space transform. As a result of the selection of the yellow color, the blue tint is removed from the image 2425 (as indicated by the disappearing of the diagonal lines on the image 2425). As shown, the dome light in the image 2425 appears to be white, rather than blue.

The fourth stage 2420 illustrates the GUI 2400 after the user has deactivated the color pot. In some embodiments, the color pot 2460 is automatically deactivated after the user has selected a color from the color pot. As shown, the color pot 2460 has disappeared (deselected) from the histogram representation 2440 after the user has finished selecting a color in the third stage 2415.

Figure 25:
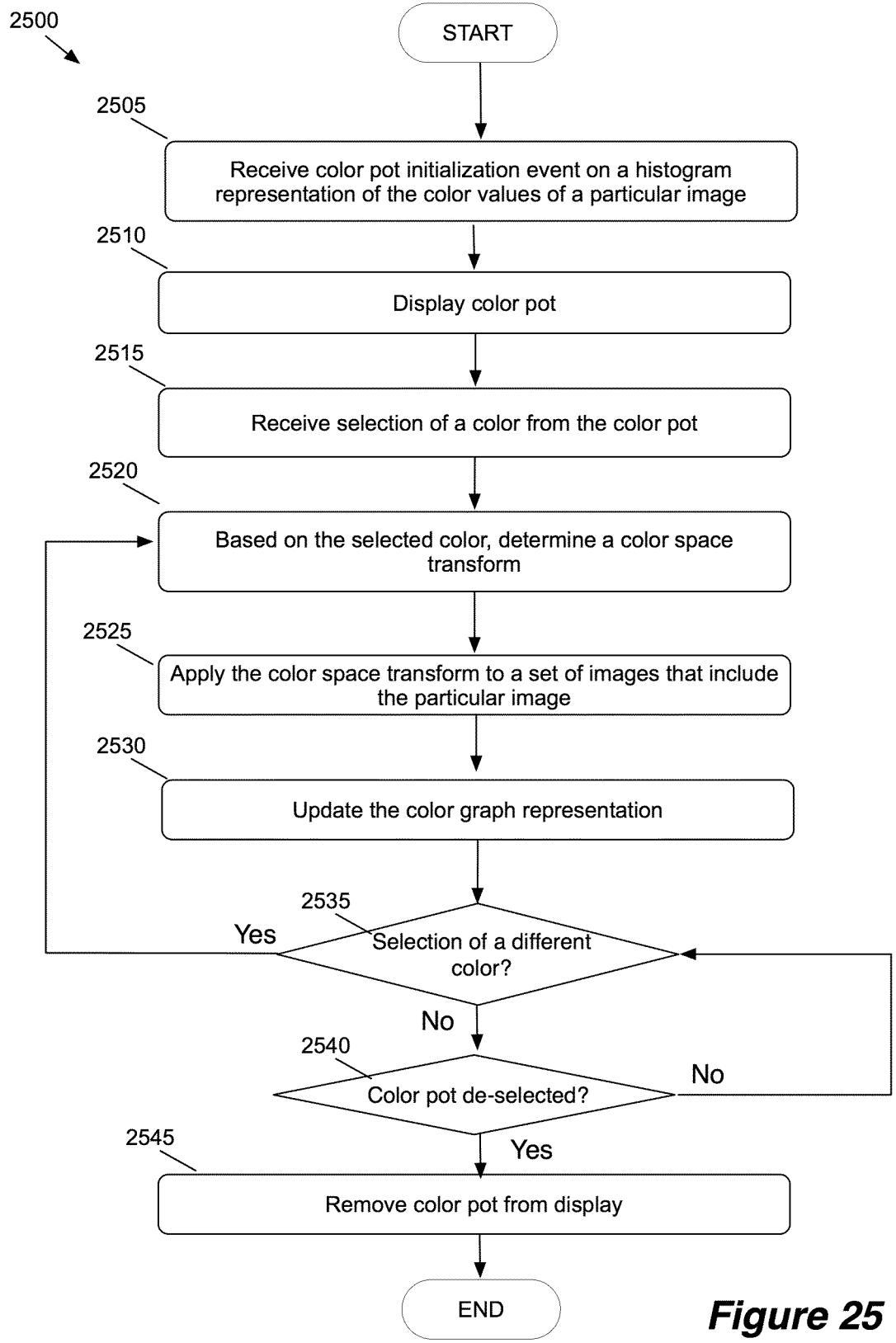
FIG. 25 conceptually illustrates a process of some embodiments for editing an image when a user selects a color from a color pot on a color channel histogram representation of the color values of the image.

FIG. 25 conceptually illustrates a process 2500 that is performed by a media-editing application of some embodiments for editing an image based on the color selection on the color pot. The process begins by receiving (at 2505) a color pot initialization event on a color channel histogram representation of the color values of a particular image. In some embodiments, the color pot initialization event is a selection of a selectable UI items on the histogram representation.

Once the color pot initialization event is received, the process displays (at 2510) a color pot on the histogram representation. In some embodiments, the color pot displays different colors in the color space. Next, the process receives (at 2515) a selection of a color from the color pot. In some embodiment, the selected color corresponds to a set of chrominance values.

The process then determines (at 2520) a transform to a color space based on the selected color. As mentioned above, a color space transform maps each set of color values in the color space to another set of color values. In some embodiments, the color space transform causes at least some of the colors within the color space to be closer (i.e., more similar) to the selected color.

Next, the process applies (at 2525) the color space transform to a set of images that includes the particular image. In some embodiments, the set of images are picture frames of a video clip. In other embodiments, the set of images only includes the particular image.

After applying the color space transform to the set of images, the process updates (at 2530) the histogram representation according to the adjustments to the particular image. As mentioned above, different embodiments generate different color space transforms based on the same set of user inputs. Depending on the color space transforms that was generated, the histogram representation may be updated in different manners. The process then determines (at 2535) if there is another color selection. If there is another color selection, the process returns to 2520 to receive another color selection, and will cycle through operations 2520-2535 until there is no more color selection provided on the color pot.

If there are no more color selections, the process determines (at 2540) if the color pot is deselected. In some embodiments, the color pot may be deselected by making a selection outside of the color pot. If the color pot is not deselected, the process returns to 2535 to determine if there is another color selection, and will cycle through operations 2535-2540 until the color pot is deselected. If the color pot is deselected, the process removes (at 2545) the color pot from display. Then the process ends.

C. Histogram Representation with Broadened Range

Some embodiments of the invention provide a color channel histogram for an image that includes a range beyond the predetermined black and white luminance cutoff value values of the image. The black luminance cutoff value identifies a luminance value as black and the white luminance cutoff value identifies a luminance value as white when the image is displayed or reproduced.

Pixels of an image may contain luminance values that are beyond the range of black and white luminance cutoff value values under different scenarios. For example, modern image-capturing devices may store color values beyond the black and white luminance cutoff value values in an image. Also, luminance values of some pixels that are originally within the range of the black and white luminance cutoff value values may be pushed beyond the range by a user editing the image (e.g., increasing or decreasing the brightness level of at least some pixels of the image). Thus, the media-editing application of some embodiments provides a color channel histogram representation that includes a range beyond the predetermined black and white luminance cutoff value values. That way, all pixels of the image, including pixels with luminance values darker than the black luminance cutoff value and pixels with luminance values brighter than the white luminance cutoff value, will be accurately presented in the histogram.

Figure 26:
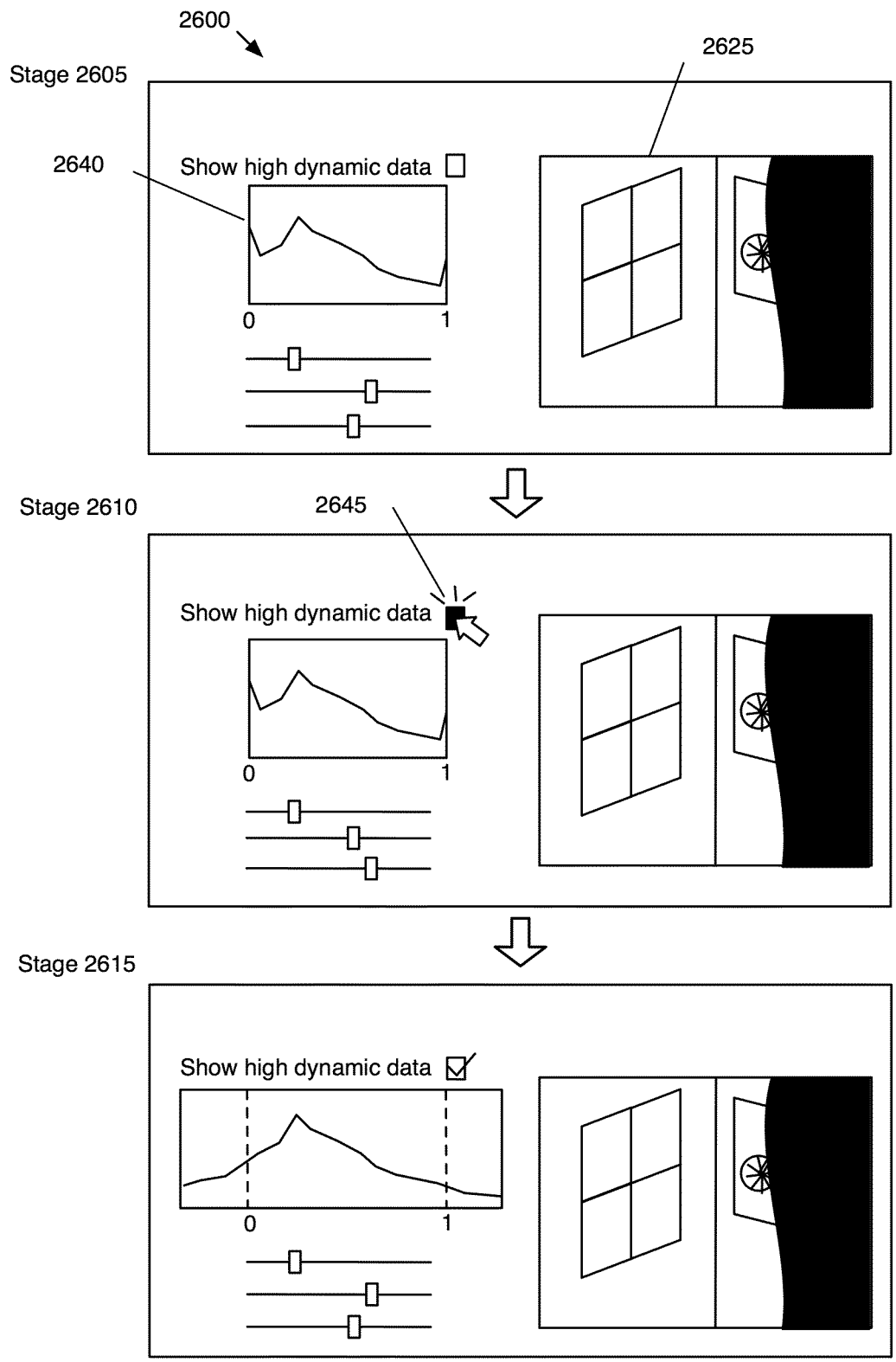
FIG. 26 illustrates an example of providing a broader range of luminance values on a color channel histogram representation of the color values of the image.

FIG. 26 illustrates an example GUI that provides a color channel histogram representation with broadened luminance range for an image. As shown in the FIG. 26, the GUI 2600 includes an image 2625 and a color channel histogram representation 2640 of the color values of the image 2625. The histogram representation 2640 in this example shows a distribution of luminance values across the image 2625. The GUI 2600 also includes a check box for activating the display of high dynamic data of the image 2625. The image 2625 is a picture of a room that includes a window on the left and a painting on the right. The left portion of the image 2625 is extremely bright while the right portion of the image 2625 is extremely dark. As such, the luminance values of at least some pixels around the area of the window (i.e., displayed as white) are brighter than the white luminance cutoff value of the image. In addition, the luminance values of at least some pixels around the area near the painting (i.e., displayed as black) are darker than the black luminance cutoff value.

The first stage 2605 illustrates the GUI 2600 when the application has just opened the image file 2625. As shown, since the check box for activating the display of high dynamic data has not been selected yet, the histogram representation 2640 only includes a luminance range from 0-1 (i.e., the luminance range between the black and white luminance cutoff value values). In addition, the representation of the luminance values that are beyond the black and white luminance cutoff value values are packed at the two ends of the histogram 2640, as indicated by the spikes at the two ends of the graph 2640.

The second stage 2610 is a transition stage. At this stage, the user activates the high dynamic range histogram representation (e.g., by selecting a selectable item 2645 for activating the high dynamic range histogram representation). The third stage 2615 illustrates the GUI 2600 after the high dynamic range histogram representation is activated. As shown, the color channel histogram representation has extended the range beyond the black and white cutoff value values (indicated by the labels 0 and 1). In addition, luminance values of the image that are darker than the black cutoff value and brighter than the white cutoff value in the image 2625 are accurately represented in the color channel histogram representation 2640 in this stage.

By accurately presenting pixel data in a color channel histogram representation, a user may properly analyze and edit the image to a desired effect. For example, after learning that some of the pixels have luminance values that are brighter than the white luminance cutoff value (displayed as pure white) and darker than the black luminance cutoff value (displayed as pure black), a user may edit the image by bringing the luminance values of those pixels back within the range of the black and white luminance cutoff value values. In some embodiments, the user may perform such an edit by manipulating directly on the color channel histogram representation of the color values of the image.

The example above illustrates a histogram representation that contains a broadened range of luminance values. However, as any color channel that represents the color values of the image has a minimum color value and a maximum color value (e.g., for a color channel that uses 8 bits to represent its color, the minimum value may be 0 and the maximum value may be 255), color clipping may occur not only in the luminance channel, but also in any color channels (e.g., blue channel, red channel, green channel, etc.). Thus, the application of some embodiments may also display other types of histogram representation that contains a broadened range of other color channels' values.

Figure 27:
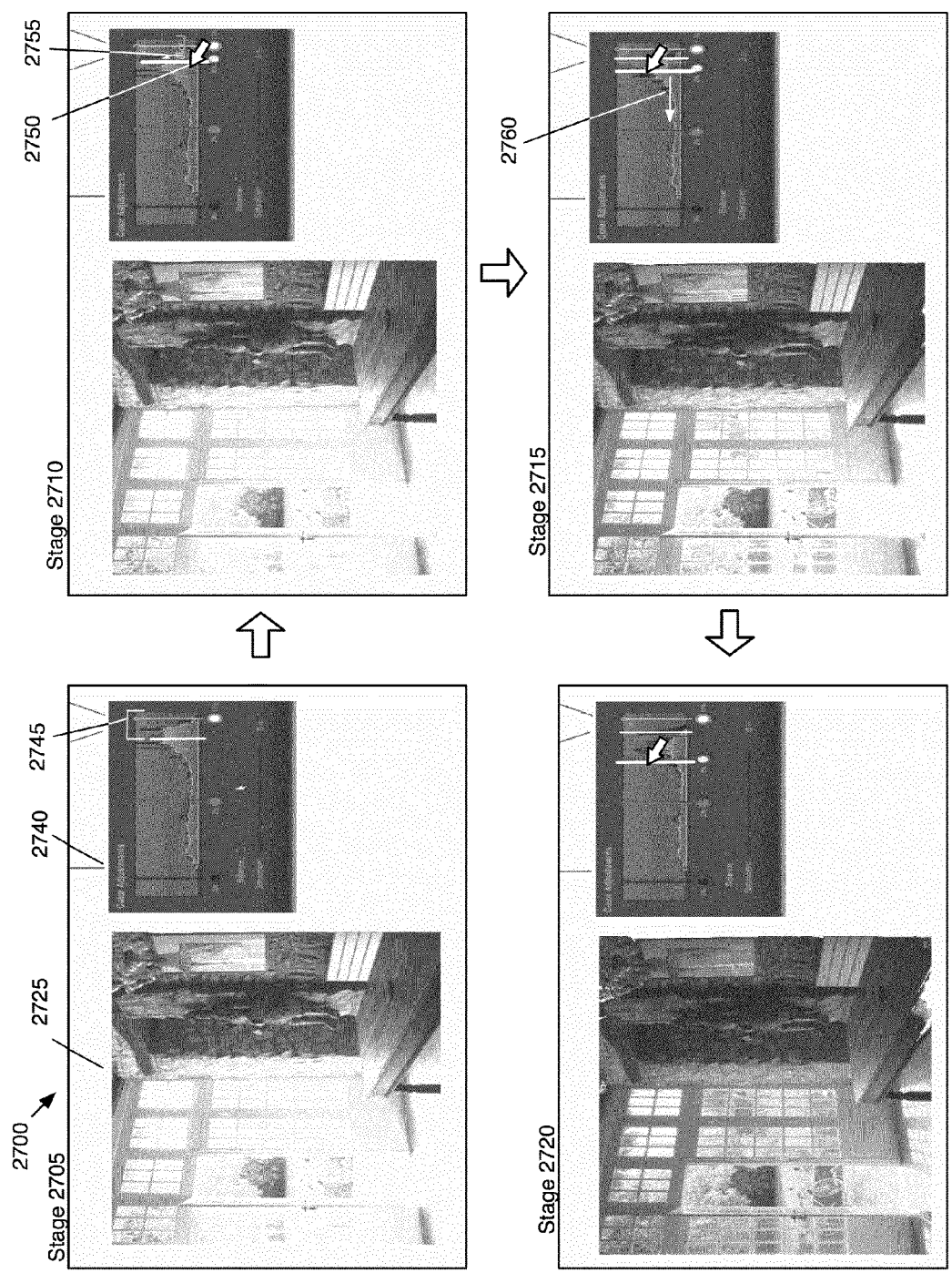
FIG. 27 illustrates an example of manipulating a color channel histogram representation that has a broader range of luminance values.

FIG. 27 illustrates an example GUI of such an image-editing operation. Specifically, FIG. 27 illustrates the image-editing operation at four different stages 2705, 2710, 2715, and 2720. Each of these stages will be described in more detail below.

As shown in FIG. 27, the GUI 2700 includes an image 2725 and a color channel histogram representation 2740 of the color values of the image 2725. The first stage 2705 illustrates the GUI 2700 of the media-editing application when the image file 2725 is opened. As shown, the image 2725 is a picture of a room with a window overlooking a garden. Because the garden outside of the room is much brighter than the room, most of the pixels around the area of the window in the image 2725 are displayed as white. The color channel histogram representation 2740 includes a range beyond the black and white cutoff value values of the image. As such, even though the pixels that are brighter than the white luminance cutoff value are displayed as white in the image 2725, they are accurately presented in the color channel histogram 2740. Specifically, the portion of the histogram 2745 represents pixels with luminance values higher than the white cutoff value.

The second stage 2710 illustrates the GUI 2700 after the user has initiated the image editing operation by selecting a location on the color channel histogram representation 2740. The selection of the location on the histogram 2740 may be performed by placing a cursor at a desired location on the histogram 2740 and providing an input (e.g., clicking on the cursor controlling device, pressing a hot key, etc. or touching an area on a touch screen device that displays the histogram 2740). As shown, the user has selected a location 2750 on the histogram 2740 by placing a cursor 2755 over the location 2750. In this example, the selected location 2750 corresponds to a luminance value that is brighter than the white cutoff value.

The third stage 2715 illustrates the GUI 2700 after the user has begun manipulating the histogram representation 2740 by providing a vector on the histogram representation 2740. In some embodiments, the user can provide a vector by moving the cursor (or the finger on a touch scree device) to a different location. As shown, the user has started to move the cursor 2755 to the left, as indicated by the arrow 2760. Based on the selected location 2750 on the histogram 2740 and the movement of the cursor 2755, the application of some embodiments generates a color space transform that is applied to the image 2725. Specifically, the color transform reduces the luminance values of the color values having luminance values above the white cutoff value.

As shown in the stage 2715, the application edits the image 2725 according to the color space transform that is generated based on the user inputs. In particular, more details of the garden outside of the window are shown in the image 2725 in the third stage 2715 when compared to the image 2725 of the second stage 2710.

The fourth stage 2720 illustrates the GUI 2700 after the user has completed the image editing operation. As shown, the user has moved the cursor 2755 further to the left. In some embodiments, the application generates a new color space transform based on the new movement of the cursor 2755. This new color space transform further reduces the luminance values of some of the pixels that have high luminance values. As shown, more details of the garden has appeared in the image 2740 as a result of the cursor movement.

Figure 28:
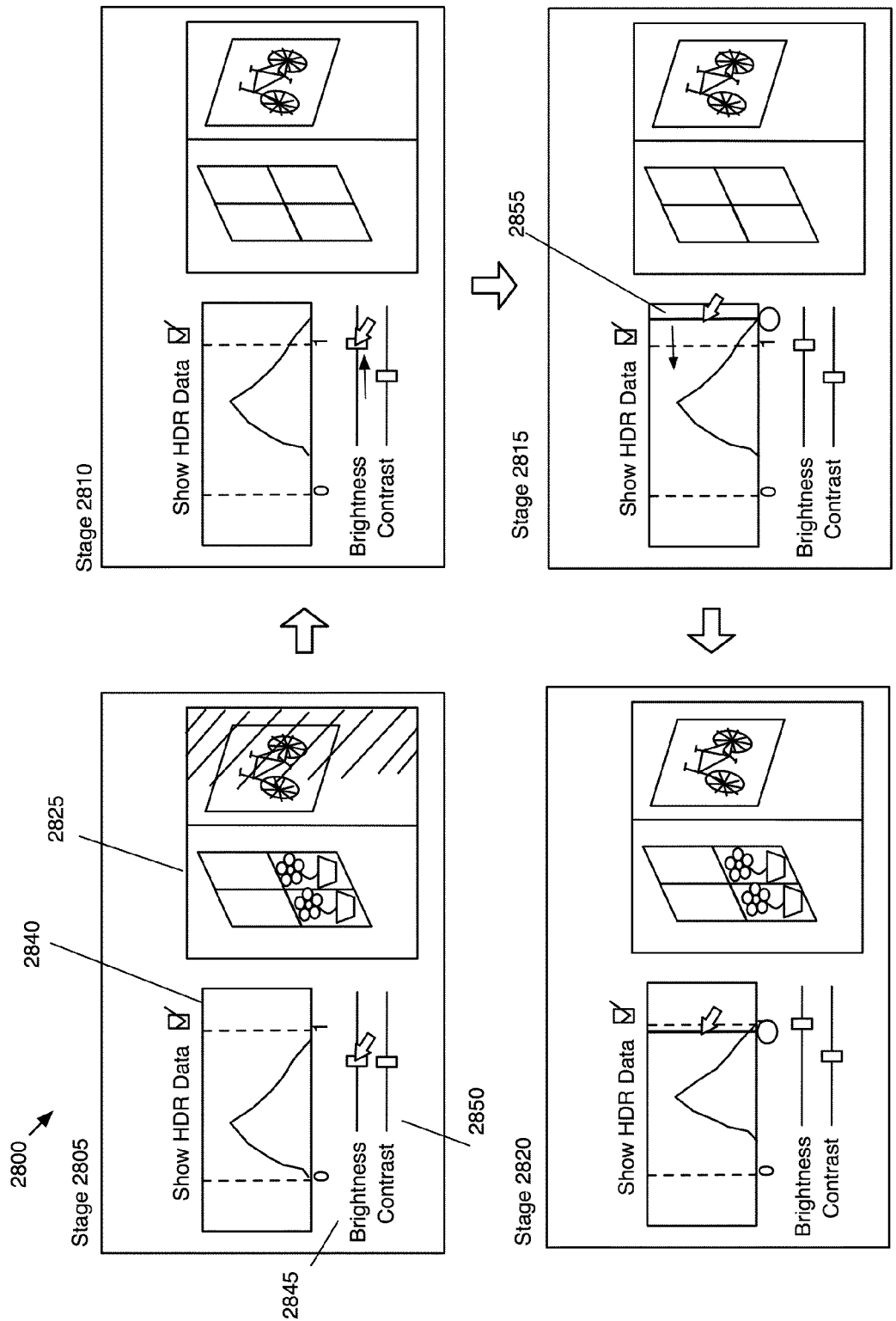
FIG. 28 illustrates a different example of manipulating a color channel histogram representation that has a broader range of luminance values.

Pixels may contain luminance values beyond the black and white luminance cutoff value values for many reasons. For example, modern image/video capturing devices may sometimes store luminance values that are beyond the black and white cutoff value values range when the image or video is captured. Images may also contain luminance values beyond the black and white luminance cutoff value values range as a result of a user's editing of the images. FIG. 28 illustrates an example GUI for bringing the luminance values of an image back within the black and white cutoff value range after a user pushes some of the luminance values beyond the range.

Specifically, FIG. 28 illustrates the image-editing operation at four different stages 2805, 2810, 2815, and 2820. Each of these stages will be described in more detail below.

As shown in FIG. 28, the GUI 2800 includes an image 2825, a color channel histogram representation 2840 of the color values of the image 2825, and color adjusting sliders 2845 and 2850. The different color adjusting sliders are for adjusting the color values of the image 2825. For example, the slider 2845 is for adjusting brightness of the image 2825 and the slider 2850 is for adjusting contrast of the image 2825.

The image editing operation will now be described by reference to the state of the GUI 2800 during the four stages 2805, 2810, 2815, and 2820. The first stage 2805 illustrates the GUI 2800 of the media-editing application when the image 2825 is opened. As shown, the image 2825 is an image of a room with a window on the left and a painting on the right. The image 2825 also shows two flowerpots sitting outside the window. In addition, the right side of the painting appears to be too dark, as indicated by the diagonal lines across that portion of the image 2825. The color channel histogram representation 2840 indicates that all color values of the image 2825 are within the range of the black and white luminance cutoff value values.

The second stage 2810 illustrates the GUI 2800 after the user has brightened the entire image 2825 by sliding the brightness slider 2845 to the right. As a result of the brightness adjustment, the shadow around the painting has disappeared. In addition, the two flowerpots outside the window have been blown out (i.e., displayed as white) as the luminance values of the pixels that represent the flowerpots are now higher than the white luminance cutoff value. The color channel histogram representation 2840 also shows that the color values of a particular part of the image 2825 have been pushed beyond the white luminance cutoff value (labeled as 1 in the graph).

The third stage 2815 illustrates the GUI 2800 after the user has begun to bring some of the color values of the image 2825 back within the range of the black and white luminance cutoff values by manipulating the histogram representation 2840. As shown, the user has selected a location 2855 on the histogram representation 2840 and began to drag the cursor to the left.

The fourth stage 2820 illustrates the GUI 2800 after the user has completed the image editing operation. As shown, the user has moved the cursor further to the left. As a result of the user's input on the histogram representation 2840, the luminance values of the color values that are beyond the white luminance cutoff value have been bought back within range and the flower pots have reappeared in the image 2825.

IV. On-Screen Control

In addition to allowing a user to edit an image by directly manipulating the graphical representations of the image, some embodiments display a set of color adjustment tools on the image and allow a user to edit the color values of the image by controlling the color adjustment tools that are displayed on the image. In some embodiments, the color adjustment tools include a value adjustment tool (e.g., a range slider) for adjusting pixel values of different color channels. In other embodiments, the application displays a color adjustment tool that simulates a graphical representation of the color values of the image. In these embodiments, the user may edit the image by providing an additional input (e.g., a vector) on the displayed image as if the user is manipulating the actual graphical representation of the image.

Figure 29:
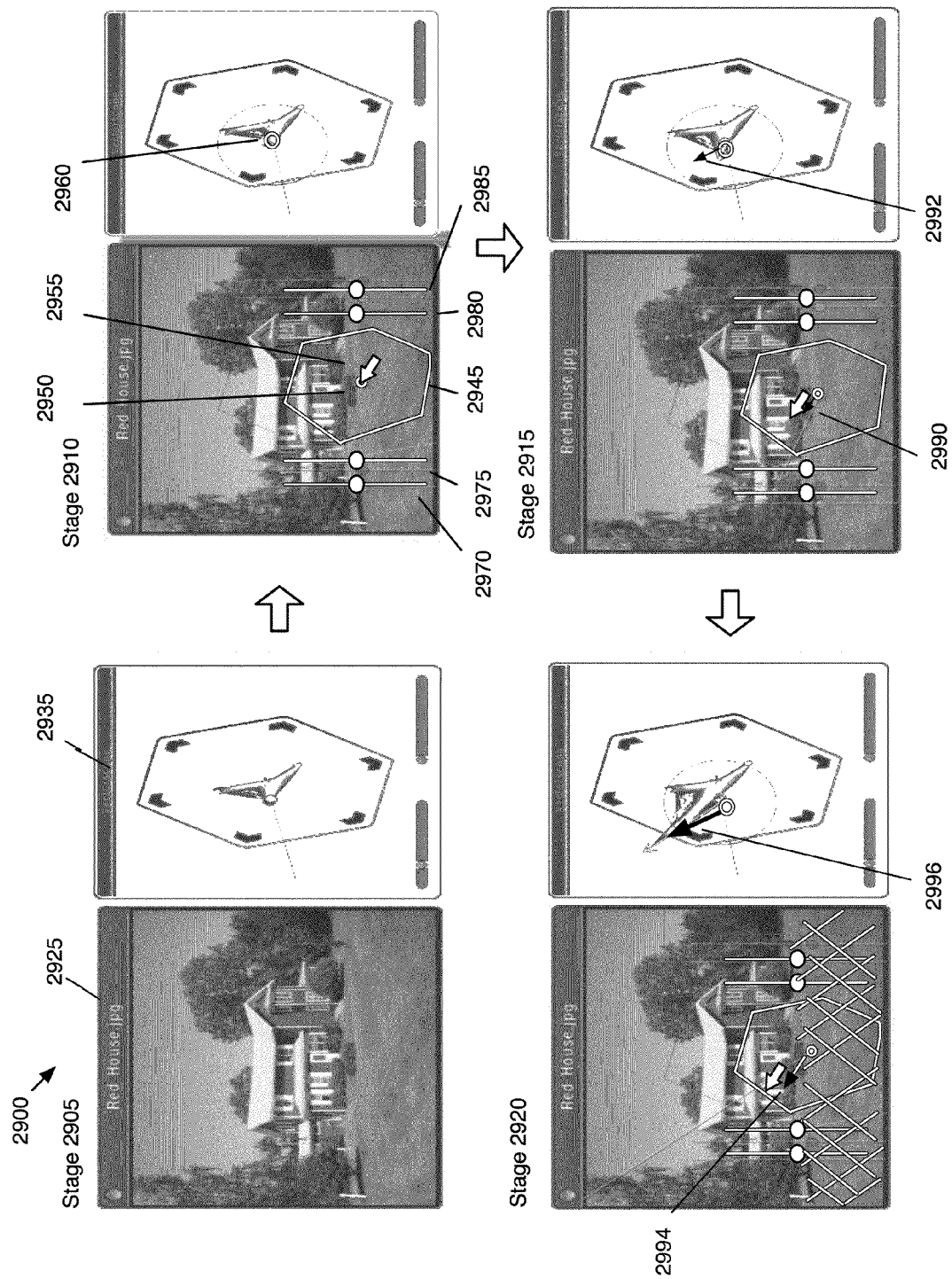
FIG. 29 illustrates an example of editing an image by providing inputs directly on the displayed image.

FIG. 29 illustrates an example GUI that displays a color adjustment tool on an image and allows a user to edit the image by controlling the color adjustment tool. Specifically, FIG. 29 illustrates the image-editing operation at four different stages 2905, 2910, 2915, and 2920. Each of these stages will be described in more detail below.

As shown in FIG. 29, the GUI 2900 illustrates an image 2925 and a vectorscope representation 2935 of the color values of the image 2925. The first stage 2905 illustrates the GUI 2900 of the media-editing application before the user activates the color adjustment tools on the displayed image 2925. As shown, the image 2925 is a picture of a red and white house and the front lawn of the house. As the dominant colors in the image 2925 are red, green, and blue, the vectorscope representation 2935 shows a high concentration of colors in the red, green, and blue sections.

The second stage 2910 illustrates the GUI 2900 after the user has initiated an image editing operation by activating the color adjustment tool on the displayed image 2925. The user may activate the color adjustment tools in different manners. In some embodiments, the user may activate the color adjustment tools by selecting a location on the image. In these embodiments, a user can select a location on the graph by placing a cursor on the image and providing an input (e.g., clicking a button of a cursor controlling device, pressing a hot key, etc. or by touching an area of a touch screen display that displays the graph). The media-editing application then determines a position of the user input (the cursor position or the position of the touch) and corresponds that position to a particular pixel on the image. The position of the user input can be determined by identifying a set of coordinates (e.g., a horizontal coordinate x and a vertical coordinate y) of the user input.

As shown, the user has selected a location 2950 on the image 2925 by placing a cursor at the location 2950. Based on the selected location on the image, the application of some embodiments identifies a particular pixel on the image. In some embodiments, the application uses the color values of the particular pixel to determine a color space transform for the image.

As a result of the selection, the application displays a set of color adjustment tools on the image 2925. Different embodiments provide different color adjustment tools (2945 and 2970-2985) for display on the image. In this example, the set of color adjustment tools include four range sliders 2970-2985 for adjusting color values of the image 2925 and a color adjustment tool 2945 that simulates a vectorscope representation of the color values of the image. The user may provide an additional input (e.g., a vector) on the color adjustment tool 2945 as if the user is manipulating the actual vectorscope representation.

As shown, the set of color adjustment tools are displayed around the selected area on the image 2925. Additionally, the application corresponds the color values of the particular pixel to a point on the vectorscope representation 2935, as indicated by a white circle 2960 on the vectorscope 2935. Although the set of color adjustment tools is shown to be opaque in this example, some embodiments display a set of translucent color adjustment tools on the image in order not to obstruct the view of the image from the user.

The third stage 2915 illustrates the GUI 2900 after the user has provided a vector on the color adjustment tool 2945. As shown, the user has started to drag the cursor 2955 toward the upper left corner of the image 2925, as indicated by the arrow 2990. As shown in the stage 2915, the movement of the cursor 2955 has created a vector 2992 that is applied to the actual vectorscope representation 2935. The application then generates a color space transform that will be applied to the image based on user inputs. Specifically, the media-editing application uses the color values of the particular pixel and the vector input to determine a color space transform in the same manner as if the inputs are provided directly on the actual vectorscope representation. The application then edits the image and updates the vectorscope representation of the color values of the image according to the color space transform. As a result, the pixels that are green in color (e.g., pixels around the lawn and the trees) have been slightly changed to orange.

The fourth stage 2920 illustrates the GUI 2900 after the user has completed the media editing operation. As shown, the user has moved the cursor 2955 further to the upper left corner of the vectorscope (as indicated by the arrow 2994) and has stopped. This movement provides a new vector 2996 on the displayed image 2925. Similar to the third stage 2915, the application creates a new color space transform based on the new inputs and applies the transform to the image 2925. As a result, the pixels that were originally green (e.g., pixels of the trees and lawn) have become more orange than they were in the third stage 2915, as indicated by the cross hatching on the grass area of the image.

In the above example, the user has edited the image 2925 by manipulating the color adjustment tool 2945 on the displayed image. The user may also edit the image 2925 by adjusting one or more of the range sliders 2970-2985. Each slider is for adjusting different aspects of the color values. For example, the slider 2970 is for adjusting luminance values of the image 2925, the slider 2975 is for adjusting red color values of the image 2925, the slider 2980 is for adjusting blue color values of the image 2925, and the slider 2985 is for adjusting green color values of the image 2925. When the user adjusts a range slider, the application also generates a color space transform based on the color values of the particular pixel selected by the user and the adjustment to the range slider. For example, when a user adjusts the luminance channel range slider, the application may generate the color space transform that applies different luminance adjustments to the pixels based on the color values of the pixels. That is, larger adjustments are applied to pixels with color values that are more similar to the color values of the particular pixel and smaller adjustments are applied to pixels with color values that are further away from the color values of the particular pixel.

In addition to providing a color adjustment tool that simulates a vectorscope representation, the media-editing application of some embodiments may provide color adjustment tools that simulate other graphical representations (e.g., waveform, histogram, etc.) of the color values of the image. In these embodiments, a user may provide additional input (e.g., a hotkey, etc.) to select a color adjustment tool that simulates a particular graphical representation.

Figure 30:
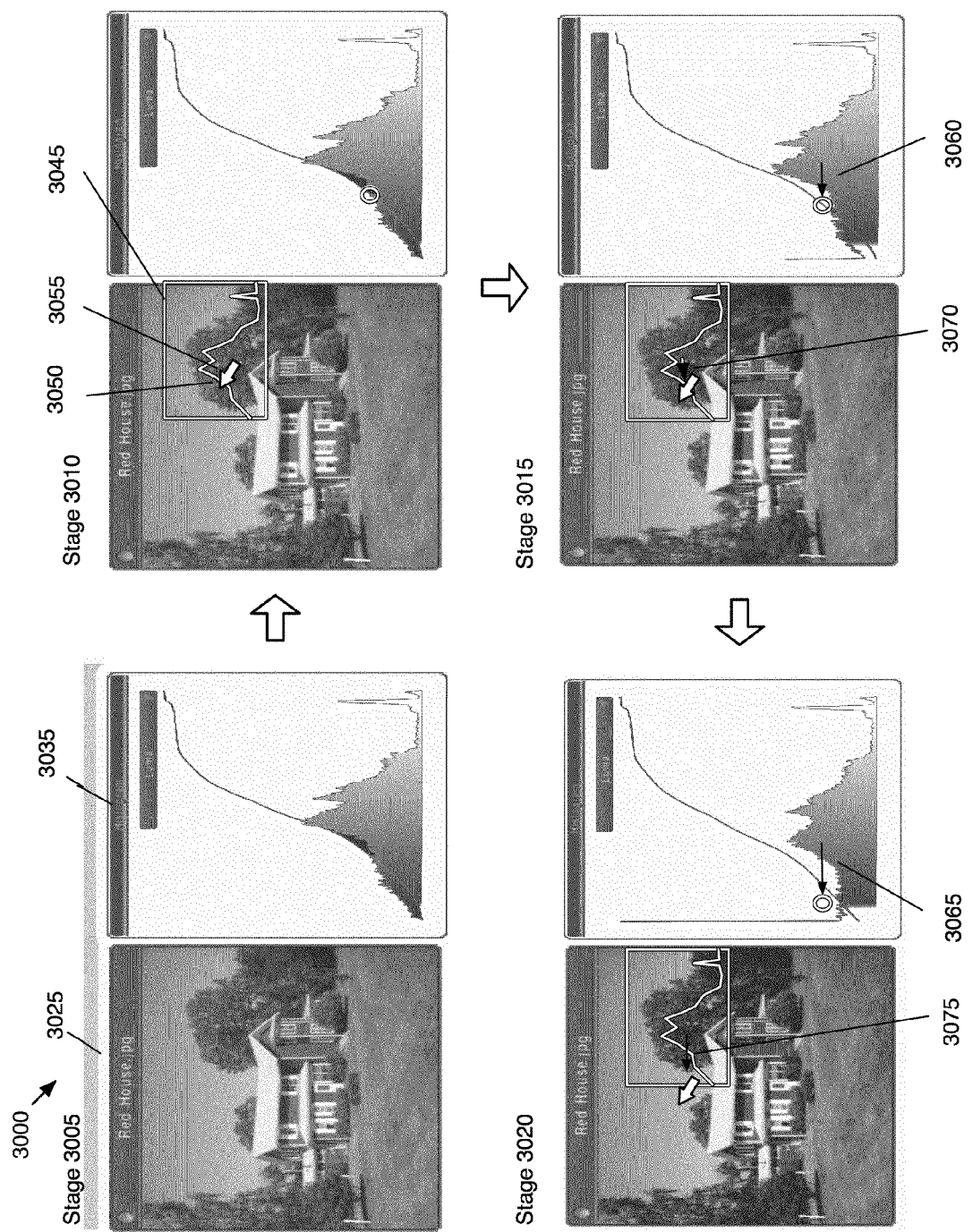
FIG. 30 illustrates another example of editing an image by providing inputs directly on the displayed image.

FIG. 30 illustrates an example GUI that provides a color adjustment tool on an image that simulates a histogram representation of the color values of the image. Specifically, FIG. 30 illustrates the image-editing operation at four different stages 3005, 3010, 3015, and 3020. Each of these stages will be described in more detail below.

As shown in FIG. 30, the GUI 3000 illustrates an image 3025 and a histogram representation 3035 of the color values of the image 3025. In this example, the histogram representation 3035 shows a distribution of luminance values across the image. The first stage 3005 illustrates the GUI 3000 of the media-editing application before the user activates the color adjustment tools on the displayed image 3025. As shown, the image 3025 is a picture of a red and white house and the front lawn of the house. As the majority of the image 3025 has modest brightness levels, with the white roof being extremely bright, the histogram representation 3035 indicates a high concentration of pixels in the middle of the graph with a spike at the right end of the graph that represents pixels of the white roof.

The second stage 3010 illustrates the GUI 3000 after the user has initiated an image editing operation by activating the color adjustment tool on the displayed image 3025. As shown, the user selects a location 3050 on the image 3025 by placing a cursor 3055 on top of an area showing the tree on the image 3025. Based on the selection of the location 3050 on the image, the application of some embodiment identifies a particular pixel on the image. In some embodiments, the application uses the color values of the particular pixel to determine a color space transform for the image.

As a result of the selection, the application displays a color adjustment tool 3045 on the image 3025. Different embodiments provide different color adjustment tools for display on the image. In this example, the color adjustment tool 3045 simulates a histogram representation of the color values of the image 3025. The user may provide an additional input (e.g., a vector) on the displayed image as if the user is manipulating the actual vectorscope representation.

As shown, the color adjustment tool 3045 is displayed around the selected area on the image 3025. Additionally, the application corresponds the luminance value of the particular pixel to a point on the histogram representation 3035, as indicated by a white circle 3060 on the histogram 3035.

The third stage 3015 illustrates the GUI 3000 after the user has provided a vector input on the displayed image 3025. As shown, the user has started to drag the cursor 3055 to the left of the image, as indicated by the arrow 3070. The movement of the cursor 3055 has created a vector 3060 that is applied to the actual histogram representation 3035. The application then generates a color space transform that is applied to the image based on user inputs. Specifically, the media-editing application uses the color values of the particular pixel and the vector input to determine a color space transform in the same manner as if the inputs are provided directly on the actual histogram representation. The application then edits the image and updates the histogram representation of the color values of the image according to the color space transform. As a result, the pixels that have relatively low luminance values (e.g., pixels of the trees and shadows) have been slightly darkened.

The fourth stage 3020 illustrates the GUI 3000 after the user has completed the media editing operation. As shown, the user has moved the cursor 3055 further to the left (as indicated by the arrow 3075) and has stopped at a new location. This latest movement of the cursor provides a new vector 3065 that is applied to the histogram representation 3035. Similar to the third stage 3015, the application creates a new color space transform based on the new inputs and applies the transform to the image 3025. As a result, the pixels that have relatively low luminance values are further darkened.

Figure 31:
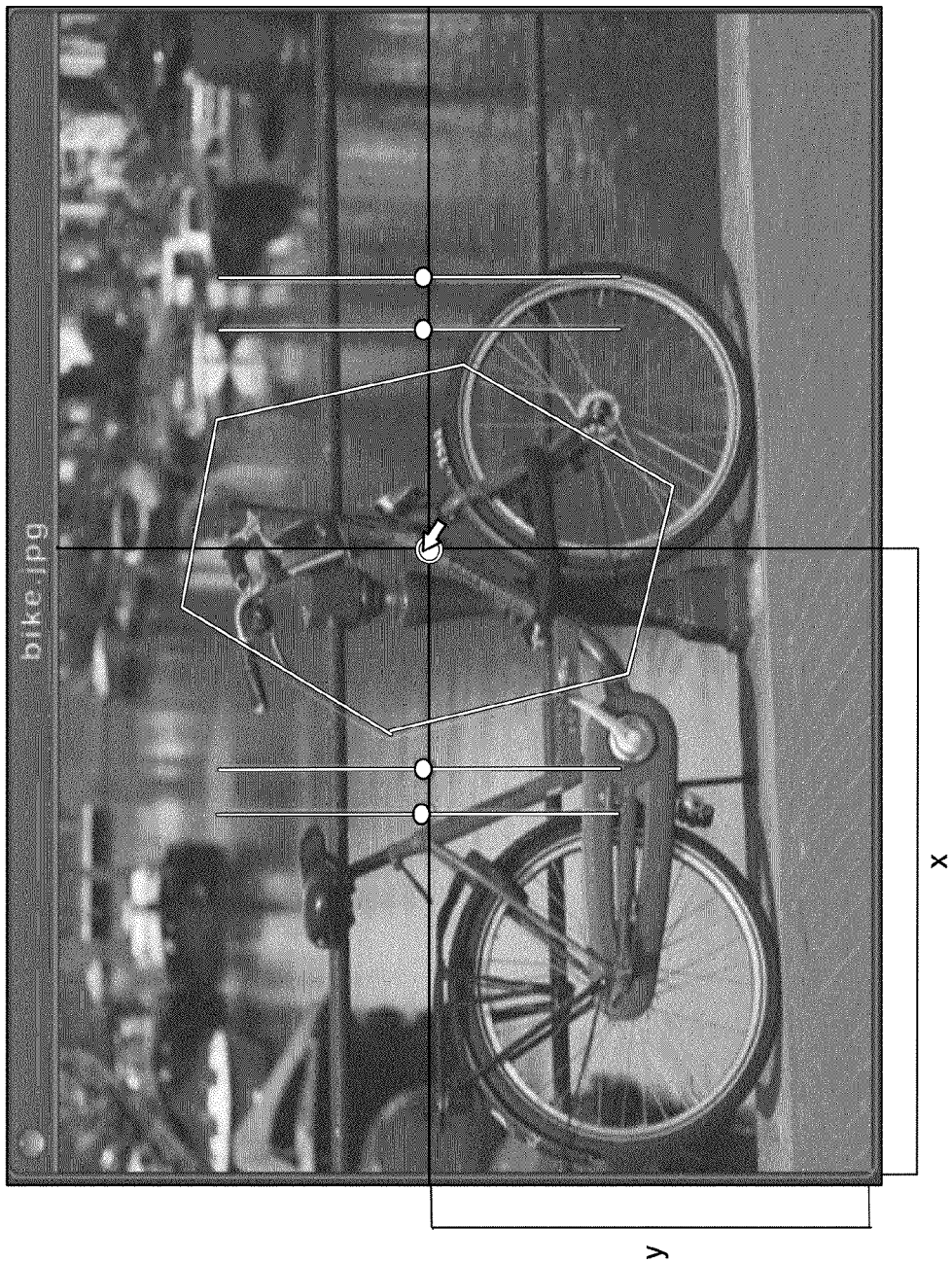
FIG. 31 illustrates an example user interface implementation for allowing a user to edit an image by providing inputs directly on the displayed image.

Different embodiments use different techniques to allow a user to select a location on the image and activate the color adjustment tools. FIG. 31 illustrates one example approach. Under this approach, a user can select a point on the image by placing a cursor on the image and providing an input (e.g., clicking a button of a cursor controlling device, pressing a hot key, etc. or by touching a touch screen display at an area that displays the image). The media-editing application of some embodiments determines a position of the user input (the cursor position or the location of the touch) and corresponds that position to a pixel on the image. In some embodiments, the position of the user input can be determined by identifying a set of coordinates (e.g., a horizontal coordinate x and a vertical coordinate y) of the user input.

Figure 32:
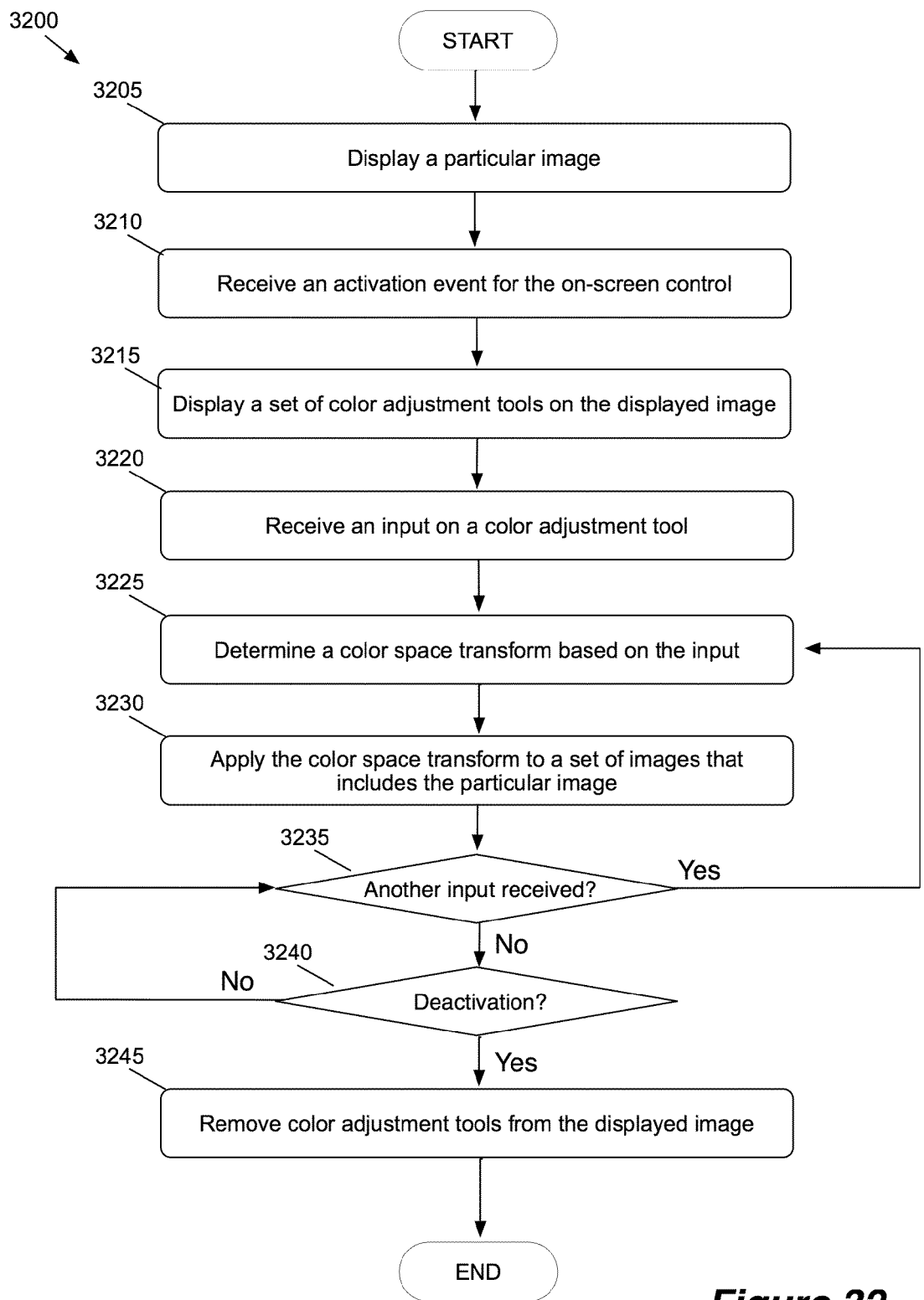
FIG. 32 conceptually illustrates a process of some embodiments for editing an image when a user provides inputs directly on the displayed image.

FIG. 32 conceptually illustrates a process 3200 that is performed by a media-editing application of some embodiments for editing an image based on user inputs provided directly on a displayed image. The process begins by displaying (at 3205) a particular image on the GUI of the media-editing application.

Next, the process receives (at 3210) an activation event for the on-screen control. In some embodiments, the activation event is a selection of a location on the displayed image. As mentioned above, the selection can be made by placing a cursor on the image and providing an input (e.g., clicking a button of a cursor controlling device, pressing a hot key, etc. or by touching a touch screen display at an area that displays the image). In some embodiments, the process identifies a particular pixel on the image based on the selected point.

After the process has received an activation event for the on-screen control, the process displays (at 3215) a set of color adjustment tools on the displayed image for adjusting different color values of the image. Different embodiments display different types of color adjustment tools on the image. In some embodiments, the set of color adjustment tools include one or more range sliders for adjusting a particular color channel (e.g., adjusting the luminance values, the red color values, etc.). Instead of or in addition to the range sliders, the color adjustment tool may simulate a graphical representation of the color values of the image (e.g., vectorscope, waveform, histogram, etc.). In these embodiments, the user may edit the image by providing an additional input (e.g., a vector) on the image as if the user is manipulating the actual graphical representation in a manner similar to that as described above in Sections I-III.

Then, the process receives (at 3220) an input on a color adjustment tool. The input may be a movement of the slider bar or a vector.

Next, the process determines (at 3225) a color space transformed based on the user inputs. In some embodiments, the color space transformed is determined based on the color values of the particular pixel and the received input on the color adjustment tool.

The process then applies (at 3230) the color space transform to a set of image that includes the particular image. In some embodiments, the set of images are picture frames of a video clip. In other embodiments, the set of images only include the particular image.

After the process has applied the color space transform to the set of images, the process determines (3235) if another input is received on the displayed color adjustment tools. If another input is received on the color adjustment tools, the process returns to 3225 to determine a color space transform based on the newly received input, and will cycle through operations 3225-3235 until no more inputs are received on the color adjustment tools. If no more inputs are received on the color adjustment tools, the process determines (at 3240) if a deactivation event for the on-screen control is received. In some embodiments, the on-screen control may be deactivated by pressing a hotkey or a selection outside of the displayed image. If the on-screen control is not deactivated, the process returns to 3235 to determine if there is another input on the displayed color adjustment tools, and will cycle through operations 3235-3240 until the on-screen control is deactivated. If the on-screen control is deactivated, the process removes (at 3245) the color adjustment tools from the displayed image. Then the process ends.

V. Software Architecture

Figure 33:
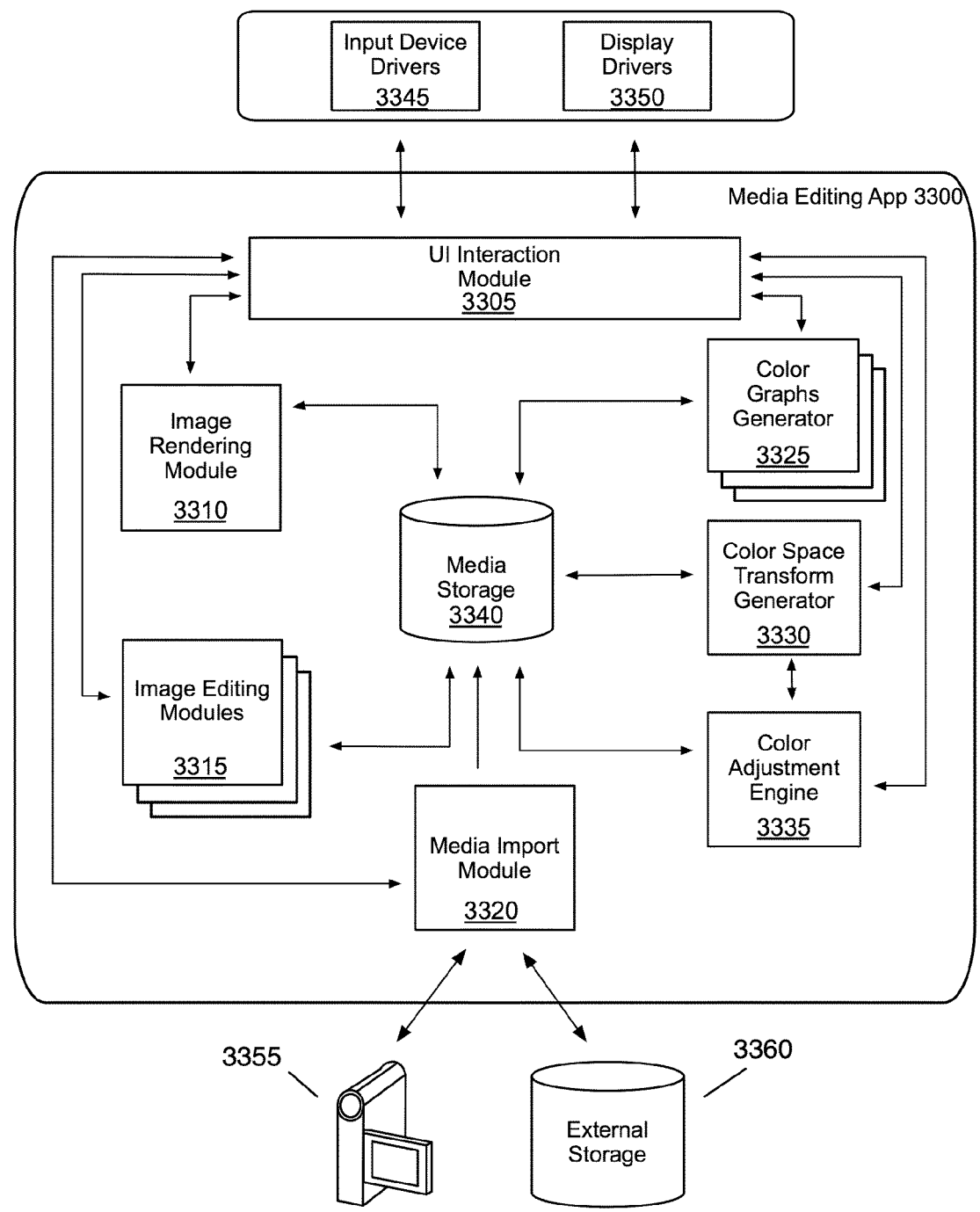
FIG. 33 conceptually illustrates the software architecture of a video decoder.

In some embodiments, the processes described above are implemented as software running on a particular machine, such as a computer or a handheld device, or stored in a machine readable medium. FIG. 33 conceptually illustrates the software architecture of a media-editing application 3300 of some embodiments. Some examples of such media-editing application include iPhoto®, iMovie® and Final Cut Pro®, all sold by Apple Inc.®

In some embodiments, the media-editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server.

In other such embodiments, the application is provided via a thick client. That is, the application is distributed from the server to the client machine and runs on the client machine.

As shown, the media-editing application 3300 includes a user interface (UI) interaction module 3305, a video rendering module 3310, a set of video editing modules 3315, a media import module 3320, a color graphs generator 3325, a color space transform generator 3330, and a color adjustment engine 3335. The application also includes a media storage 3340. In some embodiments, the media storage 3340 is a set of file folders organized by the media-editing application and stored on a particular set of storage devices. The storage devices may include the boot drive of the electronic device on which the application operates, a different partition of that disk, a separate internal or external hard drive, a flash drive, SD card, etc.

The UI interaction module 3305 of the media-editing application 3300 interprets the user input data received from the input device drivers 3345 and passes it to various modules, including the video editing modules 515, the media import module 520, and the color space transform generator 3330. In some embodiments, the input data directly affects the composite presentation data or other data stored in the media storage 3340.

The UI interaction module 3305 also manages the display of the UI, and outputs this display information to the display drivers 3350. This UI display information may be based on information from the various modules, including the video editing modules 3315, the video rendering module 3310, the media import module 3320, the color graphs generator 3325, and the color adjustment engine 3335.

The media import module 3320 imports media (e.g., an image, a video containing multiple picture frames, etc.) into the media-editing application for use. Some embodiments, as shown, receive the media directly from a video capturing device such as a video camera 3355. Some embodiments import media from an external storage 3360. The external storage 3360 may be an SD card, a flash drive, an external hard drive, an internal hard drive in which the files are not stored in the organized file folder structure of the application, etc.

The color graphs generator 3325 generates different graphical representations for an image. In some embodiments, the different graphical representations are generated based on the color values of the image. Some example graphical representations include waveform representation (as shown in Section I), vectorscope representation (as shown in Section II), and color channel histogram representation (as shown in Section III). In some embodiments, the graphical representations generated by the color graphs generator 3325 are provided to the UI interaction module 3305 for display on a display device.

The color space transform generator 3330 takes the inputs received from the UI interaction module 3305 and generates a transform to a color space. In some embodiments, the inputs are associated with directly manipulating a graphical representation, as described above in Sections I-III. In some embodiments, the color space transform that maps colors defined within a color space in which the color values of an image are defined to a different set of colors.

The color adjustment engine 3335 applies the color space transform generated by the color space transform generator 3330 to a set of images. In some embodiments, the set of images are picture frames of a video clip.

FIG. 33 also illustrates an operating system that includes input device driver(s) 3345 and display drivers 3350. In some embodiments, as illustrated, the device drivers 3345 and display drivers 3350 are part of the operating system even when the media editing application 3300 is an application separate from the operating system.

The input device drivers 3345 may include drivers for translating signals from a keyboard, mouse, touchpad, drawing tablet, touchscreen, etc. A user interacts with one or more of these input devices, which send signals to their corresponding device driver. The device driver then translates the signals into user input data that is provided to the UI interface interaction module 3305.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the input device. An example of a device with such functionality is a touch screen device (e.g., as incorporated into a smart phone, a tablet computer, etc.). In some embodiments with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 34:
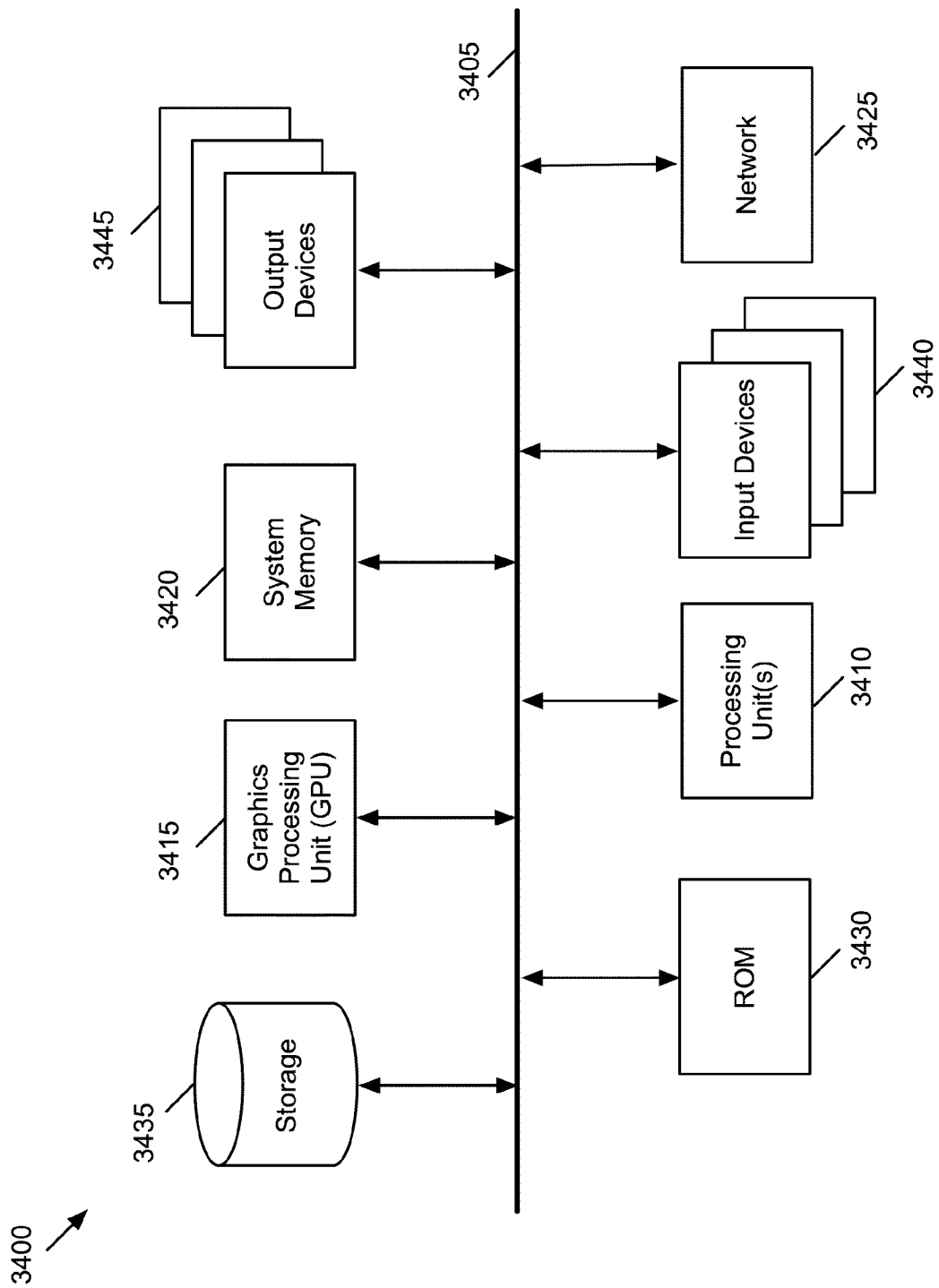
FIG. 34 conceptually illustrates an electronic system 3400 with which some embodiments of the invention are implemented.

FIG. 34 conceptually illustrates an electronic system 3400 with which some embodiments of the invention are implemented. The electronic system 3400 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 3400 includes a bus 3405, processing unit(s) 3410, a graphics processing unit (GPU) 3415, a system memory 3420, a network 3425, a read-only memory 3430, a permanent storage device 3435, input devices 3440, and output devices 3445.

The bus 3405 collectively represents all system, peripheral, and chipset buses that communicatively connect the numerous internal devices of the electronic system 3400. For instance, the bus 3405 communicatively connects the processing unit(s) 3410 with the read-only memory 3430, the GPU 3415, the system memory 3420, and the permanent storage device 3435.

From these various memory units, the processing unit(s) 3410 retrieves instructions to execute and data to process in order to execute the processes of the invention. The processing unit(s) may be a single processor or a multi-core processor in different embodiments. Some instructions are passed to and executed by the GPU 3415. The GPU 3415 can offload various computations or complement the image processing provided by the processing unit(s) 3410. In some embodiments, such functionality can be provided using CoreImage's kernel shading language.

The read-only-memory (ROM) 3430 stores static data and instructions that are needed by the processing unit(s) 3410 and other modules of the electronic system. The permanent storage device 3435, on the other hand, is a read-and-write memory device. This device is a non-volatile memory unit that stores instructions and data even when the electronic system 3400 is off. Some embodiments of the invention use a mass-storage device (such as a magnetic or optical disk and its corresponding disk drive) as the permanent storage device 3435.

Other embodiments use a removable storage device (such as a floppy disk, flash memory device, etc., and its corresponding disk drive) as the permanent storage device. Like the permanent storage device 3435, the system memory 3420 is a read-and-write memory device. However, unlike storage device 3435, the system memory 3420 is a volatile read-and-write memory, such a random access memory. The system memory 3420 stores some of the instructions and data that the processor needs at runtime. In some embodiments, the invention's processes are stored in the system memory 3420, the permanent storage device 3435, and/or the read-only memory 3430. For example, the various memory units include instructions for processing multimedia clips in accordance with some embodiments. From these various memory units, the processing unit(s) 3410 retrieves instructions to execute and data to process in order to execute the processes of some embodiments.

The bus 3405 also connects to the input and output devices 3440 and 3445. The input devices 3440 enable the user to communicate information and select commands to the electronic system. The input devices 3440 include alphanumeric keyboards and pointing devices (also called "cursor control devices"), cameras (e.g., webcams), microphones or similar devices for receiving voice commands, etc. The output devices 3445 display images generated by the electronic system or otherwise output data. The output devices 3445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 34, bus 3405 also couples electronic system 3400 to a network 3425 through a network adapter (not shown). In this manner, the computer can be a part of a network of computers (such as a local area network ("LAN"), a wide area network ("WAN"), or an Intranet, or a network of networks, such as the Internet. Any or all components of electronic system 3400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2, 10, 15, 16, 21, 25, and 32) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium storing a program for adjusting color values of an image represented in a color space, the program for execution by at least one processing unit, the program comprising sets of instructions for:

displaying the image on a display device;
displaying a graphical representation of the color values of the pixels in the image;
displaying a simplified version of the graphical representation overlaid on the displayed image;
receiving a selection of a first location on the displayed image that corresponds to a selected pixel of the image and a directional input from the first location to a second location, wherein the directional input is evaluated relative to the simplified version of the graphical representation as though the directional input had been made on the graphical representation; and
determining a color space transform for mapping a set of color values defined within the color space to a different set of color values by adjusting color values of pixels in the image that surround color values of the selected pixel in the color space, based on the color values of the selected pixel and the direction and magnitude of the directional input.

2. The machine readable medium of claim 1, wherein the displayed graphical representation comprises an indicator identifying the color values of the selected pixel.

3. The machine readable medium of claim 2, wherein the graphical representation comprises a vectorscope.

4. The machine readable medium of claim 1, wherein the program further comprises a set of instructions for modifying the image by using the color space transform to change the color values of the image.

5. The machine readable medium of claim 4, wherein the color space transform is a look-up table that specifies an adjusted color value for each color value within the color space.

6. The machine readable medium of claim 4, wherein the color space transform is implemented as an algorithm that generates an adjusted color value for each color value within the color space.

7. The machine readable medium of claim 1, wherein the program further comprises a set of instructions for editing the image according to the determined color space transform.

8. An electronic device comprising:
a set of processing units; and
a non-transitory machine readable medium storing a program for adjusting color values of an image represented in a color space, the program for execution by at least one of the set of processing units, the program comprising sets of instructions for:
displaying the image on a display device;
displaying a graphical representation of the color values of the pixels in the image;
displaying a simplified version of the graphical representation overlaid on the displayed image;
receiving a selection of a first location on the displayed image that corresponds to a selected pixel of the image and a directional input from the first location to a second location, wherein the directional input is evaluated relative to the simplified version of the graphical representation as though the directional input had been made on the graphical representation; and
determining a color space transform for mapping a set of color values defined within the color space to a different set of color values by adjusting color values of pixels in the image that surround color values of the selected pixel in the color space, based on the color values of the selected pixel and the direction and magnitude of the directional input.

9. The electronic device of claim 8, wherein the program further comprises sets of instructions for:
displaying an on-image color adjustment tool to receive the directional input; and
when the on-image color adjustment tool receives two non-orthogonal directional inputs, generating two different color space transforms that map the set of color values to two different sets of color values based on the two non-orthogonal directional inputs.

10. The electronic device of claim 8, wherein the program further comprises a set of instructions to display an on-image color adjustment tool upon receiving the selection of the first location on the displayed image.

11. The electronic device of claim 10, wherein the program further comprises a set of instructions for displaying a graphical representation of the color values of the pixels in the image, wherein the on-image color adjustment tool comprises a simplified version of the graphical representation.

12. The electronic device of claim 11, wherein the graphical representation comprises a vectorscope representation of the color values of the image.

13. The electronic device of claim 8, wherein the color space transform is implemented as an algorithm that generates an adjusted color value for each color value within the color space.

14. The electronic device of claim 10, wherein the on-image color adjustment tool further comprises a set of sliders for adjusting the color values of the image.

15. The electronic device of claim 11, wherein each of the different locations on the graphical representation is associated with a different color value.

16. The electronic device of claim 11, wherein the simplified graphical representation comprises a geometric shape that captures the directional input along different non-parallel and non-collinear directions.

17. The electronic device of claim 16, wherein the geometric shape captures different non-orthogonal directional inputs.

18. The electronic device of claim 16, wherein the color space transform modifies color values in the set of colors more for color values similar to the color values of the selected pixel than for colors dissimilar to the color values of the selected pixel.

19. A non-transitory machine readable medium storing a computer program for adjusting color values of an image represented in a color space, the computer program comprising sets of instructions for execution by at least one processing unit, the sets of instructions for:
displaying a luminance histogram representation of the luminance values of the image;
displaying a color selection tool on the luminance histogram representation in response to a user's selection of a location on the displayed luminance histogram representation, said location corresponding to a particular luminance value;
receiving a selection of a color from the color selection tool; and
based on the selected color, determining a color space transform for mapping a set of color values defined within the color space to a different set of color values, the color space transform based on the selected color and the particular luminance value.

20. The machine readable medium of claim 19, wherein the color space transform modifies the set of colors to be more similar to the selected color.

21. The machine readable medium of claim 19, wherein the color selection tool comprises a geometric shape that captures directional input along different non-parallel and non-collinear directional inputs.

22. The machine readable medium of claim 19, wherein the particular luminance value is a first luminance value, the color selection tool is a first color selection tool, and the color space transform is a first color space transform, the program further comprising sets of instructions for:
displaying a second color selection tool on the luminance histogram representation in response to a user's selection of a different location on the displayed luminance histogram representation, the different location on the luminance histogram representation corresponding to a second luminance value;
receiving a selection of a color from the second color selection tool; and
determining a second color space transform based on the selected color from the second color selection tool and the second luminance value.

23. A method of adjusting color values of an image represented in a color space, the method comprising:
displaying the image on a display device;
displaying a graphical representation of the color values of the pixels in the image;
displaying a simplified version of the graphical representation overlaid on the displayed image;
receiving a selection of a first location on the displayed image that corresponds to a selected pixel of the image and a directional input from the first location to a second location, wherein the directional input is evaluated relative to the simplified version of the graphical representation as though the directional input had been made on the graphical representation; and
determining a color space transform for mapping a set of color values defined within the color space to a different set of color values by adjusting color values of pixels in the image that surround color values of the selected pixel in the color space, based on the color values of the selected pixel and the direction and magnitude of the directional input.

24. The method of claim 23 further comprising modifying the image by using the color space transform to change the color values of the displayed image.

25. The method of claim 23, wherein the displayed graphical representation comprises an indicator identifying the color values of the selected pixel.

26. The method of claim 25, wherein the graphical representation comprises a vectorscope.

27. The method of claim 23 further comprising editing the image according to the determined color space transform.

* * * * *